United States Patent
Jones et al.

(10) Patent No.: US 9,438,970 B2
(45) Date of Patent: Sep. 6, 2016

(54) DETECTOR REMODULATOR AND OPTOELECTRONIC SWITCH

(71) Applicant: Rockley Photonics, Limited, Marlborough, Wiltshire (GB)

(72) Inventors: Haydn Frederick Jones, Reading (GB); Andrew George Rickman, Marlborough (GB); Aaron Zilkie, Pasadena, CA (US); Nathan Farrington, Arcadia, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 14/827,200

(22) Filed: Aug. 14, 2015

(65) Prior Publication Data

US 2016/0080844 A1    Mar. 17, 2016

Related U.S. Application Data

(63) Continuation of application No. PCT/GB2015/050524, filed on Feb. 24, 2015.

(60) Provisional application No. 62/057,818, filed on Sep. 30, 2014.

(30) Foreign Application Priority Data

Feb. 24, 2014 (GB) .................................. 1403191.8
Nov. 11, 2014 (GB) .................................. 1420063.8

(51) Int. Cl.
*H04J 14/00* (2006.01)
*H04J 14/06* (2006.01)
*H04Q 11/00* (2006.01)

(52) U.S. Cl.
CPC ... *H04Q 11/0071* (2013.01); *H04Q 2011/0016* (2013.01); *H04Q 2011/0032* (2013.01)

(58) Field of Classification Search
CPC ............... H04Q 11/0071; H04Q 2011/0016; H04Q 2011/32; H04Q 11/00; G02B 6/12; G02B 6/122; H04J 14/0284
USPC ..................................................... 398/43–65
See application file for complete search history.

(56) References Cited

U.S. PATENT DOCUMENTS 5,438,444 A * 8/1995 Tayonaka ............... H04J 14/02
                                                            385/24
5,757,986 A    5/1998 Crampton et al.
(Continued)

FOREIGN PATENT DOCUMENTS

EP    0 310 058 A2    4/1989
EP    1 761 103 A1    3/2007
(Continued)

OTHER PUBLICATIONS

"40Gb/s 2R Optical Regenerator (wavelength converter)", CIP Technologies, Preliminary Datasheet, Nov. 2013, 2 pages.
(Continued)

*Primary Examiner* — Ken Vanderpuye
*Assistant Examiner* — Abbas H Alagheband
(74) *Attorney, Agent, or Firm* — Lewis Roca Rothgerber Christie LLP

(57) ABSTRACT

An optoelectronic packet switch comprising: switch input(s) for receiving optical packet signals; a passive optical router; a control unit; and a plurality of detector-remodulators (DRMs) configured to receive signals from the switch input(s) and to generate modulated optical signals for transmission to the input ports of the passive optical router. Each DRM comprising: detector(s) for converting an optical packet-signal received at the switch input(s) into an electrical packet-signal; modulator(s) for generating the modulated optical signals. Each modulator configured to: receive a wavelength-tuned input from a tunable laser; receive the electrical packet-signal from one of the detectors; and to generate a modulated optical signal at the tuned wavelength, the modulated signal containing the information of the electric packet-signal and the tuned wavelength chosen to select an output port of the passive optical router for the modulated optical signal; and an electronic circuit connecting each of the detector(s) to a corresponding modulator.

20 Claims, 33 Drawing Sheets

(56) References Cited

U.S. PATENT DOCUMENTS

| | | | |
|---|---|---|---|
| 5,908,305 A | 6/1999 | Crampton et al. | |
| 6,298,177 B1 | 10/2001 | House | |
| 6,349,106 B1* | 2/2002 | Coldren | B82Y 20/00 372/26 |
| 6,396,801 B1* | 5/2002 | Upton | H04J 14/005 370/204 |
| 6,445,839 B1 | 9/2002 | Miller | |
| 6,549,313 B1 | 4/2003 | Doerr et al. | |
| 6,563,627 B2 | 5/2003 | Yoo | |
| 6,580,739 B1 | 6/2003 | Coldren | |
| 6,584,239 B1 | 6/2003 | Dawnay et al. | |
| 6,614,819 B1 | 9/2003 | Fish et al. | |
| 6,636,662 B1* | 10/2003 | Thompson | G02B 6/12011 385/132 |
| 6,680,791 B2* | 1/2004 | Demir | B82Y 20/00 359/245 |
| 6,710,911 B2 | 3/2004 | LoCascio et al. | |
| 6,768,827 B2* | 7/2004 | Yoo | B82Y 20/00 385/14 |
| 6,873,763 B2 | 3/2005 | Nikonov | |
| 7,031,617 B2* | 4/2006 | Zucchelli | G02F 1/3517 398/175 |
| 7,092,609 B2 | 8/2006 | Yegnanarayanan et al. | |
| 7,133,576 B2 | 11/2006 | Coldren et al. | |
| 7,174,058 B2* | 2/2007 | Coldren | B82Y 20/00 385/1 |
| 7,256,929 B1 | 8/2007 | Rong et al. | |
| 7,394,948 B1 | 7/2008 | Zheng et al. | |
| 7,505,686 B2 | 3/2009 | Jennen | |
| 7,570,844 B2 | 8/2009 | Handelman | |
| 7,603,016 B1* | 10/2009 | Soref | B82Y 20/00 385/129 |
| 7,811,844 B2 | 10/2010 | Carothers et al. | |
| 7,826,700 B2 | 11/2010 | Knights et al. | |
| 7,885,492 B2 | 2/2011 | Welch et al. | |
| 7,916,377 B2* | 3/2011 | Witzens | G02F 1/0123 359/239 |
| 7,941,014 B1 | 5/2011 | Watts et al. | |
| 8,160,404 B2 | 4/2012 | Pan et al. | |
| 8,242,432 B2 | 8/2012 | Feng et al. | |
| 8,346,028 B2 | 1/2013 | Feng et al. | |
| 8,362,494 B2* | 1/2013 | Lo | G02F 1/025 257/13 |
| 8,401,385 B2 | 3/2013 | Spivey et al. | |
| 8,403,571 B2 | 3/2013 | Walker | |
| 8,724,988 B2 | 5/2014 | Andriolli et al. | |
| 8,792,787 B1 | 7/2014 | Zhao et al. | |
| 9,306,698 B2* | 4/2016 | Chen | H04Q 11/0005 |
| 2001/0030787 A1* | 10/2001 | Tajima | H04J 14/0221 398/82 |
| 2002/0159117 A1* | 10/2002 | Nakajima | H04J 14/0212 398/83 |
| 2003/0063362 A1 | 4/2003 | Demir et al. | |
| 2003/0095737 A1* | 5/2003 | Welch | B82Y 20/00 385/14 |
| 2003/0133641 A1* | 7/2003 | Yoo | B82Y 20/00 385/14 |
| 2003/0142943 A1 | 7/2003 | Yegnanarayanan et al. | |
| 2003/0156789 A1* | 8/2003 | Bhardwaj | G02B 6/12 385/37 |
| 2003/0223672 A1* | 12/2003 | Joyner | G02B 6/12011 385/14 |
| 2004/0013429 A1* | 1/2004 | Duelk | H04Q 11/0005 398/45 |
| 2004/0033004 A1* | 2/2004 | Welch | B82Y 20/00 385/14 |
| 2004/0126057 A1* | 7/2004 | Yoo | B82Y 20/00 385/16 |
| 2004/0207016 A1 | 10/2004 | Patel et al. | |
| 2005/0053377 A1* | 3/2005 | Yoo | H04B 10/299 398/79 |
| 2005/0089269 A1* | 4/2005 | Cheng | G02B 6/12019 385/27 |
| 2005/0089273 A1* | 4/2005 | Squires | G02B 6/12019 385/37 |
| 2006/0140528 A1 | 6/2006 | Coldren et al. | |
| 2006/0257065 A1* | 11/2006 | Coldren | B82Y 20/00 385/10 |
| 2007/0065076 A1* | 3/2007 | Grek | G02B 6/12026 385/37 |
| 2008/0013881 A1* | 1/2008 | Welch | G02B 6/12004 385/14 |
| 2008/0138088 A1* | 6/2008 | Welch | H01S 5/026 398/183 |
| 2009/0003841 A1 | 1/2009 | Ghidini et al. | |
| 2009/0169149 A1 | 7/2009 | Block | |
| 2009/0185804 A1* | 7/2009 | Kai | H04J 14/0226 398/48 |
| 2009/0245298 A1 | 10/2009 | Sysak et al. | |
| 2010/0128336 A1* | 5/2010 | Witzens | G02F 1/0123 359/239 |
| 2010/0200733 A1 | 8/2010 | McLaren et al. | |
| 2010/0290732 A1 | 11/2010 | Gill | |
| 2011/0013905 A1 | 1/2011 | Wang et al. | |
| 2011/0142391 A1 | 6/2011 | Asghari et al. | |
| 2011/0180795 A1* | 7/2011 | Lo | G02F 1/025 257/51 |
| 2011/0200333 A1* | 8/2011 | Schrenk | H04B 10/2587 398/67 |
| 2011/0293279 A1 | 12/2011 | Lam et al. | |
| 2012/0328292 A1 | 12/2012 | Testa et al. | |
| 2013/0051798 A1* | 2/2013 | Chen | H04Q 11/0005 398/49 |
| 2013/0315599 A1 | 11/2013 | Lam et al. | |
| 2015/0010307 A1* | 1/2015 | Zhong | H04J 14/0246 398/68 |
| 2015/0277157 A1 | 10/2015 | Jones et al. | |

FOREIGN PATENT DOCUMENTS

| | | |
|---|---|---|
| WO | WO 02/41663 A2 | 5/2002 |
| WO | WO 2008/024458 A2 | 2/2008 |

OTHER PUBLICATIONS

Bregni, Stefano et al., "Architectures and Performance of AWG-Based Optical Switching Nodes for IP Networks", IEEE Journal on Selected Areas in Communications, Sep. 2003, pp. 1113-1121, vol. 21, No. 7.

Dong, Po et al., "Wavelength-tunable silicon microring modulator", Optics Express, May 10, 2010, pp. 10941-10946, vol. 18, No. 11.

Durhuus, Terji et al., "All-Optical Wavelength Conversion by Semiconductor Optical Amplifiers", Journal of Lightwave Technology, Jun. 1996, pp. 942-954, vol. 14, No. 6.

Edagawa, Noboru et al., "Novel Wavelength Converter Using an Electroabsorption Modulator", IEICE Trans. Electron., Aug. 1998, pp. 1251-1257, vol. E81-C, No. 8.

Ellis, A.D. et al., "Error free 100Gbit/s wavelength conversion using grating assisted cross-gain modulation in 2mm long semiconductor amplifier", Electronics Letters, Oct. 1, 1998, pp. 1958-1959, vol. 34, No. 20.

Farington, Nathan et al., "A Demonstration of Ultra-Low-Latency Data Center Optical Circuit Switching," ACM SIGCOMM Computer Communication Review, vol. 42, No. 4, 2012, pp. 95-96.

Feng, Dazeng et al., "High-Speed GeSi Electroabsorption Modulator on the SOI Waveguide Platform", IEEE Journal of Selected Topics in Quantum Electronics, Nov./Dec. 2013, 10 pages, vol. 19, No. 6.

Fidaner, Onur et al., "Integrated photonic switches for nanosecond packet-switched optical wavelength conversion", Optics Express, Jan. 9, 2006, pp. 361-368, vol. 14, No. 1.

Fidaner, Onur et al., "Waveguide Electroabsorption Modulator on Si Employing Ge/SiGe Quantum Wells", Optical Society of America, 2007, 1 page.

Foster, Mark A., "Broad-band continuous-wave parametric wavelength conversion in silicon nanowaveguides", Optics Express, Sep. 24, 2007, pp. 12949-12958, vol. 15, No. 20.

Geis, M.W. et al., "Silicon waveguide infrared photodiodes with >35 GHz bandwidth and phototransistors with 50 AW[1] response", Optics Express, Mar. 18, 2009, pp. 5193-5204, vol. 17, No. 7.

Gripp, Jurgen et al., "Optical Switch Fabrics for Ultra-High-Capacity IP Routers", Journal of Lightwave Technology, Nov. 2003, pp. 2839-2850, vol. 21, No. 11.

(56) References Cited

OTHER PUBLICATIONS

Hsu, A. et al., "Wavelength Conversion by Dual-Pump Four-Wave Mixing in an Integrated Laser Modulator", IEEE Photonics Technology Letters, Aug. 2003, pp. 1120-1122, vol. 15, No. 8.
Hu, Hao et al., "Ultra-high-speed wavelength conversion in a silicon photonic chip", Optics Express, Sep. 26, 2011, pp. 19886-19894, vol. 19, No. 21.
Hussain, Ashiq et al., "Optimization of Optical Wavelength Conversion in SOI Waveguide", Applied Mechanics and Materials, 2012, 5 pages, vol. 110-116.
International Search Report and Written Opinion of the International Searching Authority, Dated Jun. 8, 2015, Mailed Jun. 15, 2015; and Received Jun. 15, 2015, Corresponding to PCT/GB2015/050523, 14 pages.
International Search Report and Written Opinion of the International Searching Authority, Dated Jun. 8, 2015, Mailed Sep. 16, 2015, and Received Sep. 17, 2015, Corresponding to PCT/GB2015/050524, 18 pages.
Kachris, Christoforos et al., "A Survey on Optical Interconnects for Data Centers", IEEE Communications Surveys & Tutorials, vol. 14, No. 4, Fourth Quarter 2012, pp. 1021-1036.
Kachris, Christoforos et al., "Optical Interconnection Networks in Data Centers: Recent Trends and Future Challenges", IEEE Communications Magazine, Optical Technologies for Data Center Networks, Sep. 2013, pp. 39-45.
Lal, Vikrant et al., "Monolithic Wavelength Converters for High-Speed Packet-Switched Optical Networks", IEEE Journal of Selected Topics in Quantum Electronics, Jan./Feb. 2007, pp. 49-57, vol. 13, No. 1.
Leuthold, J. et al., "All-optical wavelength conversion between 10 and 100 Gb/s with SOA delayed-interference configuration", Optical and Quantum Electronics, 2001, pp. 939-952, vol. 33, Nos. 7-10.
Liao, Ling et al., "High speed silicon Mach-Zehnder modulator", Optics Express, Apr. 18, 2005, pp. 3129-3135, vol. 13, No. 8.
Liu, Ansheng et al., "High-speed optical modulation based on carrier depletion in a silicon waveguide", Optics Express, Jan. 22, 2007, pp. 660-668, vol. 15, No. 2.
Liu, Y. et al., "Error-Free 320-Gb/s All-Optical Wavelength Conversion Using a Single Semiconductor Optical Amplifier", Journal of Lightwave Technology, Jan. 2007, pp. 103-108, vol. 25, No. 1.
Maxwell, G. et al., "WDM-enabled, 40Gb/s Hybrid Integrated All-optical Regenerator", ECOC 2005 Proceedings, 2005, pp. 15-16, vol. 6.
Meuer, Christian et al., "80 Gb/s wavelength conversion using a quantum-dot semiconductor optical amplifier and optical filtering", Optics Express, Mar. 3, 2011, pp. 5134-5142, vol. 19, No. 6.
Nakamura, Shigeru et al., "168-Gb/s All-Optical Wavelength Conversion With a Symmetric-Mach-Zehnder-Type Switch", IEEE Photonics Technology Letters, Oct. 2001, pp. 1091-1093, vol. 13, No. 10.
Neilson, David T., "Photonics for Switching and Routing", IEEE Journal of Selected Topics in Quantum Electronics, Jul./Aug. 2006, pp. 669-678, vol. 12, No. 4.
Ngo, Hung Q. et al., "Constructions and Analyses of Nonblocking WDM Switches Based on Arrayed Waveguide Grating and Limited Wavelength Conversion", IEEE/ACM Transactions on Networking, Feb. 2006, pp. 205-217, vol. 14, No. 1.
Ngo, Hung Q. et al., "Nonblocking WDM Switches Based on Arrayed Waveguide Grating and Limited Wavelength Conversion", Proceedings from the 23rd Conference of the IEEE Communications Society, 2004, 11 pages.
Ngo, Hung Q. et al, "Optical Switching Networks with Minimum Number of Limited Range Wavelength Converters," 24th Annual Joint Conference of the IEEE Computer and Communications Societies. Proceedings IEEE vol. 2, 2005, pp. 1128-1138.
Nishimura, Kohsuke et al., "Optical wavelength conversion by electro-absorption modulators", Active and Passive Optical Components for WDM Communications IV, Proceedings of SPIE, 2004, pp. 234-243, vol. 5595.
Proietti, Robert et al., "TONAK: A Distributed Low-latency and Scalable Optical Switch Architecture," 39th European Conference and Exhibition on Optical Communication, 2013, pp. 1005-1007.
Proietti, Roberto et al., "40 Gb/s 8×8 Low-latency Optical Switch for Data Centers," OSA/OFC/NFOEC 2011, 3 pages.
"Quad 40Gb/s 2R Optical Regenerator", CIP Technologies, Preliminary Datasheet, Nov. 2013, 2 pages.
Reed, Graham T. et al., "Silicon optical modulators", Materials Today, Jan. 2005, pp. 40-50, vol. 8, No. 1.
Segawa, Toru et al., "All-optical wavelength-routing switch with monolithically integrated filter-free tunable wavelength converters and an AWG", Optics Express, Feb. 17, 2010, pp. 4340-4345, vol. 18, No. 5.
Stamatiadis, C. et al., "Fabrication and experimental demonstration of the first 160 Gb/s hybrid silicon-on-insulator integrated all-optical wavelength converter", Optics Express, Feb. 1, 2012, pp. 3825-3831, vol. 20, No. 4.
Stubkjaer, Kristian E., "Semiconductor Optical Amplifier-Based All-Optical Gates for High-Speed Optical Processing", IEEE Journal on Selected Topics in Quantum Electronics, Nov./Dec. 2000, pp. 1428-1435, vol. 6, No. 6.
Summers, Joseph A. et al., "Monolithically Integrated Multi-Stage All-Optical 10Gbps Push-Pull Wavelength Converter", Optical Fiber Communication Conference, 2007, 3 pages, Anaheim, CA, USA.
Sysak, M.N. et al., "Broadband return-to-zero wavelength conversion and signal regeneration using a monolithically integrated, photocurrent-driven wavelength converter", Electronics Letters, Dec. 7, 2006, 2 pages, vol. 42, No. 25.
Tauke-Pedretti, Anna et al., "Separate Absorption and Modulation Mach-Zehnder Wavelength Converter", Journal of Lightwave Technology, 2008, pp. 1-8, vol. 26, No. 1.
Turner-Foster, Amy C. et al., "Frequency conversion over two-thirds of an octave in silicon nanowaveguides", Optics Express, Jan. 15, 2010, pp. 1904-1908, vol. 18, No. 3.
U.K. Intellectual Property Office Search Report, Dated Aug. 6, 2014, Received Aug. 8, 2014, for Patent Application No. GB1403191.8, 5 pages.
U.K. Intellectual Property Office Search Report, Dated Sep. 5, 2014, Received Sep. 10, 2014, for Patent Application No. GB1403191.8, 2 pages.
U.K. Intellectual Property Office Search Report, Dated Jun. 10, 2015, Received Jun. 12, 2015, for Patent Application No. GB1420063.8, 4 pages.
U.S. Appl. No. 14/629,922, filed Feb. 24, 2015.
U.S.P.T.O. Office Action Dated Nov. 25, 2015 for U.S. Appl. No. 14/629,922, 13 pages.
Vivien, L. et al., "High speed silicon modulators and detectors", ACP Technical Digest, Communications and Photonics Conference, Nov. 7, 2012, 3 pages.
Vlachos, Kyriakos et al., "Photonics in switching: enabling technologies and subsystem design", Journal of Optical Networking, May 2009, pp. 404-428, vol. 8, No. 5.
Wang, J. et al., "Evanescent-Coupled Ge p-i-n. Photodetectors on Si-Waveguide With SEG-Ge and Comparative Study of Lateral and Vertical p-i-n. Configurations", IEEE Electron Device Letters, May 2008, pp. 445-448, vol. 29, No. 5.
Xi, Kang et al., "Petabit Optical Switch for Data Center Networks," Polytechnic Institute of New York University, Brooklyn, New York, 9 pages, 2010.
Yao, Shun et al., "A Unified Study of Contention-Resolution Schemes in Optical Packet-Switched Networks", Journal of Lightwave Technology, 2003, 31 pages, vol. 21, No. 3.
Ye, Tong et al., "A Study of Modular AWGs for Large-Scale Optical Switching Systems," Journal of Lightwave Technology, vol. 30, No. 13, Jul. 1, 2012, pp. 2125-2133.
Ye, Tong et al., "AWG-based Non-blocking Clos Networks", Aug. 21, 2013, pp. 1-13.

* cited by examiner

DETECTOR REMODULATOR AND OPTOELECTRONIC SWITCH

CROSS-REFERENCE TO RELATED APPLICATIONS

The present application claims is a continuation PCT/GB2015/050524, filed on Feb. 24, 2015, which is turn claimed priority to U.S. Provisional Patent App. No. 62/057,818, filed Sep. 30, 2014, G.B. Patent App. No. 1403191.8, filed Feb. 24, 2014, and G.B. Patent App. No. 1420063.8, filed Nov. 11, 2014, all of which are incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The disclosed embodiments relate to a detector remodulator, more particularly to a detector remodulator for use with an optoelectronic switch.

BACKGROUND

In optical communications and optical switching it is well known that signals can be transposed from a first optical signal of a first channel or wavelength to a second optical signal of a second channel or wavelength.

A detector remodulator may be used to convert the first optical signal to the second optical signal and involves the detection of the first signal in which the first (modulated) signal is converted into an electrical signal, followed by the modulation of light of a second (unmodulated) wavelength/channel by the (modulated) electrical signal. Whilst in the electrical domain, the signal may advantageously be processed, for example by one or more of amplification, reshaping, re-timing, and filtering in order to provide a clean signal to be applied to the second wavelength/channel. However, currently in the art, to amplify and filter the electrical signal at high data rates with low noise, the circuitry must be contained in a separate electronic chip, which requires packaging and mounting thereby increasing size and cost and reducing power efficiency.

In U.S. Pat. No. 6,680,791 an integrated chip is provided with a light detector and modulator positioned close together so that the electrical connection between the detector part and the modulator part is short and of low resistivity. However a maximum of only 10 Gb/s data speed is predicted for this structure due to diode capacitance and thin-film resistance limitations [O. Fidaner et al., Optics Express, vol. 14, pp. 361-368, (2006)].

U.S. Pat. No. 6,349,106 describes a tunable laser, driven by a circuit with a signal derived from a first optical wavelength. However because it comprises a III-V-material photonic integrated circuit and involves the use of epitaxial heterostructures and a vertical p-i-n diode structure, is inflexible in its design and therefore inadequate for new applications involving increasing switching speeds, reduced latency, reduced power consumption and the demand for lower cost and high-yield manufacturability. In particular, because the semiconductor devices including the modulator built upon the semiconductor chip are driven by circuits completed between contacts on the top surface and a contact covering all or a large proportion of the base or underside of the chip, the capacitance of the device cannot be readily controlled by design features built into the structures such as doped regions and metal contacts.

Application of arrayed waveguide gratings (AWGs) in optical switching (including optical circuit switching and optical packet switching) has been slow despite the advantages that AWGs may provide. This is in part due to disadvantageous features of AWGs such as the uneven response across a range of wavelengths, cascading effects of limited bandwidth after multiple passes as well as cross-talk between different ports.

Use of AWGs in optical switching is known; Ye et al (IEEE/ACM Transactions on Networking, VOL PP, Issue 99, Page 1, February 2014) and by Bregni et al (IEEE Journal on Selected Areas in Communications, VOL 21, No 7, September 2003). Ye et al describes the use of AWGs in Clos-type optical switches and other architectures and Ngo et al (Proceedings 23rd Conference of IEEE Communications Soc, 2004) has illustrated AWG switch architectures that are rearrangeably non-blocking and strictly non-blocking.

One of the difficulties in realising optical switches is speed and another is latency. Poor latency is especially undesirable in uses such as high performance computing and datacentre switching where it is desirable to make calls or rapid data exchanges on a system as close to real time as possible.

SUMMARY

The disclosed embodiments aim to address these problems by providing, according to a first aspect, a detector remodulator comprising a silicon on insulator (SOI) waveguide platform including: a detector coupled to a first input waveguide; a modulator coupled to a second input waveguide and an output waveguide; and an electrical circuit connecting the detector to the modulator; wherein the detector, modulator, second input waveguide and output waveguide are arranged within the same horizontal plane as one another; and wherein the modulator includes a modulation waveguide region at which a semiconductor junction is set horizontally across the waveguide.

The modulation region may be a phase modulation region or an amplitude modulation region.

The horizontal plane should be understood to be any plane parallel to the plane of the substrate surface. The semiconductor junction should be understood to correspond to any one junction or number of junctions between different regions having different semiconductor Fermi energies thereby forming an opto-electronic region. The semiconductor junction may or may not include an intrinsic region.

The semiconductor junction is horizontal in that the junction is formed by a first doped region at (and/or extending into) one side of the waveguide and a second doped region at (and/or extending into) the opposite side of the waveguide. All doped regions of the semiconductor junction therefore lie along the horizontal plane defined by the detector, modulator, second input and output waveguides.

The planar arrangement of the detector remodulator, and in particular the horizontal junction, enables increased flexibility in both design and fabrication as the location of doped sections at either side of the waveguide rather than above or below the waveguide gives rise to a greater degree of freedom in terms of their size and shape.

The horizontal junction configuration also enables easy access to each of the junction regions. This is particularly useful where the junction includes an intrinsic region (or a third doped region) between two doped regions as it enables electrodes corresponding to each of the three regions to be positioned on top of the respective region.

As the detector remodulator of this invention has a horizontal junction configuration, properties such as size of the doped regions can easily be adapted and controlled during design and manufacture, parameters such as capacitance that crucially affect the speed of operation can therefore be controlled.

In their planar configuration, the detector, modulator, electrical circuit, input waveguide and output waveguide form an SOI planar lightwave circuit (SOI-PLC). Silicon on insulator is a practical platform for the construction and integration of optical devices. Use of bulk semiconductor SOI and SOI-compatible materials in such a PLC technology as opposed to III-V heterostructure semiconductor photonic integrated circuit technology allows for integration of detectors and modulators without the low manufacturing yields associated with epitaxial re-growth of multiple heterostructures. Optional features of the invention will now be set out. These are applicable singly or in any combination with any aspect of the invention.

The first input waveguide, which is coupled to the input of the detector, is preferably also arranged to lie within the same horizontal plane as the detector, modulator, second input waveguide and output waveguide.

The semiconductor junction of the modulation region may be a p-n junction and may, for each modulator embodiment described, include 2 doped regions (p-n); 4 doped regions (p+, p, n, n+); or even 6 regions (p++, p+, p, n, n+, n++).

This p-n junction may further comprise a first and second electrode, the first electrode located directly above the p-doped region of the p-n junction and the second electrode located directly above the n-doped region of the p-n junction.

The semiconductor junction of the modulation region may be a p-i-n junction.

The p-doped and n-doped regions are therefore located at either side of the waveguide with an intrinsic region between. The doped regions may extend into the waveguide such that the width of the intrinsic region is less than the width of the waveguide.

The p-i-n junction may further comprise a first, second and third electrode, the first electrode located directly above the p-doped region of the p-i-n junction, the second electrode located directly above the n-doped region and the third electrode located directly above the intrinsic region of the p-i-n junction.

Electrodes are preferably metal strips which lie above the relevant doped region along its length. In this way, an electric bias can be applied to the relevant doped region via the electrode located above it.

In general the electrodes should be small and the doped regions, within semiconductor junctions (p-n, p-i-n, or otherwise) should be small.

The width of the doped regions taken along the horizontal plane and in a direction perpendicular to the longitudinal (or circumferential) axis of the doped waveguide is particularly important.

For example, in a single semiconductor junction such as a p-n junction, the total width of either the p-doped or n-doped region may be no more than 20 µm. Where the p doped region is graded into different sub-regions (for example in that it contains p, p+ and p++ regions), each sub-region may have a width of no more than 15 µm, but the width of different sub-groups may be substantially different to each other, for example the p doped region may be larger than each of the p+ and the p++ regions. In order to further improve on modulation and detector speeds, each sub-region may have a width no more than 10 µm, 5 µm, 2 µm, 1 µm, 0.5 µm or even 0.3 µm.

Although the sizes above are described in relation to p doped regions, they would equally apply to n doped regions.

Furthermore, where the modulator or detector waveguide includes a semiconductor-intrinsic-semiconductor junction (e.g. a p-i-n junction), each doped region may have a width taken along the horizontal plane and in a direction perpendicular to the longitudinal (or circumferential) axis of no more than 15 µm, or in order to further reduce the speed of operation, a width of no more than 10 µm, 5 µm, 2 µm, 1 µm, 0.5 µm or even 0.3 µm.

Electrodes which apply a bias to a doped region will preferably have a width which is less than the width of that doped region. Depending on the size of the relevant doped region, the electrode may therefore have a width of no more than 10 µm, or in order to further reduce the speed of operation, a width of no more than 5 µm, 2 µm, 1 µm, 0.5 µm or even 0.3 µm.

The ridge width for the waveguides of the detector or modulator regions may be 0.3-1 µm or preferably 0.45-0.9 µm and the slab height of the detector or modulator regions may be 0-0.4 µm, preferably 0.05-0.035 µm. The silicon overlayer thickness may be 0.2-3.5 µm, preferably 0.2-3.2 µm.

The amplitude or modulation region of the modulator is preferably formed from a bulk semiconductor material.

Preferably, the detector also comprises a waveguide portion with a semiconductor junction set horizontally across the waveguide.

Doped sections of the detector are therefore also located at either side of the waveguide rather than above and below the waveguide.

The semiconductor junction of the detector may be a p-i-n junction. As with the p-i-n modulator, the p-doped and n-doped regions are located at either side of the waveguide with an intrinsic region between.

Alternatively, the semiconductor junction of the detector may be an n-i-n, n-p-n or p-i-p junction such that the detector functions as a phototransistor. In this way, the detector itself provides a gain whilst avoiding the need for separate components which provide gain but undesirably increase resistance. Avoiding the need for optical amplifiers to amplify the optical input signal is also advantageous because optical amplifiers (such as a semiconductor optical amplifier, SOA) add noise to the optical signal and also draw significant additional electrical power as well as adding cost and complexity to the SOI platform. An alternative to optical amplifiers is electrical amplification of the received input signal. However, unless a transimpedance amplifier (TIA) is used, a high transimpedance resistance circuit is needed which disadvantageously prevents high speed operation.

Each of the n-i-n, n-p-n or p-i-p doping structures may provide a different amount of electrical gain and/or electrical bandwidth; Typically the higher the gain of the design, the lower the electrical bandwidth.

The photodetector is preferably formed from a bulk semiconductor material.

The electrical circuit may be a single strip of metal or a few strips of metal placed in series and/or in parallel with each other to form a simple RF circuit. In this way, the electrical circuit is reduced in complexity. A detector remodulator with such an electrical circuit is preferable where the received optical input signal has travelled over short distances and so does not incur heavy optical impairments. In such cases only amplification of the signal may be desired as the signal may have degraded in intensity. However, the amount of jitter or amplitude added should not be significant, so there should be no need to reshape or retime the signal.

The length of the electrical circuit from its electrical connection at the detector to its electrical detector at the modulator may take any value from 1.0 to $2\times10^4$ μm. Where the electrical circuit is kept advantageously small to increase speed, it may be no more than 10 μm, within the range of 1.5 μm to 10 μm, or even no more than 1.5 μm. The electrical circuit will be as wide and as thick as practically possible (for example 5.0-50 μm).

The electrical circuit may contain one or more resistors and the one or more resistors may include a variable resistor.

The electrical circuit may include nonlinear circuit elements (e.g. transistors) configured to amplify the electrical signal which forms an input to the modulator with a high speed circuit and/or limit the electrical signal in such a way that the signal does not drop below a minimum magnitude and/or above a maximum magnitude.

The electrical circuit may be monolithic. In this way, all of the manufacturing of the DRM is carried out in the semiconductor fabrication process. Only extra fabrication process steps are required.

The electrical circuit may be a stripline circuit. In this way, the fabrication of the electrical circuit is simplified and therefore more cost-effective than alternative circuits, requiring only application of a mask and a metallisation process. This type of electrical circuit is most suitable where the electrical circuit itself has a simple structure such as a single strip of metal or a few strips of metal. Again only extra fabrication process steps are required here.

The electrical circuit may be surface mounted. This type of electrical circuit is particularly useful when the circuit includes components such as transistors, filters and/or additional nonlinear components. Such components cannot be added as part of a stripline circuit.

The modulator may be an electro-absorption modulator (EAM). This type of modulator is advantageously simple and provides relatively high modulation speeds.

The EAM modulator is preferably formed of SiGe.

Alternatively, the modulator is a Mach-Zehnder Modulator (MZM). This type of modulator is advantageous over an EAM because it is capable of functioning over a larger wavelength bandwidth. In addition, there may be no need to engineer the material of the modulator such that it has a precise band-gap wavelength. In other modulators for example EAM modulators, control of SiGe composition is required, which may include incorporation and epitaxial growth of Ge or SiGe. The homogeneous silicon embodiment in particular is easier to fabricate.

On the other hand, the overall length of the device is longer and higher insertion losses mean that the MZM can be less power efficient than the EAM. In addition, this modulator requires a more complicated p-n doping structure with many more doping regions; and a more complicated electrical circuit in the form of a phase-matched and impedance matched RF driving circuit. An RF drive circuit which can reach operational speeds of 25 GHz and greater is not straightforward.

Furthermore, the MZM has a larger device size compared to other modulators and the MZM requires an additional fine tuning region to match the laser wavelength to the pass-band wavelength for the 'on' state.

Preferably, each arm of the MZM includes a modulation region (e.g. an amplitude or a phase modulation region). Each modulation region has a high operation speed (i.e. an operation speed of 25 Gb/s with a 3-dB bandwidth of 15 or more GHz).

Preferably, each arm of the MZM includes a phase shift region in addition to the modulation region and the phase shift region preferably has a lower speed than the modulation regions.

The phase shift region may comprise a p-i-n junction such that it operates by way of carrier injection. On the other hand, the phase shift region may comprise a p-n junction such that it operates by way of carrier depletion.

Phase shift regions may be low speed as their function is cavity FSR fine tuning. In this way, they provide a means of operating wavelength fine tuning as well as thermal drift compensation.

The modulation regions may be homogeneous silicon or may be silicon germanium.

The Mach-Zehnder modulator may be single-drive or may be dual-drive and may be a push/pull Mach-Zehnder modulator. Where a push/pull configuration is used, lower driving voltages are required in each arm.

According to an alternative embodiment, the modulator may be a Fabry-Perot resonator modulator.

The Fabry-Perot (F-P) resonator modulator may be formed in a single waveguide section by two reflectors in series with one or more modulation regionsn (e.g. phase modulation regions or amplitude modulation regions) between the two reflectors.

In this way, the use of an IIR filter means that the effect of the refractive index change induced by the modulation regions is enhanced by the increased number of round trips in the resonator cavity. Where modulation is carried out by carrier injection, a smaller injected current density is required to perform modulation with a given extinction ratio. Where modulation is carried out by carrier depletion, a smaller bias voltage is required to perform modulation with a given extinction ratio. Thus in a DRM less optical or electrical amplification is needed to perform modulation (as compared to the EAM or MZM embodiment). The F-P can also work over a larger bandwidth with the use of fine tuning.

On the other hand, the fabrication and design complexity of the Fabry-Perot embodiment is greater due to incorporation of the DBR gratings or reflectors. With increasing high speeds of the modulator (25 or 40 Gb/s), the manufacturing complexity and tolerances increase. In addition, the photon lifetime of the cavity must be kept optimally low which means that the cavity length must be short and the Finesse sufficiently low.

Furthermore, F-P modulators and IIR resonators in general are more sensitive to temperature so require active fine tuning of wavelength.

As with previous embodiments, the modulation region may be homogeneous Si or SiGe.

The reflectors of the Fabry-Perot resonator modulator may be DBR gratings and broadband DBR gratings with short lengths and deep etch depths are preferable. Each DBR reflector could take the form of just a single line broadband partial reflector (i.e. each could contain just one grating line per reflector, that is to say, a single waveguide defect).

The DBRs preferably have equal reflectance over the operating bandwidth of modulator. The reflective values of the gratings are chosen to give a Finesse value that is large enough to create enough cavity round trips to enhance the effect of Δn to sufficiently reduce the amount of drive current or drive voltage needed to perform the modulation with the desired extinction ratio, but small enough to give a cavity lifetime that is less than 1/(bit period).

The Fabry-Perot resonator cavity may include a phase shift region in addition to the modulation region, wherein the phase shift region has a lower speed than the modulation regions.

As with other modulator embodiments described herein, the phase shift region provides a means for cavity FSR tuning and may comprise a p-i-n junction or may comprise a p-n junction.

According to another alternative embodiment, the modulator is a ring resonator.

As compared to Fabry-Perot modulators, ring resonator modulators are advantageously simpler to fabricate, but have tighter fabrication tolerances.

In addition, thermal tuning (heater pads) are preferably required for fine tuning ring resonators themselves are well known in the art. The ring resonator modulator preferably comprise a ring resonator with a semiconductor junction forming an opto-electronic region and, as with previous modulators described above, the semiconductor junction may be a p-n phase tuning region. In this way, the ring resonator is capable of functioning as a modulator by the application of a bias across the p-n junction.

The actual boundary where the p- and n-doped regions of the p-n junction meet is preferably circular and lies along or near the centre of the waveguide track equidistant from the inner and outer waveguide ridges. The n-doped region may be located on the inside of the ring waveguide including the inner half of the ring waveguide itself but also extending inwardly beyond the inner waveguide ridge. The p-doped region may be located on the outside of the ring waveguide, including the outer half of the ring waveguide but also extending outwards beyond the outer waveguide ridge.

In an alternative embodiment, the p-doped region may be located on the inside of the ring waveguide (including the inner half of the ring waveguide itself but also extending inwardly beyond the inner waveguide ridge) and the n-doped region may be located on the outside of the ring waveguide (including the outer half of the ring waveguide but also extending outwards beyond the outer waveguide ridge).

Optionally, the ring resonator comprises a ring-shaped waveguide; a first straight waveguide to couple light into the ring-shaped waveguide; and a second straight waveguide to couple light out of the ring-shaped waveguide. In this case, the transmittance spectrum will form a periodic set of peaks, each peak separated from the adjacent two peaks via a wavelength difference proportional to the free spectral range (FSR) of the ring resonator.

Optionally, the ring resonator comprises a ring-shaped waveguide and a single straight waveguide to couple light both into and out of the ring-shaped waveguide. In this case, the transmittance spectrum will form a periodic set of sharp troughs, each trough separated from the two directly adjacent troughs via a wavelength difference proportional to the free spectral range (FSR) of the ring resonator. As this transmittance spectrum is the inverse of that for the "dual straight waveguide" embodiment, such an arrangement will require an opposite drive signal (bias to be applied across the p-n junction) as compared to the single coupled waveguide version in order to give rise to the same modulation effect.

Where the ring resonator includes first and second coupling waveguides the first straight waveguide is located at one side of the ring-shaped waveguide and the second straight waveguide is located at the opposite side of the ring-shaped waveguide.

Regardless of the mechanism for coupling light in and out of the ring waveguide, the ring resonator modulator preferably includes a fine tuning region in addition to the semiconductor junction. This fine tuning region may be a heater for thermal tuning Such heaters applied to ring resonators are known in the art (see Dong et al. Optics Express, vol. 18, No. 11, 10941, 24 May 2010).

Alternatively, the fine tuning region may include an additional semiconductor junction incorporated into the resonator (i.e. in addition to the p-n junction which controls the high speed modulation).

The ring resonator coupled to two straight waveguides is advantageous over the embodiment with one single straight waveguide in that it does not invert the drive signal (high voltage is 'on'). In addition, because on-resonance gives high transmission, the ring resonator requires less voltage swing for good extinction ratio. However, the addition of a second straight waveguide increases the complexity of the fabrication as well as increasing the amount of metal crossing over the waveguide, therefore increasing not only the optical loss of the working device, but also the potential for complications during fabrication.

In all embodiments, a semiconductor optical amplifier (SOA) may be located within the waveguide platform before the input waveguide which couples light into the detector.

According to a second aspect of the disclosed embodiments, there is provided a detector remodulator for use in a silicon on insulator waveguide platform, the detector remodulator including: a detector; a modulator and an electrical circuit connecting the detector to the modulator; wherein the modulator is a ring resonator modulator.

According to a third aspect of the disclosed embodiments, there is provided a method of manufacturing a detector remodulator on a silicon on insulator platform, the method including the steps of: providing a detector and a first input waveguide which is coupled to the detector; providing a modulator comprising a waveguide having an electro-optical region, a second input waveguide which is coupled to the modulator, and an output waveguide which is also coupled to the modulator; and providing an electrical circuit which electrically connects the detector to the modulator; wherein the detector, modulator, input waveguides and output waveguide are all located within the same horizontal plane as one another; the method further comprising the step of generating a first doped region at one side of the waveguide and a second doped region at the opposite side of the waveguide, the first and second doped region forming a semiconductor junction set horizontally across the modulator waveguide.

The size of the doped regions may be chosen to optimise speed of the device.

The method may further comprise the steps of providing the features described herein in relation to one or more embodiments of the first aspect.

Further optional features of the invention are set out below.

According to a fourth aspect of the disclosed embodiments, there is provided an optoelectronic packet switch comprising: one or more switch input(s) for receiving optical packet signals; a passive optical router having input ports and output ports, the optical paths between which are wavelength dependent; a switch control unit; and a plurality of detector remodulators (DRMs) configured to receive optical signals from the one or more switch input(s) and to generate modulated optical signals for transmission to the input ports of the passive optical router, each detector remodulator (DRM) comprising: one or more detectors for converting an optical packet signal received at the one or more switch input(s) into an electrical packet signal; one or more modulators for generating the modulated optical signals, each modulator configured to: receive a wavelength tuned laser input from a tunable laser; receive the electrical packet signal from one of the detectors; and to generate a modulated optical signal at the tuned wavelength, the modulated optical signal containing the information of the electrical packet signal and the tuned wavelength chosen to select a desired output port of the passive optical router for the modulated optical signal; and an electronic circuit connecting the detector to the modulator; wherein each of the one or more modulators is a separate component from the tunable laser which provides its wavelength tuned laser input; and wherein the switch control unit includes a scheduler which is communicably connected to the electronic circuit of each DRM; the electronic circuit configured to control the generation of the modulated optical signal by the modulator based on scheduling information received from the switch control unit. This control of the generation of the modulated optical signal may include both control of the modulator and control of the carrier wavelength of the resulting modulated optical signal.

In this way, the electronic circuit may include a modulator driver for driving the modulator and a laser wavelength tuner for driving the separate tunable laser. In addition to the scheduler, the switch control unit may also include a central processing unit (CPU) which may perform additional switch control functions.

The electronic circuit may be configured to perform any one or more of the following functions: deciding the wavelength for the tuned laser; deciding the timing at which to send a specific packet through the passive optical router relative to other packets; deciding the modulation rate of the modulated optical signal; and deciding which modulation protocol should be used.

The process of deciding the wavelength may involve a scheduler for determining the route of a particular packet signal and this scheduler may be located in the switch control unit external to the electronic circuit. The electronic circuit may therefore be configured to receive the information from the scheduler and to control the wavelength of the tunable laser based on this information.

According to a fifth aspect of the disclosed embodiments, there is provided a detector remodulator (DRM) comprising: one or more detectors for converting an optical packet signal into an electrical packet signal; one or more modulators, each modulator configured to: receive a wavelength tuned laser input from a tunable laser; receive an electrical packet signal from one of the detectors; and to generate a modulated optical signal at the tuned wavelength, the modulated optical signal containing the information of the electrical signal; and an electronic circuit connecting the detector and modulator, the electronic circuit containing means for controlling the generation of the modulated optical signal based on scheduling information from an external control unit; wherein the modulator is separate component from the tunable laser. Again, the control of generation of the modulated optical signal may include both control of the modulator and control of the wavelength of the resulting modulated optical wavelength.

One or more of the DRMs of the optoelectronic packet switch of the fourth embodiment may therefore correspond to the DRM(s) of the fifth embodiment.

By "separate component" it is envisaged that the modulator may take any form which is exterior to the tunable laser component. This may take the form of a modulator chip which abuts a tunable laser chip or may take the form of a modulator which is physically separated from the tunable laser chip. The modulator and tunable laser may be monolithically integrated but yet physically separated on the floor plan. The optoelectronic packet switch of the disclosed embodiments enables faster switching speeds to be reached as compared to alternatives in which modulation is carried out within the cavity of the tunable laser itself that is, within the cavity created by the reflecting mirrors of the laser.

The modulator of each of the DRMs of the optoelectronic packet switch may take the form of any one of or any combination of the modulators described in this application. For example, the modulator may be an electro-absorption modulator, a Mach-Zehnder modulator, a Fabry-Perot resonator modulator, or a ring-resonator modulator, and may include a modulation region at which a semiconductor junction is set horizontally across the waveguide, and the modulator region may take the form of: an electro-absorption material; or phase-shift region(s) inside a Mach-Zehnder modulator; a Fabry-Perot resonator cavity; or a ring-resonator.

The electronic circuit of one or more of the DRMs may include a packet processor. In this way, header processing of the electrical packet signals generated by the detector is carried out within the DRM.

Alternatively or in addition, the switch control unit may include a packet processor, in this way header processing of the electrical packets generated by the detector may be carried out outside of the DRM in the switch control unit. Where packet processing is carried out in the switch control unit, only a portion of the packets may be sent from each of the DRMs of the optoelectronic switch to the switch control unit and the processing carried out using just these portions. This enables the amount of data required to be sent and received by the DRM to be reduced.

The electronic circuit of the DRM may be configured to transmit information about each electrical packet signal to the scheduler. It may also be configured to receive control information from the scheduler.

The electronic circuit of the DRM may include a wavelength tuner which controls the wavelength of the wavelength tuned laser input based on information received from the switch control unit. In this way, no control of the tunable laser is required outside of the DRM.

The electronic circuit of each DRM may additionally be configured to include a buffer for electrical packet signals. This buffering may be carried out in an SRAM module within the DRM, such an SRAM module being located in-between the detector and the modulator and in communication with any signals sent from the switch control unit to the DRM so that electrical packets corresponding to the scheduled signals are buffered in accordance with the scheduling information.

The electrical circuit of the DRM may be an electronic circuit, for example an Application Specific Integrated Circuit (ASIC). This application specific integrated circuit may be any multi-functional CMOS chip.

Each electronic circuit of a DRM may take the form of a CMOS chip which may include one or more of the following: a receiver circuit, a transimpedance circuit, gain circuitry, signal regeneration circuitry, and a modulator driver. The signal regeneration circuitry may include signal retiming and signal reshaping.

At least a portion of the electronic circuit of each DRM may be an electronics chip in direct contact with a photonic chip which contains the detector and the modulator.

The electronics chip is preferably in close proximity to the detector and/or the modulator in order to maximize the operation speed. To maximize speed, the electronics chip (e.g. a CMOS chip) may be specially mounted for example, flip-chip bonded with low capacitance and low resistance metal connections. Alternatively, the electronics chip could be attached on top of the silicon photonics chip via an interposer or could be monolithically integrated.

The processor and/or other components of the DRM electronic circuit may be integrated into the same CMOS chip as the modulator driver. This helps to optimise speed of the device as well as conserving real estate on the photonic chip.

The detector and the modulator may be in close proximity to one another. Preferably the electrical path between the detector and the modulator is no more than 1 cm, even more preferably, the electrical path is no more than 1 mm, even more preferably the electrical path is no more than 100 μm.

Advantageously, from the user's point of view, the optoelectronic switch appears to be "all optical" despite the fact that processing and scheduling are carried out in the electrical domain.

The detector is preferably a photodetector (e.g. a photodiode) although it could take the form of any receiver suitable for detecting the input signal. It may for example include a burst mode receiver.

The passive optical router may be an AWG such as a cyclic AWG.

The switch architecture may take the form of a Clos network.

Each DRM may be configured to split an input optical packet signal into a plurality of separate streams which are processed by the electronic circuit of the DRM in parallel.

Each DRM may support one or more standard protocols, for example: 1G, 2.5G, 10G, 25G, 40G, 100G Ethernet, and similar rates for InfiniBand, PCI Express, SATA, and USB.

Each DRM may be configured to have a specific interface to the packet scheduler of the switch control unit. For example, the scheduler and multiple DRMs could all be located on the same electrical circuit chip. Alternatively the scheduler and/or the electrical DRM circuit could be a network-on-chip standard such as ARM AMBA. Or the scheduler and the electrical circuits of one or more of the DRMs could be physically separated and connect to one another for example by way of a PCI Express.

Each DRM may include a plurality of ports (e.g. 4 input ports and 4 output ports) and will include detector-modulator pairs so that there is the same number of detectors as there are modulators.

Each packet of data which enters a port may be split into a plurality of lanes which may be processed in parallel. The plurality of lanes may be 4 or more lanes but may be any number, N of lanes. Where there are four lanes, each lane may form a 25G stream of data.

The electronic circuit of the DRM may further comprise one or more buffers which may be made of SRAM.

The detector and modulator of each detector remodulator may be located adjacent one another on a single optical chip.

According to a sixth aspect of the disclosed embodiments there is provided a method of optical packet switching using a passive optical router having a plurality of input ports and a plurality of output ports, the method comprising the steps of:

providing an optoelectronic packet switch comprising: one or more switch input(s) for receiving optical packet signals; a passive optical router having input ports and output ports, the optical paths between which are wavelength dependent; a switch control unit; and a plurality of detector remodulators configured to receive the optical input signals and to generate modulated optical signals for transmission to the input ports of the passive optical router;

receiving at one or more of the detector remodulators an optical packet signal from the one or more switch input(s);

converting each optical packet signal received into an electrical packet signal using one or more detectors of the one or more detector remodulators;

receiving at the one or more detector remodulators a wavelength tuned laser input from a separate wavelength tunable laser; and generating at a modulator of the one or more detector remodulators a modulated optical signal at the tuned wavelength, the modulated optical signal containing the information of the electrical packet signal and having a wavelength chosen to result in a desired output port of the passive optical router;

wherein the modulator is controlled via an electronic circuit which connects it to one of the one or more detectors and which controls the modulation process based on scheduling information received from the switch control unit.

The step of controlling the modulation process at the electronic circuit may also include the step of controlling the tuned wavelength of the separate wavelength tunable laser. This step may include determining at a scheduler in the switch control unit a route for a packet signal. Information concerning the route chosen may be sent from the switch control unit and received by the electronic circuit of the detector remodulator which then controls the wavelength of the tunable laser based on this information.

The optional features described above in relation to the optoelectronic packet switch of the fourth aspect and DRM of the fifth aspect may all be provided as a step of the method of the sixth aspect.

According to a seventh aspect of the disclosed embodiments, there is provided an optoelectronic circuit switch comprising: one or more switch input(s) for receiving optical input signals; a passive optical router having input ports and output ports; a switch control unit; and a plurality of detector remodulators (DRMs) configured to receive optical signals from the switch input(s) and to generate modulated optical signals for transmission to the input ports of the passive optical router, each detector remodulator (DRM) comprising: one or more detectors for converting each optical signal received at the switch input(s) into an electrical signal; one or more modulators for generating the modulated optical signals, each modulator configured to: receive a wavelength tuned laser input from a tunable laser; receive the electrical signal from one of the detectors; and to generate a modulated optical signal at the tuned wavelength, the modulated optical signal containing the information of the electrical signal and the tuned wavelength chosen to select a desired output port of the passive optical router for the modulated optical signal; and an electronic circuit connecting each of the one or more detectors to a corresponding modulator; wherein each of the one or more modulators is a separate component from the tunable laser that provides its wavelength tuned laser input; and wherein the switch control unit is communicably connected to the electronic circuit of each DRM, the electronic circuit configured to control the generation of the modulated optical signal by the modulator based on control information received from the switch control unit.

In this way, an optoelectronic switch is provided which behaves as an optoelectronic circuit switch and enables faster switching speeds to be reached as compared to alternatives in which modulation is carried out in the cavity of the tunable laser itself, and as compared to other conventional circuit switches based on other switching technologies such as MEMS or liquid crystal.

The optional features described above in relation to the optoelectronic packet switch of the fourth aspect and the detector remodulator of the fifth aspect are applicable to the optoelectronic circuit switch in that optical signals may be converted and switched in the same way as optical packet switches with the exception that there is no requirement for any features that are specific to packet information such as packet scheduling, packet processing, or packet buffering. Where information is not being sent as packets, the presence of buffers is less important although buffers may still be present in the electrical circuit of an optoelectronic circuit switch in order to delay some optical signals relative to others to resolve contention (blocking).

According to an eighth aspect of the disclosed embodiments, there is provided a silicon-on-insulator chip including the optoelectronic switch of any one of the fourth or seventh aspect or the detector remodulator of the fifth aspect.

The passive optical router of the switch may be an arrayed waveguide grating (AWG) located in the same optical plane as the DRMs.

In "the same optical plane" should be interpreted as each device (DRM and AWG) being located in a planar arrangement i.e. the same layer of the semiconductor chip such that the modulators or modulators and detectors of said DRMs are located within the same plane as the waveguides of the AWG; each DRM being located at an input or an output of the AWG.

A DRM may be located at one or more inputs of the AWG and one or more outputs of the AWG. A DRM may be located at each input of the AWG and at each output of the AWG.

Optionally, the signal input waveguide for one or more of the DRMs lies within the plane of the AWG.

Optionally, the signal input waveguide for one or more of the DRMs impinges the modulator of the DRM from an angle to the plane of the waveguides of the AWG.

Where the electrical circuit of the DRM is an electronic circuit, such as an ASIC, it may be flip chip mounted onto the silicon-on-insulator chip.

The silicon-on-insulator chip may further comprise one or more tunable lasers, each tunable laser for providing a wavelength tuned laser input to the modulator of a respective one or more of the DRMs, the one or more tunable lasers located on the same chip as the DRMs, the passive optical router, and at least a portion of the electrical circuit of the DRM.

In one arrangement, the one or more tunable lasers and the one or more DRMs may be integrated onto a single optical chip but the passive optical router may form a separate component which is in optical connection with the inputs or outputs of the one or more DRMs.

The one or more tunable lasers may be located within the same plane as the DRM and the AWG and the tunable laser may be thermally isolated from the AWG and DRM to prevent undesirable heating of the AWG and DRM by the tunable lasers.

A DRM with a tunable laser providing the wavelength tuned input light for its modulator may be located at each input of the AWG and/or at each output of the AWG.

In one embodiment of the silicon-on-insulator chip, the chip comprises, in a planar arrangement: a first AWG having a plurality of inputs and a plurality of outputs; a first array of DRMs located at the input of the first AWG, each DRM in the first array having a wavelength tunable laser input; the first array of DRMs arranged such that the output of each DRM in the first array forms an input signal for each input port of the first AWG; a second AWG having a plurality of inputs and a plurality of outputs; a second array of DRMs located at the input to the second AWG; each DRM in the second array having a wavelength tunable laser input; the second array of DRMs arranged such that the output of each DRM in the second array forms an input signal for each input port of the second AWG; wherein each output of the first AWG forms an input signal for a respective DRM of the second array of DRMs.

The first and second AWGs may take the shape of elongated arcs and may be located in an end-to-end arrangement on the planar chip. In this way the two AWGs form successive arcs which lie one after another along an elongate direction thereby enabling the chip itself to take an elongate shape.

Alternatively, the first and second AWGs may be positioned in a nested arrangement within the plane of the waveguides. In this way, the first arch tessellates with the second arch.

The first AWG may have a smaller arc than the second AWG; such that the first AWG may be nested underneath the arc of the second AWG (but still within the plane of the waveguides).

In another embodiment, a single tunable laser could be configured to feed unmodulated light for the wavelength tuned inputs into multiple DRMs.

In one embodiment, the silicon-on-insulator chip may comprise, in a planar arrangement: a first array of DRMs; each DRM located at an input waveguide of the AWG, and each DRM coupled to a tunable laser which provides the wavelength tuned input for its modulator; a second array of DRMs; each DRM located at an output waveguide of the AWG and each DRM coupled to a tunable laser which provides the wavelength tuned light input for its modulator; an optical demultiplexer, the output of which forms the input signals for the first array of DRMs; and an optical multiplexer, the inputs for which are the outputs of the second array of DRMs.

The silicon-on-insulator chip may include an array of detector remodulators (DRMs) in a planar arrangement with an array of tunable lasers, each tunable laser forming a wavelength tuned input of a respective DRM.

There is provided a data centre network including the silicon-on-insulator chip or switch of any one of the previous claims.

An alternative switch is envisaged in which the interface input and/or output of the switch is electrical. In such a case, the detector would not be required. For example, as an alternative there could be provided: a switch comprising: one or more switch input(s) for receiving input signals; a passive optical router having input ports and output ports, the optical paths between which are wavelength dependent;
a switch control unit; and
a plurality of receiver/modulation units configured to receive electrical signals from the one or more switch input(s) and to generate modulated optical signals for transmission to the input ports of the passive optical router, each receiver/modulation unit comprising:
one or more receivers for receiving electrical switch input(s);
one or more modulators for generating the modulated optical signals, each modulator configured to: receive a wavelength tuned laser input from a tunable laser; receive the electrical signal from one of the receivers; and to generate a modulated optical signal at the tuned wavelength, the tuned wavelength chosen to select in a desired output port of the passive optical router and the modulated optical signal containing the information of the electrical packet signal; and an electronic circuit connecting the receiver to the modulator; wherein each of the one or more modulators is a separate component from the tunable laser that provides its wavelength tuned laser input; and wherein the switch control unit includes a scheduler which is communicably connected to the electronic circuit of each receiver/modulation unit; the electronic circuit configured to control the generation of the modulated optical signal by the modulator based on scheduling information received from the switch control unit.

One advantage of all of the optoelectronic switches described herein is the fact that no electrical switches (and therefore no transceivers) are required as in conventional architecture such as that shown in FIG. 14.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE DISCLOSED EMBODIMENTS

Figure 1:
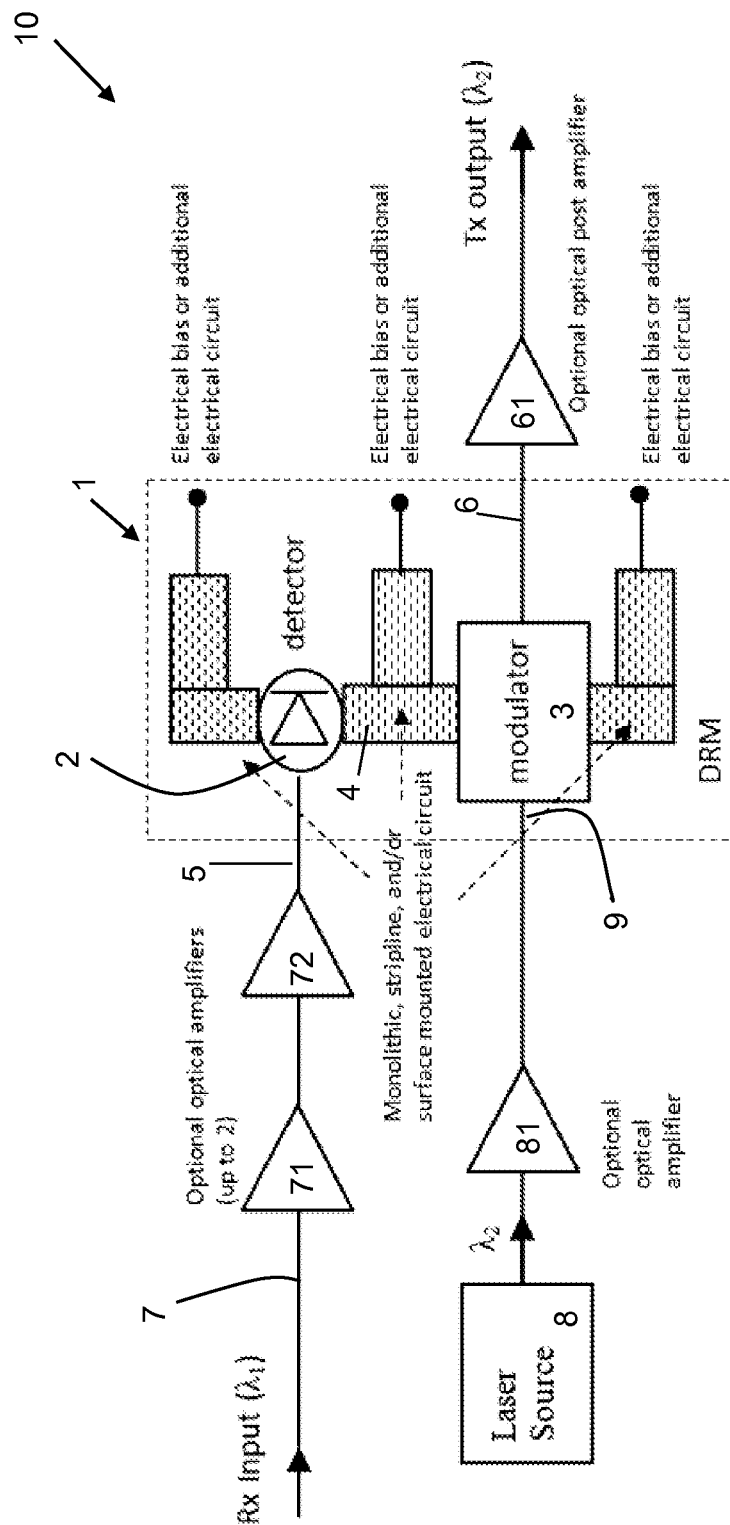
FIG. 1 shows a schematic circuit diagram of a wavelength conversion chip including a detector remodulator.

FIG. 1 shows a conversion chip 10 including a detector remodulator (DRM) 1. The detector remodulator 1 comprises a silicon on insulator (SOI) waveguide platform which includes: a detector 2, a modulator 3 and an electrical circuit 4 which electrically connects the detector to the modulator. The detector 2 is coupled to an input waveguide 5 and the modulator 3 is coupled to an output waveguide 6.

The detector 2, modulator 3, input waveguide 5 and output waveguide 6 are arranged within the same horizontal plane as one another within the SOI waveguide platform. In the embodiment shown, a portion of the electrical circuit is located directly between the detector and the modulator.

The conversion chip includes a waveguide for a (modulated) first optical signal 7 of a first wavelength $\lambda_1$. In the embodiment shown in FIG. 1, the waveguide is coupled to the input waveguide 5 of the detector 2 via a first and second optical amplifier 71, 72, although in an alternative embodiment (not shown) the first optical signal may be directly coupled to the input waveguide 5 of the detector. The detector converts the modulated input signal into an electrical signal which is then applied to the modulator via the electrical circuit 4.

The conversion chip also includes a waveguide for an unmodulated optical input 8 corresponding to a second wavelength $\lambda_2$. This waveguide is coupled to an input waveguide 9 of the modulator 3 via an optical amplifier 81 (although may alternatively be directly coupled to input waveguide 9). The input waveguide 9 of the modulator also forms a part of the DRM and is oriented along the horizontal plane which includes the detector and modulator as well as the detector input waveguide and modulator output waveguide.

The electrical signal from the electrical circuit 4 will modulate the (unmodulated) optical input 8 thereby generating a modulated optical signal of the second wavelength $\lambda_2$ which is outputted by the modulator via the modulator output waveguide 6. This modulated output of the second wavelength may then me amplified via an optical amplifier 61 coupled to the modulator output waveguide 6.

A power monitor may be present (not shown).

Examples of detectors, electrical circuit components and modulators that can form part of embodiments of the DRM 1 shown in FIG. 1 are described below in relation to FIGS. 2 to 12 where like reference numbers are used to refer to features described above in relation to FIG. 1.

Figure 2:
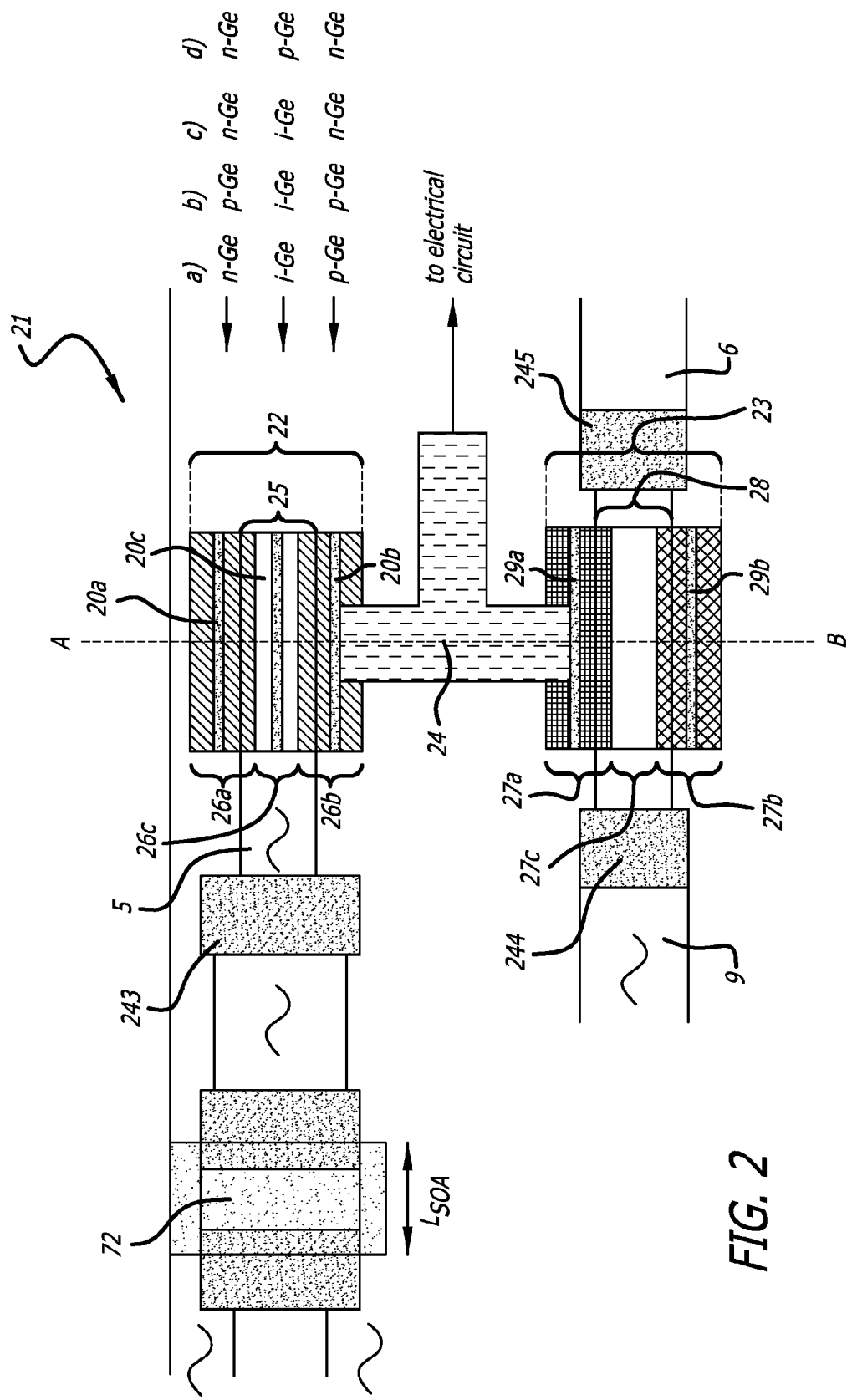
FIG. 2 shows a schematic top view of a silicon on insulator detector remodulator comprising an EAM modulator.

FIG. 2 shows a top view first embodiment of a DRM 21 in which the modulator 23 is an electro-absorption modulator (EAM). The DRM 21 of FIG. 2 includes a detector 22, modulator 23 and electrical circuit, a portion of which 24 is located between the detector and the modulator.

The detector 22 is made up of a bulk semiconductor material, in this case germanium, and includes waveguide portion 25 across which the semiconductor junction of the detector is set horizontally. The horizontal semiconductor junction of the detector 22 is made up of three regions: a first doped region 26a, a second doped region 26b and a third region 26c between the first and the second doped regions. This third region may be an intrinsic region or may also be doped.

In the variation of this embodiment shown in FIG. 2 (and labelled as option a)), the first region is an n-type region; the second region is a p-type region; and the third region is an intrinsic region, such that the semiconductor junction of the detector 22 is a p-i-n junction.

In other variations, the first, second and third regions may instead form a p-i-p; n-i-n or n-p-n junction (as shown as options b)-d) in FIG. 2). In each of these three variations, the detector functions as a phototransistor.

In the embodiment shown in FIG. 2, the first doped region (in this case a p-type region) 26a is located at one side of the waveguide 25 of the detector and extends into the waveguide past the waveguide walls. The second doped region (in this case an n-type region) 26b is located at the opposite side of the waveguide to the first region and also extends into the waveguide 25 of the detector. The third region 26c corresponding to the intrinsic part of the p-i-n junction therefore has a width along the horizontal plane which is less than the width w of the waveguide of the detector.

A first electrode for applying a bias to the first doped region is located above the first doped region, a second electrode for applying a bias to the second doped region is located above the second doped region, and a third electrode for applying a bias to the third region is located above the third region. In all three cases, the electrodes are located directly on top of the relevant doped region.

The electro-absorption modulator 23 of the DRM also has a modulation waveguide region in the form of an amplitude modulation region at which a semiconductor junction is set horizontally across the waveguide. The modulator 23 is made up of a bulk semiconductor material, in this case doped silicon germanium (SiGe), and includes waveguide portion 28 across which the semiconductor junction of the detector is set in horizontally. The horizontal semiconductor junction of the modulator 23 is made up of three regions: a first doped region 27a, a second doped region 27b and a third region 27c between the first and the second doped regions.

In the embodiment shown, the first doped region (in this case a p-type region) 27a is located at one side of the waveguide 28 of the modulator and extends into the waveguide past the waveguide walls. The second doped region (in this case an n-type region) 27b is located at the opposite side of the waveguide to the first region and also extends into the waveguide 28 of the detector. The third region 27c corresponding to the intrinsic part of the p-i-n junction therefore has a width along the horizontal plane which is less than the width of the waveguide of the modulator.

In an alternative embodiment (not shown) the doped region may include a plurality of doped regions (e.g. a total of 5 regions including p+, p, intrinsic, n and n+, or even a total of 7 regions including p++, p+, p, intrinsic, n, n+ and n++).

A semiconductor optical amplifier (SOA) is located within the waveguide platform before the input waveguide which couples light into the detector.

The modulator 23 includes a first waveguide transition region 244 between the modulator input waveguide 9 and the modulation waveguide region at which the semiconductor junction is set horizontally across the waveguide. The modulator also includes a second transition region 245 between the modulation waveguide region and the modulator output waveguide 6.

At the first transition region 244, the waveguide height and/or width are reduced from larger dimensions to smaller dimensions, and at the second transition region 245, the waveguide height and/or width are increased from smaller dimensions to larger dimensions. In this way, the waveguide dimensions within the modulator are smaller than those of the input and output waveguides. This helps to improve the operation speed of the modulator (although it does so at the expense of higher losses).

The detector 22 includes a transition region 243 between the input waveguide 5 of the detector and the actual waveguide of the detector at which the height and/or width of the waveguide are reduced from larger dimensions to smaller dimensions. In this way, the waveguide dimensions within the detector are smaller than the input waveguide which helps to improve the operation speed of the detector.

A portion of the electrical circuit 24 is located between the second doped region of the detector and the first doped region of the modulator forming an electrical connection between the detector and the modulator. Cross sectional views of different configurations for this connecting portion taken through line A-B of FIG. 2 are shown in FIGS. 3a-d. In the configuration shown in FIG. 3a the connecting portion of the electrical circuit is stripline circuit 221 in the form of a metal strip, the metal strip extending from the electrode on top of the second doped region of the detector to the electrode on top of the first doped region of the modulator. The second doped region of the detector and the first doped region of the modulator are separated by a given distance d, and the in-plane space between the detector and modulator doped regions can be kept as silicon or Ge or SiGe or can be filled with insulating dielectric material 225 such as $SiO_2$. The metal strip forms a connection above this insulating filler.

Figure 3A:
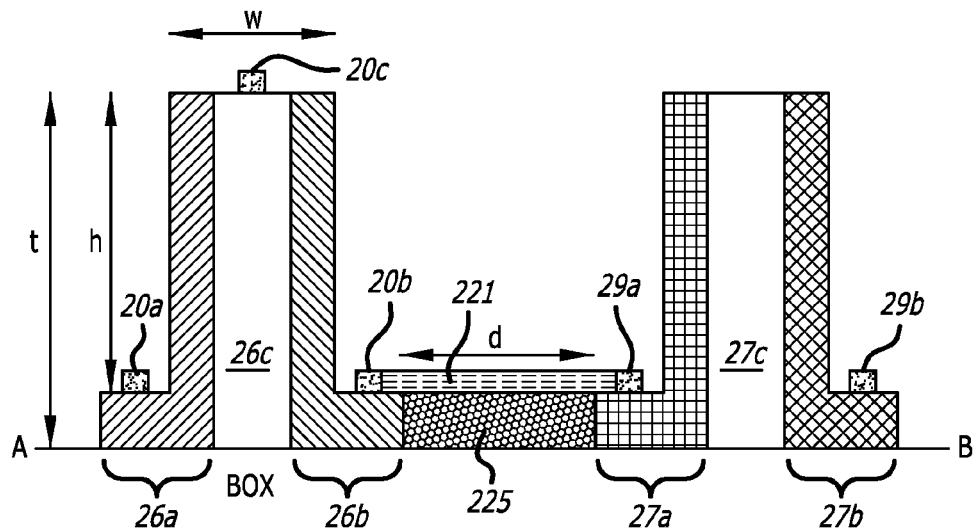
FIG. 3a shows a cross sectional view of the detector remodulator taken along the line A-B of FIG. 2, wherein the electrical circuit includes a metal strip.
Figure 3B:
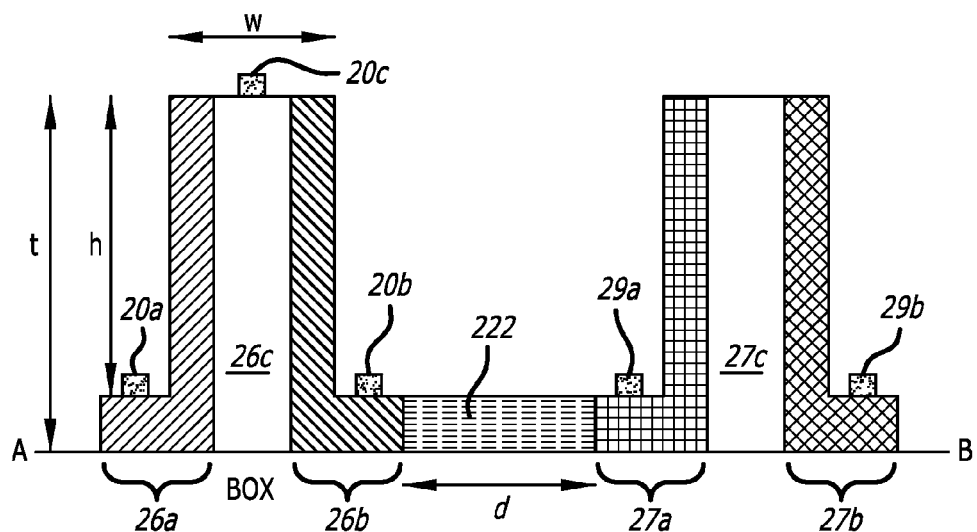
FIG. 3b shows a cross sectional view of the detector remodulator taken along the line A-B of FIG. 2, wherein the electrical circuit includes a monolithic doped conductor.
Figure 3C:
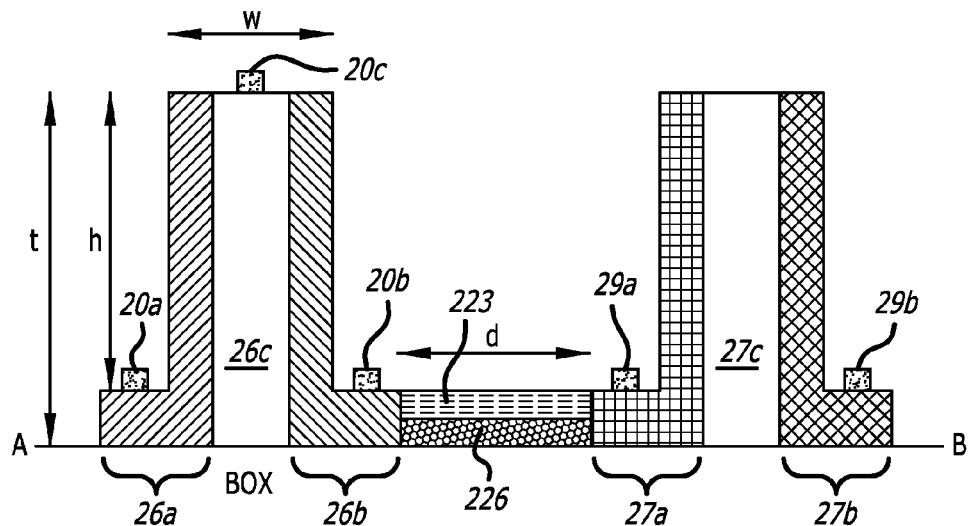
FIG. 3c shows another cross sectional view of the detector remodulator taken along the line A-B of FIG. 2, wherein the electrical circuit includes a monolithic doped conductor.
Figure 3D:
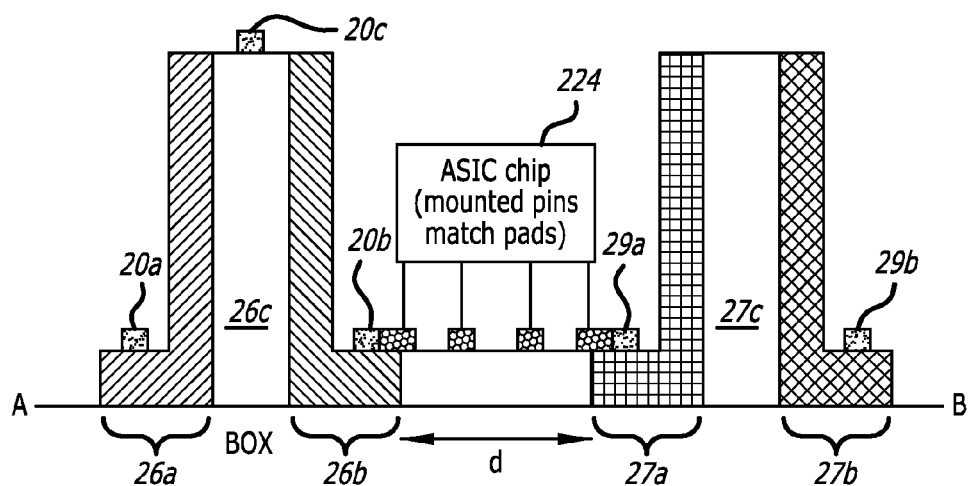
FIG. 3d shows a cross sectional view of the detector remodulator taken along the line A-B of FIG. 2, wherein the electrical circuit includes a surface mounted chip.

In the variations shown in FIGS. 3b and 3c, the electrical circuit is a monolithic doped conductor 222, 223. This conductive layer may extend the entire depth of the platform thickness down to the box level (i.e. t-h) as shown in FIG. 3b or may extend for only part of the platform thickness as shown in FIG. 3c, in which case an insulating layer 226 is located underneath the monolithic layer. In another variation shown in FIG. 3d, the connecting portion of the electrical circuit 224 is a surface mounted chip such as an Application Specific Integrated Circuit (ASIC) in which case, conductive pads are located on the platform such that they match up with the pins of the chip.

As can be seen from the cross sections in FIGS. 3a-d, the doped regions extend into the detector waveguide and modulator waveguide and do so throughout the entire ridge height h of the waveguides.

Figure 4:
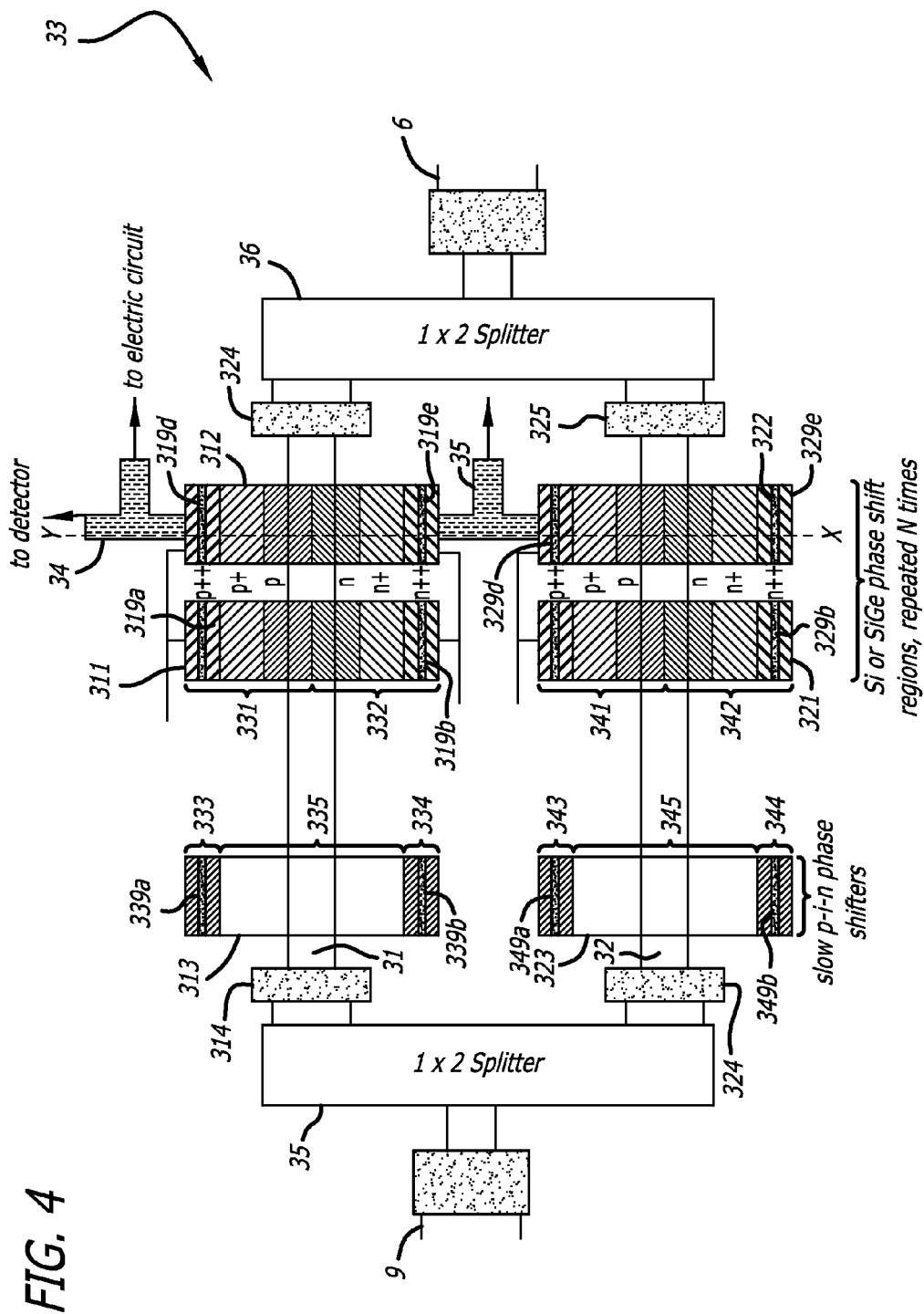
FIG. 4 shows a schematic top view of an alternative modulator in the form of a Mach-Zehnder modulator.

An alternative modulator is described below in relation to FIGS. 4 and 5. This modulator can replace the EAM in the embodiment shown in FIG. 2 to form an alternative DRM, where the remaining features and options of the DRM (other than the EAM) described in relation to FIG. 2 still apply. In this alternative DRM embodiment, the modulator is a Mach-Zehnder modulator 33.

The Mach-Zehnder modulator is made up of two waveguide branches forming a first interferometric arm 31 and a second interferometric arm 32; each arm including one or more phase shift modulation regions. In fact, in the embodiment shown, each arm contains a plurality of phase shift modulation regions 311, 312, 321, 322 (two of which are shown in each arm) as well as an additional phase shift region 313, 323.

Each modulation region is a phase modulation region made up of a bulk semiconductor material which has been doped to form a horizontal semiconductor junction in the form of a p-n junction (although an alternative semiconductor junction in the form of a horizontal p-i-n junction would be viable). The p-n junction is made up of a p-type region 331, 341 and an n-type region 332, 342. The p-type regions are each graded into three layers of varying different doping strengths: p, p+ and p++ and the n-doped regions are also graded into three layers of varying doping strengths n, n+ and n++ arranged so that the p and n layers overlap the arm waveguide and so that the p++ and n++ layers are furthest away from the waveguide. Electrodes are located directly above the outward-most doped regions. In particular, the electrodes are located directly above the p++ and n++ layers of the doped regions. Suitable bulk semiconductor material for the modulation region includes SiGe or homogeneous silicon.

The graded p-n junction structure extends the size of the horizontal junction and enables electrodes which apply a bias to the doped regions to be placed advantageously away from the ridge. Each extra pair of layers results in further spaced electrodes as the electrodes are preferably located directly over the most heavily doped regions. This increase in separation of the electrodes gives rise to an increased flexibility of the device design without compromising speed.

Doping of a bulk semiconductor material to form an electro-optical region is known in the art, both in the case of modulators and also detectors. In all of the devices described herein, the doping concentrations used would correspond to typical values found in the state of the art. For example, the doped regions of the detector may include regions with concentrations of up to $10 \times 10^{19}$ $cm^{-3}$. Doped regions of the modulator may take typical values of $10 \times 10^{15}$ $cm^{-3}$ to $10 \times 10^{17}$ $cm^{-3}$ for p doped regions and $10 \times 10^{15}$ $cm^{-3}$ to $10 \times 10^{18}$ $cm^{-3}$ for n doped regions. However, doped regions (p and/or n) may have higher values of as much as $10 \times 10^{20}$ $cm^{-3}$ or $10 \times 10^{21}$ $cm^{-3}$.

The additional phase shift region has a lower speed than the modulation regions so may be made of an alternative material such as homogeneous silicon. In the embodiment shown, the additional phase shift region comprises a horizontal semiconductor junction in the form of a p-i-n junction, the p and n doped regions of which do not extend into the waveguide of the first or second waveguide arm. In fact, the intrinsic regions 335, 345 extend beyond the boundary. Electrodes 339a, 349a which apply a bias to the p-doped regions are located directly above the respective p-doped regions 333, 343 and electrodes 339b, 349b which provide a bias to the n-doped regions are located directly above the n-doped regions 334, 344.

The electrodes above both the modulation regions and phase shift regions are strips which lie along the length of the doped region (along a direction parallel to the longitudinal axis of the waveguide). It is desirable for the electrodes to have as much contact with the respective doped regions as possible whilst also retaining the small sizes that are advantageous to speed of modulation.

An input 1×2 coupler couples unmodulated light from the input waveguide 9 into the two arms of the modulator and an output 2×1 coupler couples the light from the two arms into the output waveguide 6 to form a modulated output signal having the same wavelength as the unmodulated input signal. High-speed Mach-Zehnder modulators are known to the person skilled in the art and may take the form of the Mach-Zehnder modulators described by Dong et al., Optics Express p. 6163-6169 (2012) or D. J. Thompson et al, Optics Express pp. 11507-11516 (2011). The phase difference between modulated light exiting the first arm and modulated light exiting the second arm will affect the interference pattern generated (in time) when light from the two arms combine, therefore altering the amplitude of the light in the output.

Each arm includes a waveguide transition region 314, 324 between the input 1×2 coupler and the phase shift region and another waveguide transition region 315, 325 between the modulation regions and the output 2×1 coupler. In this way, the waveguide dimensions within the resonator modulator can be smaller than those of the input and output waveguides. This helps to improve the operation speed of the modulator (although it does so at the expense of higher losses).

A central electrical circuit 35 (which is an extension of the DRM electrical circuit) is located between the modulation regions of one arm and the modulation regions of the second arm. This circuit is required where the respective modulation regions of the two arms of the MZM are driven in series in a single drive condition or in a dual drive condition. The nature of this central electrical circuit 35 will control both whether the MZM is single drive or dual drive, but also whether the two arms are driven in series or in parallel.

Figure 5:
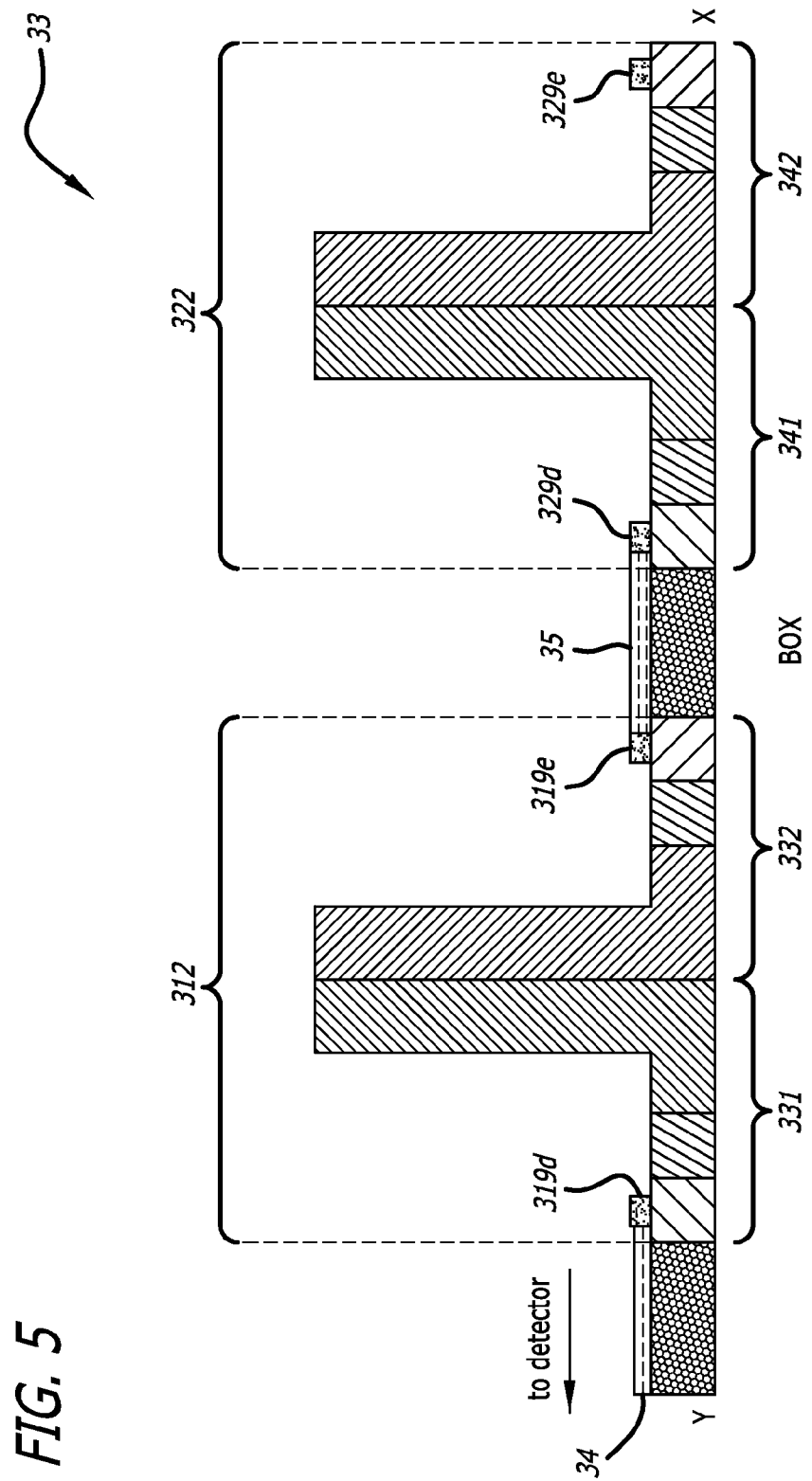
FIG. 5 shows a side view of the modulator of FIG. 4 taken along the line X-Y of FIG. 4.

The electrical circuit connection 34 between the M-Z modulator and the detector (detector not shown) and the central circuit connection 35 between modulation regions in the two arms can each take the form of any one of the electrical circuit connections described above in relation to FIGS. 3a to 3d but is depicted in FIG. 5 as a stripline circuit in the form of a single metal strip with insulating filler material located underneath the strip. In addition to this electrical connection, the Mach-Zehnder modulator includes a further electrical connection 35 located between a phase modulating region of the first arm 310 and a corresponding phase modulating region in the second arm 320 to connect an electrode 319e over an n++ doped region of the phase modulating region 312 of the first arm 310 with an electrode 329d over a p++ doped region of the corresponding phase modulating region 322 of the second arm. A further alternative modulator is described below with reference to in FIGS. 6, 7 and 8. This modulator can replace the EAM in the embodiment shown in FIG. 2 to form a further alternative DRM, where the remaining features and options of the DRM (other than the EAM) described in relation to FIG. 2 would still apply. In this alternative DRM embodiment, the modulator is a Fabry-Perot (F-P) resonator modulator 43.

The F-P resonator modulator 43 is formed in a single waveguide section by two reflectors in series with one or more modulation regions 411, 412, 413 located between the two reflectors. In the embodiment shown in FIG. 6, the reflectors take the form of Distributed Bragg Reflectors (DBRs) DBR1, DBR2.

Figure 6:
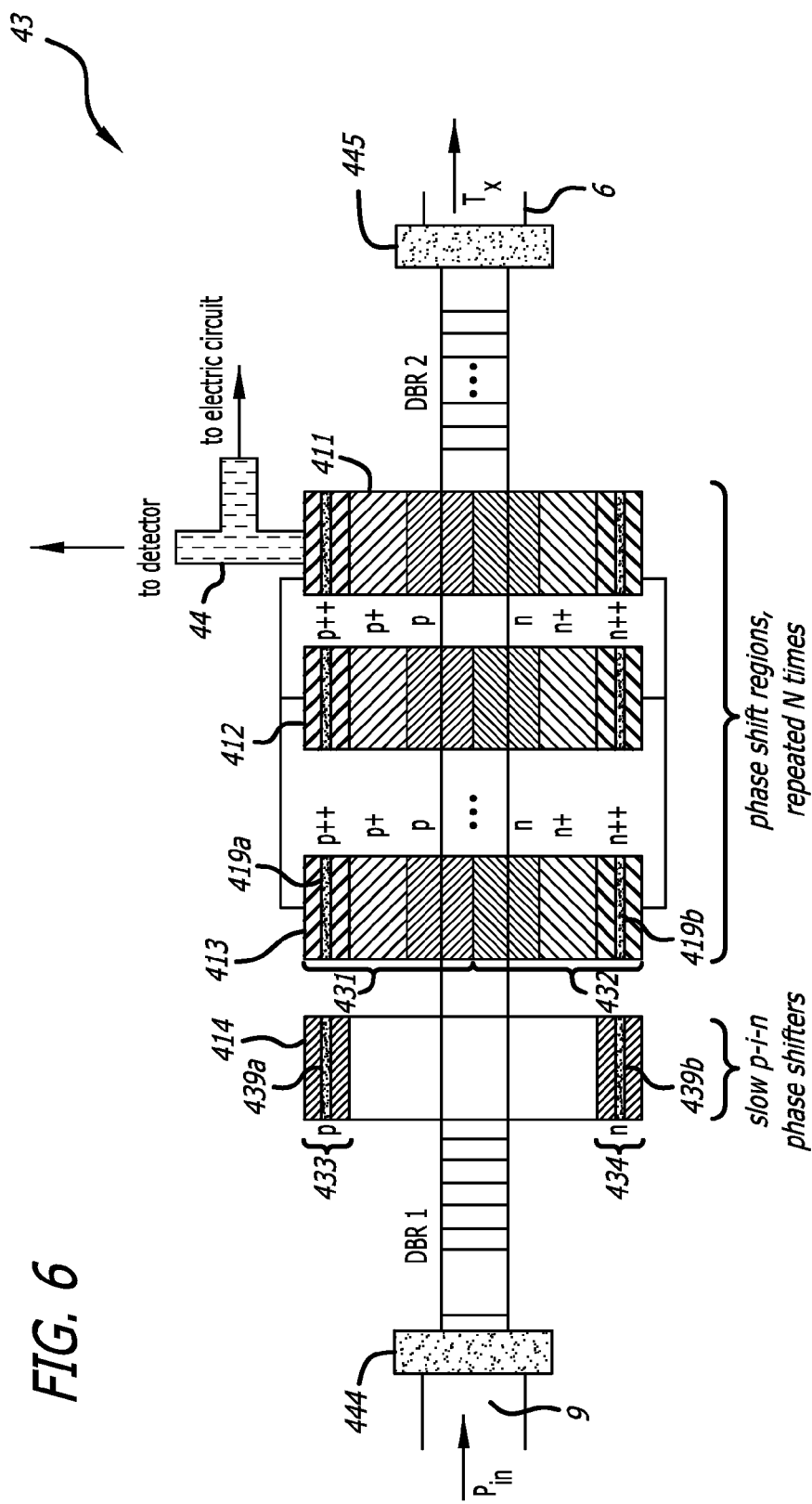
FIG. 6 shows a schematic top view of an alternative modulator in the form of a Fabry-Perot resonator modulator.

The Fabry-Perot resonator cavity shown in FIG. 6 actually includes a plurality of modulation regions 411, 412, 413 (3 of which are shown). These are formed in a bulk semiconductor medium and comprise a p-n junction the same as those of the modulation regions described above in relation to FIG. 4.

Each modulation region 411, 412, 413 is made up of a bulk semiconductor material which has been doped to form a horizontal semiconductor junction in the form of a p-n junction (although an alternative semiconductor junction in the form of a horizontal p-i-n junction would also be viable). Each p-n junction is made up of a p-type region 431 and an n-type region 432. The p-doped regions are each graded into three layers of varying different doping strengths: p, p+ and p++; and the n-doped regions are also graded into three layers of different doping strengths n, n+ and n++. These layers are arranged so that the p and n layers overlap the waveguide, followed by the p+ and n+ layers and the p++ and n++ layers so that the p++ and n++ layers are furthest away from the waveguide. Electrodes are located directly above the outward-most doped regions. In particular, the electrodes are located directly above the p++ and n++ layers of the doped regions. Suitable material for the modulation region includes SiGe or homogeneous silicon.

The Fabry-Perot resonator cavity also includes an additional phase shift region 414 with a lower speed of operation than the modulation regions. As with the phase shift regions described above in relation to the Mach-Zehnder modulator, the function of this phase shift region 414 is to provide low speed cavity FSR fine tuning and therefore operating wavelength fine-tuning and thermal drift compensation. The phase shift region is shown in FIG. 6 as a p-i-n semiconductor junction operating in a carrier injection mode (but could alternatively comprise a p-n phase shift region operating in a carrier depletion mode). As with the p-i-n phase shift regions described above, the p and n doped regions do not extend into the waveguide of the first or second waveguide arm. In fact, the intrinsic regions extend beyond the boundary. Electrodes 439a which apply a bias to the p-doped regions are located directly above the respective p-doped regions 433 and electrodes 439b which provide a bias to the n-doped regions are located directly above the n-doped regions 434.

The electrodes above both the modulation regions and phase shift regions are strips located over the doped regions and lie along the length of the doped region (along a direction parallel to the longitudinal axis of the waveguide). The electrodes lie along the entire length of the doped regions (length parallel to the longitudinal axis of the waveguide) because is desirable for the electrodes to have as much contact with the respective doped regions as possible whilst also retaining the small sizes (small thicknesses) that are advantageous to speed of modulation.

An electrical circuit connection 44 between the F-P modulator and the detector (detector not shown) can take the form of any one of the electrical circuit connections described above in relation to FIGS. 3a to 3d.

The F-P resonator is a resonant F-P filter (also infinite-impulse-response, or IIR filters) which increases the modulation tuning efficiency at the expense of tuning speed, increased temperature sensitivity, and increase manufacturing complexity due to the need for inclusion of the DBR gratings. In an IIR filter, the effect of the index change induced by the phase shifter is enhanced by the number of round-trips in the resonator cavity, thus a smaller injected current density (in the carrier injection case) or bias voltage (in the carrier depletion case) is needed to perform modulation with the same extinction ratio. Thus less optical or electrical amplification would be needed to perform the modulation as compared to the EAM and M-Z embodiments previously described. However manufacturing complexity and tolerances are increased because to reach high modulation speeds of 25 or 40 Gb/s, the photon lifetime of the cavity must be kept small (in addition to the requirement to make a high-speed phase modulator) meaning the cavity length must be short and the Finesse sufficiently low. Therefore the fabrication and design complexity is high due to the need to incorporate DBR gratings with potentially short lengths and deep etch depths.

The F-P modulator includes a waveguide transition region 444 between the input waveguide 9 and the first DBR and another waveguide transition region 445, between the second DBR and the output waveguide. At the first transition region 444, the waveguide height and width are reduced, and at the second transition region, the waveguide height and width are increased. In this way, the waveguide dimensions within the cavity are smaller than those of the input and output waveguides. This can be used to help to improve the operation speed of the modulator (although it does so at the expense of higher losses).

Figure 7:
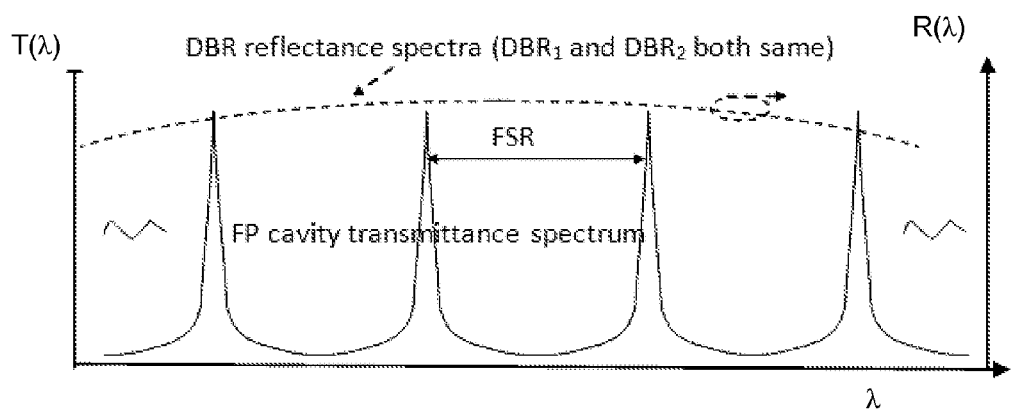
FIG. 7 shows an example drawing of a transmittance spectrum for the Fabry-Perot resonator modulator.

Modulation of the resonator is described below in relation to FIGS. 7 and 8. Referring to the reflectance spectra of FIG. 7, it is clear that DBR gratings DBR1 and DBR2 are broad-band reflectors which have equal reflectance over the operating bandwidth of the tunable laser. The reflectance values R1 and R2 are chosen to give a Finesse value that is large enough to create enough cavity round trips to enhance the effect of Δn (a sufficient X factor of the resonator) to sufficiently reduce the amount of drive current or voltage needed to perform the modulation with the desired extinction ration, but small enough to give a cavity lifetime that is still <1/(bit period). The transmittance of the resonator preferably has a maximum value of between 0.8 and 1 and may be 0.8 as shown in FIG. 7.

Figure 8A:
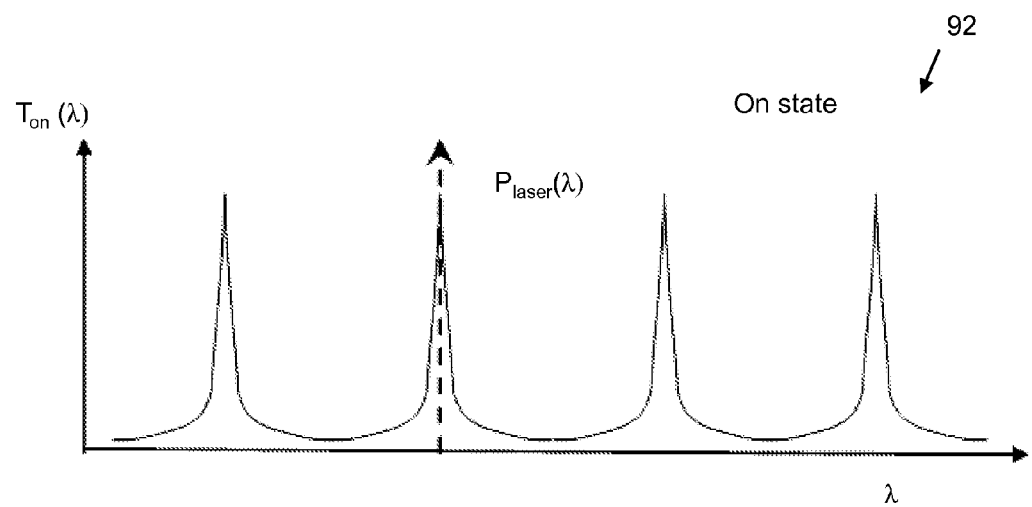
FIG. 8a shows a peak in the transmittance spectrum of the Fabry-Perot resonator tuned to the laser emission wavelength ("on state") and FIG. 8b shows a peak in the transmittance spectrum of the Fabry-Perot resonator de-tuned from the laser emission wavelength ("off state")
Figure 8B:
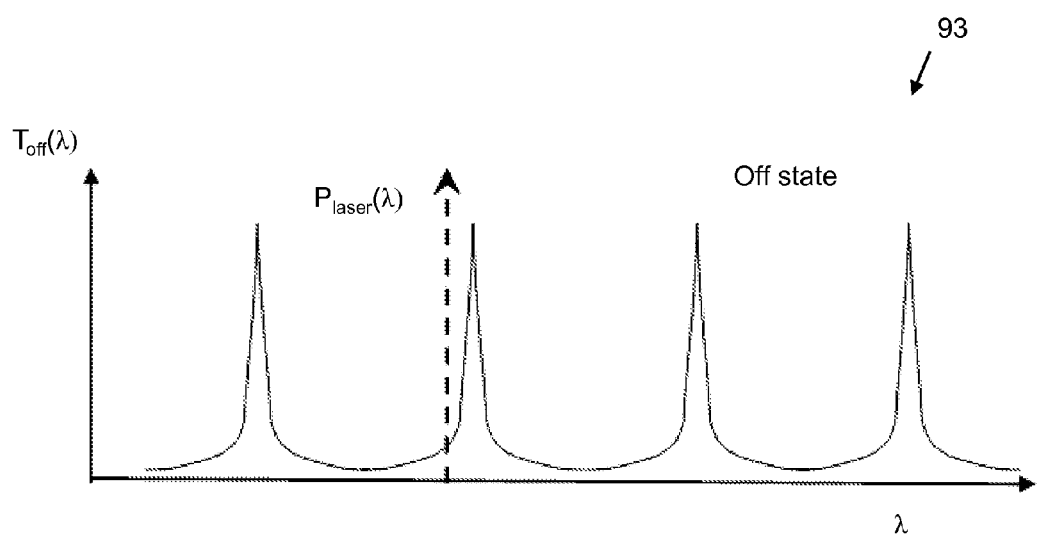

Referring to the transmittance spectra 92, 93 shown in FIG. 8, a resonant peak of the F-P cavity must be tuned to the wavelength of the (non-modulated) laser ($P_{laser(\lambda)}$) in the on-state (FIG. 8*a*). However, in the off-state (FIG. 8*b*), the phase of the cavity is altered to detune the resonance peak away from the wavelength of the laser thereby producing a sufficient modulation extinction ratio. When a bias is applied to the electrodes of the p-n junctions of the modulation regions, and the bias is modulated between the on and off states, the transmittance spectrum is therefore switched between on and off positions resulting in the output being modulated from on to off or vice versa. By actively adjusting the bias to the phase shift regions, the alignment of the resonant peak of the F-P cavity to the wavelength of the laser can be maintained in the presence of a thermal drift.

Further alternative modulators are described below with reference to in FIGS. 9 to 13B. Each of these modulators can replace the EAM in the embodiment shown in FIG. 2 to form a further alternative DRM where the remaining features and options of the DRM (other than the EAM) described in relation to FIG. 2 would still apply. In each of these alternative embodiments, the modulator is a ring resonator modulator 53, 153.

Figure 9:
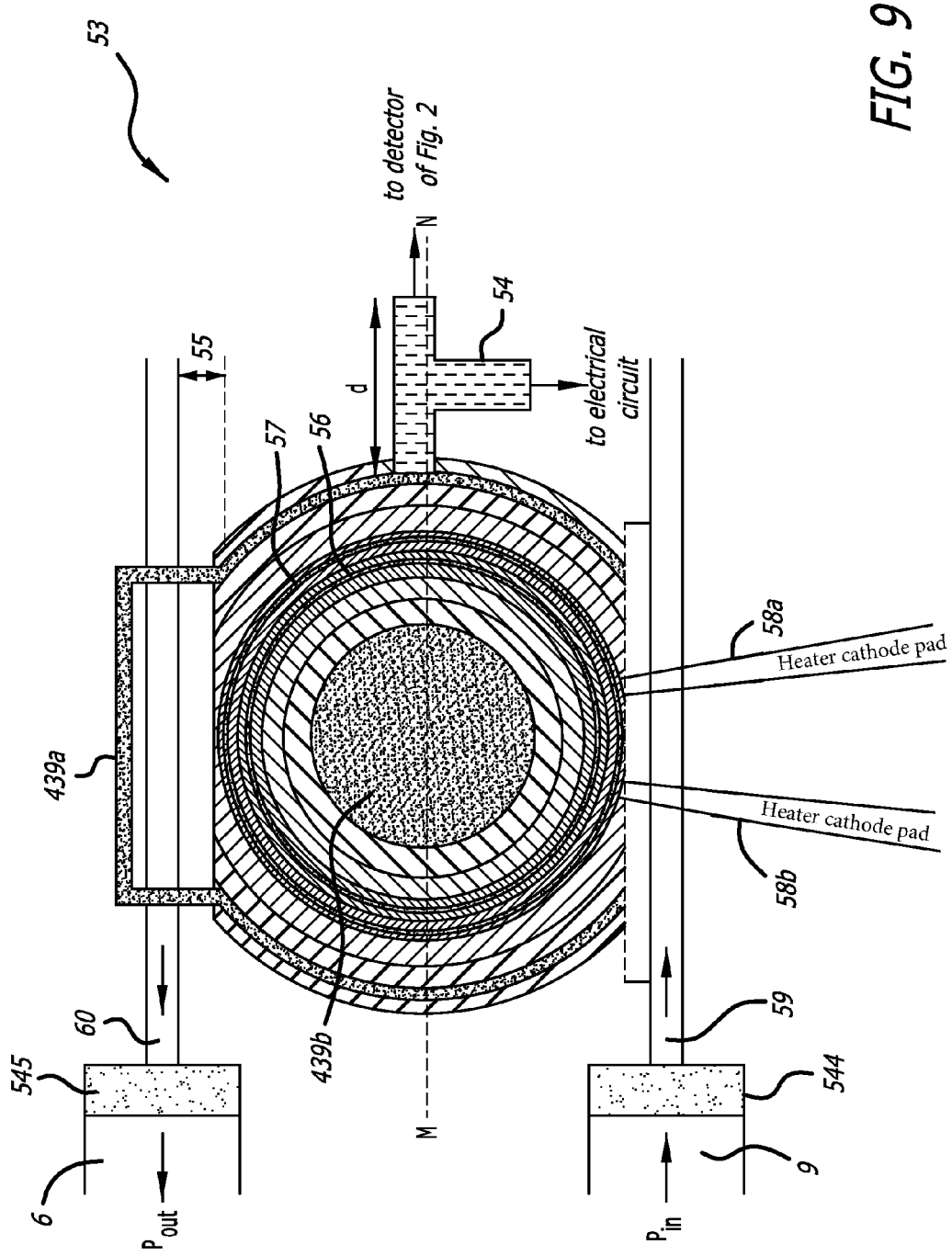
FIG. 9 shows a schematic top view of an alternative modulator in the form of a ring resonator modulator.
Figure 10:
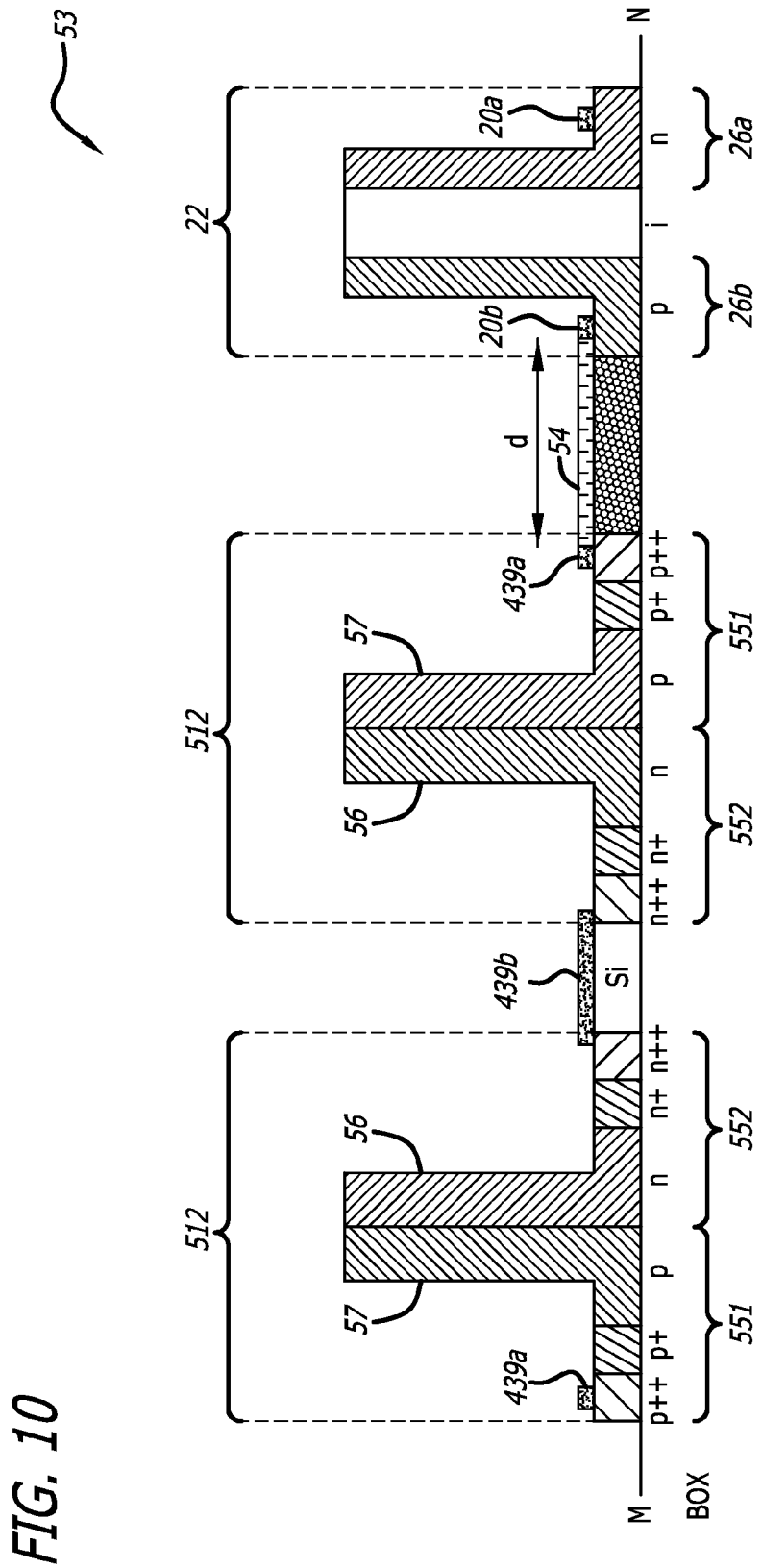
FIG. 10 shows a side view of the ring resonator modulator of FIG. 9 taken along the line M-N of FIG. 9.
Figure 11:
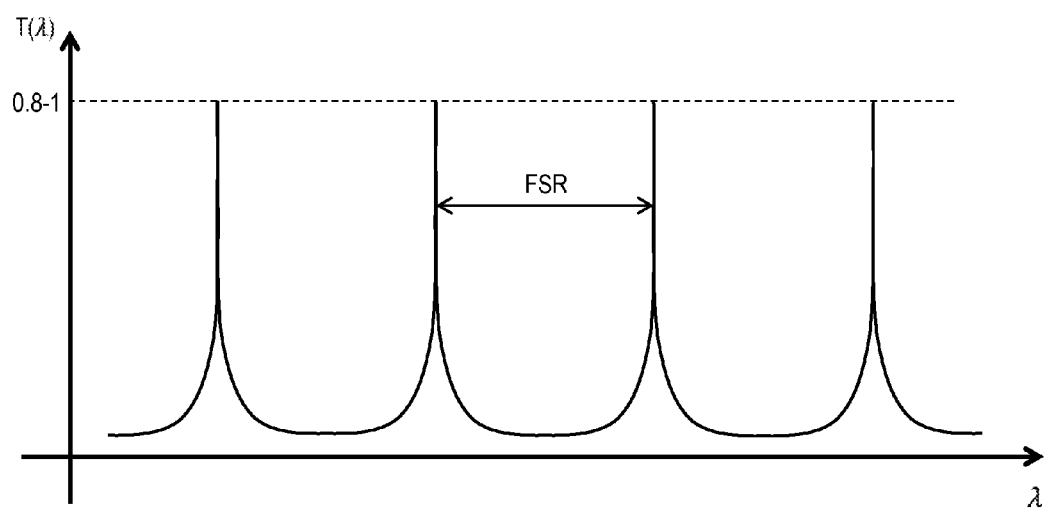
FIG. 11 shows an example of a transmittance spectrum for the ring resonator modulator.

Taking the first of two ring resonator DRM embodiments and referring in particular to FIGS. 9 to 11, the ring resonator modulator 53 is formed from a ring waveguide section, a first straight waveguide 59 coupled at one side of the ring waveguide and a second straight waveguide 60 coupled to the other side of the ring waveguide. The ring waveguide is defined between an inner waveguide ridge edge 56 and an outer waveguide ridge edge 57. The cross section across dashed line M-N in FIG. 9 is shown in FIG. 10. The ring resonator modulator also comprises a of modulation region 512 formed in a bulk semiconductor medium doped to give a circular p-n junction which is set horizontally across the waveguide (An alternative semiconductor junction in the form of a horizontal p-i-n junction would also work).

Figure 12:
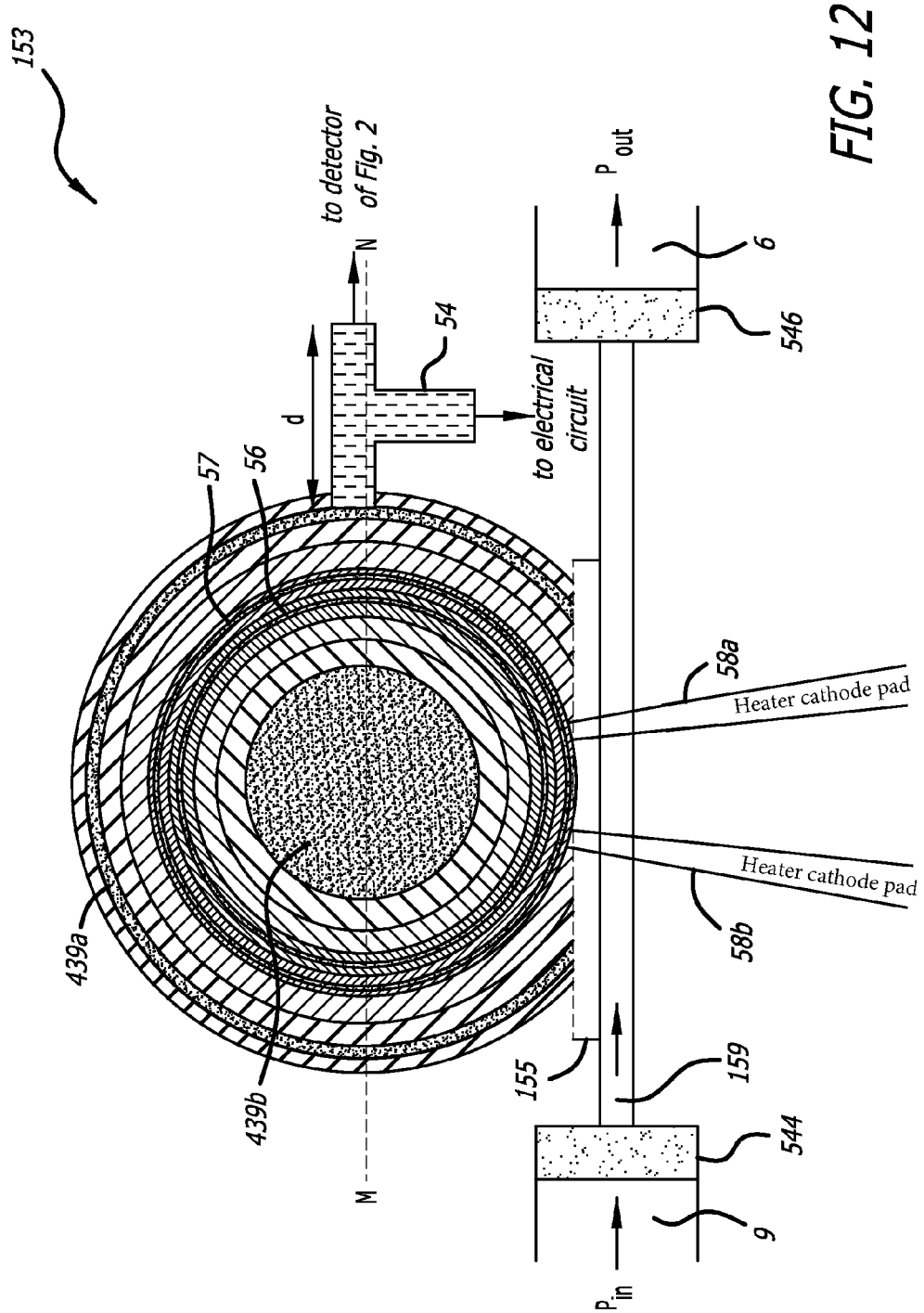
FIG. 12 shows a schematic top view of a further alternative modulator in the form of an alternative ring resonator modulator.

Throughout this document, ring waveguides may take the form of any ring shape including: a circle (as shown in FIGS. 9 and 12), a race track; or an elliptical shape. Furthermore, the circular doped regions may take the form of a circle with constant radius; a race-track shape; or an elliptical shape.

In the embodiment shown in FIG. 9, the circular p-n junction becomes discontinuous along a portion of its circumference where a continuous circular doped region would otherwise overlap with the input and output straight waveguides. Suitable bulk semiconductor materials for the modulation region include SiGe and homogeneous silicon.

The p-n junction is made up of a p-type region 551 and an n-type region 552. The p-doped regions are each graded into three concentric layers of varying different doping strengths: p, p+ and p++ and the n-doped regions are also graded into three concentric layers of varying doping strengths n, n+ and n++ arranged so that the p and n layers overlap the ring waveguide and extend radially outwards and inwards respectively within the horizontal plane of the junction beyond the outer and inner waveguide ridge edges. The p++ and n++ doped layers lie furthest away from the ring waveguide. Because of the discontinuous nature of the outer doped portions, the p+, p++, n+ and n++ layers are each made up of two opposing crescent shaped regions rather than complete circular shape as they do not extend the full way around the ring waveguide. This gives clearance for the straight waveguides 59, 60 which couple light in and out of the ring waveguide thereby ensuring that the p-n junction does not modify the refractive index in the light-coupling regions, and therefore does not modify the coupling ratio between the ring and the straight waveguides.

A ring gap separation 55 exists on either side of the ring waveguide between the ring waveguide and each of the straight waveguides 59, 60. The magnitude of this gap determines the value of the coupling coefficient κ of the resonator.

Electrodes are located directly above the outer-most and inner-most respective doped regions. In particular, the electrodes are located directly above the p++ and n++ layers of the doped regions. A central circular electrode 439*b* is located above the n++ doped region to apply a bias to the n-doped region. A bias is applied to the p-doped region via a looped electrode 439*a* which extends above and along the crescent shaped p++ regions forming two crescent shaped electrode portions which are then joined together by further electrode portions crossing over one of the straight waveguides to form a closed single electrode.

An electrical circuit connection 54 between the ring resonator modulator and the detector (detector not shown) can take the form of any one of the electrical circuit connections described above in relation to FIGS. 3*a* to 3*d*.

The ring resonator modulator 53 includes a first waveguide transition region 544 between the modulator input waveguide 9 and the first straight waveguide 59 which couples light into the ring resonator and a second transition region 545 between the second straight waveguide which couples light out of the waveguide and the modulator output waveguide 6.

At the first transition region 544, the waveguide height and/or width are reduced, and at the second transition region, the waveguide height and/or width are increased. In this way, the waveguide dimensions within the ring resonator modulator are smaller than those of the input and output waveguides. This helps to improve the operation speed of the modulator (although it does so at the expense of higher losses).

The transmittance spectrum of the ring resonator is shown in FIG. 11 as a periodic set of peaks, each peak separated from the adjacent two peaks via a wavelength difference equal to the free spectral range (FSR) of the ring resonator. The free spectral range of the transmittance signal being set by the size of the ring waveguide. The transmittance of the resonator preferably has a maximum value of between 0.8 and 1 and may be 0.8.

Modulation of the light occurs via the same process as the F-P modulator, the ring resonance must be tuned to the wavelength of the (non-modulated) laser ($P_{laser(\lambda)}$) in the on-state (FIG. 8*a*). However, in the off-state (FIG. 8*b*), the phase of the cavity is altered to detune the resonance peak away from the wavelength of the laser thereby producing a sufficient modulation extinction ratio. When a bias is applied to the electrodes of the p-n junctions of the ring, and the bias is modulated between the on and off states, the transmittance spectrum is therefore switched between on and off positions resulting in the output being modulated from on to off or vice versa.

The ring resonator modulator 53 also includes a fine tuning region in the form of a heater (not shown) for thermal tuning.

By actively adjusting the voltage across the phase tuning heater pads 58a and 58b, the alignment of the resonant peak of the F-P cavity to the wavelength of the laser can be maintained in the presence of ambient thermal drift.

Referring to FIGS. 10, 12, 13A and 13B, the ring resonator modulator 153 according to the second of the two ring resonator DRM embodiments is described. The difference between the ring resonator modulator of FIG. 12 and that of FIG. 9 is the fact that the ring waveguide of the resonator modulator of FIG. 12 is coupled to no more than one straight waveguide. A single straight waveguide 159 only is coupled to the ring waveguide at one side. In this embodiment, the single straight waveguide is therefore configured to couple light both into and out of the ring waveguide.

As with the previous ring resonator embodiment, the ring waveguide is defined between an inner waveguide ridge 56 and an outer waveguide ridge 57. The cross section across dashed line M-N for this embodiment is also shown by FIG. 10 and the parts of the description above relating to FIG. 10 therefore apply here. In particular, the ring resonator embodiment of FIG. 12 also includes a modulation region 512 formed in a bulk semiconductor medium doped to give a circular p-n junction which is set along a horizontally across the waveguide.

The p-n junction is made up of a p-type region 551 and an n-type region 552. The p-doped regions are each graded into three concentric layers of varying different doping strengths: p, p+ and p++ and the n-doped regions are also graded into three concentric layers of varying doping strengths n, n+ and n++ arranged so that the p and n layers overlap the ring waveguide and extend radially outwards and inwards respectively beyond the waveguide ridge edges 56, 57 within the horizontal plane of the semiconductor junction.

The p, n, n+ and n++ regions are ring shaped. However the p+ and p++ regions on the outside of the p-type region are C-shaped; defining a discontinuity where the ring waveguide comes into close contact with the straight waveguide (i.e. where the outer-most doped regions would otherwise overlap the straight waveguide). The clearance between the doped regions and the straight waveguide ensures that the p-n junction does not modify the refractive index in the light-coupling regions, and therefore does not modify the coupling ratio between the ring and the straight waveguide.

A ring gap separation 155 exists between the ring waveguide and the single straight waveguide 159, the magnitude of which determines the value of the coupling coefficient κ of the resonator.

Electrodes are located directly above the respective outermost and inner-most doped regions that they apply a bias to. In particular, the electrodes are located directly above the p++ and n++ layers of the doped regions. A central circular electrode 439b is located above the n++ doped region to apply a bias to the n-doped region. A bias is applied to the p-doped region via a looped electrode 439a which extends along the C-shaped (i.e. the full length of the discontinuous circumference of the p++ region).

An electrical circuit connection 54 between the ring resonator modulator and the detector (detector not shown) can take the form of any one of the electrical circuit connections described above in relation to FIGS. 3a to 3d.

The ring resonator modulator 153 includes a first waveguide transition region 544 between the modulator input waveguide 9 and the single straight waveguide 59 which couples light into the ring resonator and a second transition region 546 between the single straight waveguide 59 and the modulator output waveguide 6.

At the first transition region 544, the waveguide height and width are reduced, and at the second transition region, 546 the waveguide height and width are increased. In this way, the waveguide dimensions within the ring resonator modulator are smaller than those of the input and output waveguides.

Figure 13A:
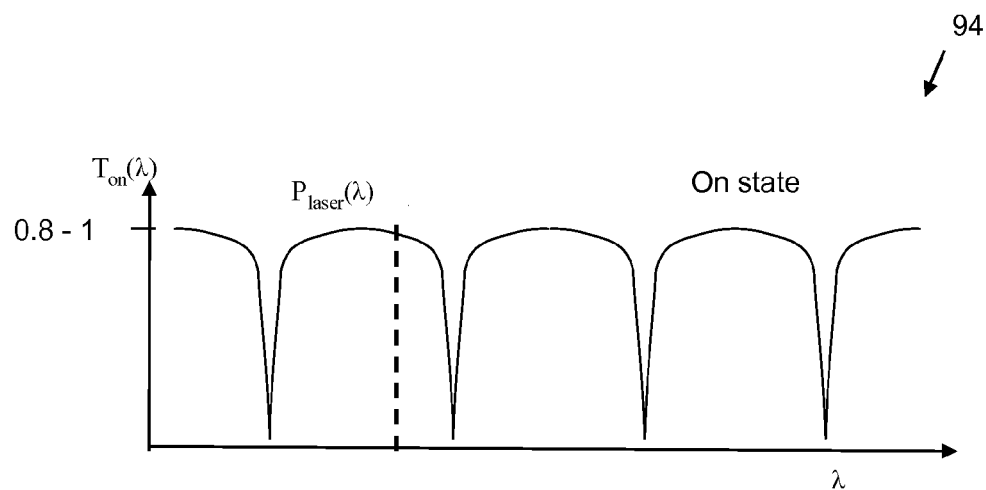
FIG. 13A shows an example of a transmittance spectrum for the ring resonator modulator of FIG. 12 tuned to the laser emission wavelength ("on state")
Figure 13B:
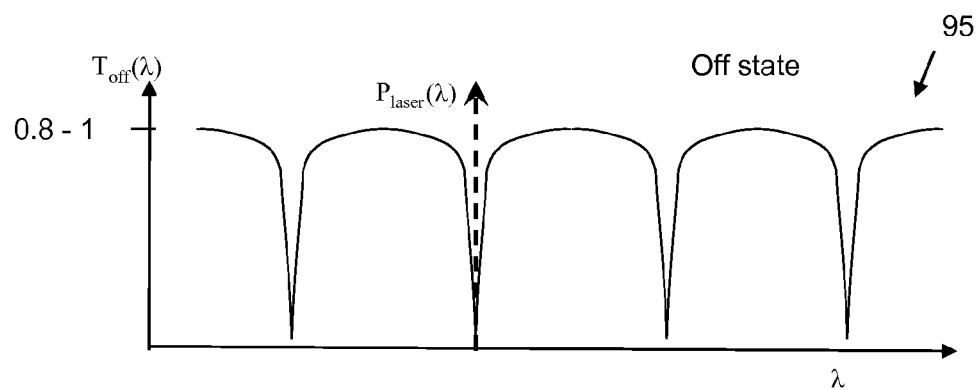
FIG. 13B shows an example of a transmittance spectrum for the ring resonator modulator of FIG. 12 de-tuned from the laser emission wavelength ("off state")

The transmittance spectrum of the ring resonator is shown in FIGS. 13A and 13B and takes the form of a periodic set of sharp troughs, each trough separated from the two directly adjacent troughs via a wavelength difference equal to the free spectral range (FSR) of the ring resonator. As this transmittance spectrum is the inverse of that for the "dual straight waveguide" embodiment, the ring resonator modulator of FIGS. 12, 13A and 13B will require an opposite drive signal (bias applied across the p-n junction) as compared to the single coupled waveguide version in order to give rise to the same modulation effect.

The transmittance of the resonator between the troughs preferably has a maximum value of between 0.8 and 1, and may be 0.8. As with the previous ring resonator embodiment, modulation is achieved when a bias is applied across the p-n junctions from the electrical circuit connector via the electrodes. This tunes the transmittance spectrum on and off resonance with the wavelength of the (unmodulated) laser which in turn results in the transmitted output signal being turned on 94 and off 95. However, because the transmittance is a trough on resonance, the magnitude of bias change is larger to get the same extinction ratio for the "dual straight waveguide" embodiment.

An advantage of this embodiment is that there is only one straight waveguide and one discontinuous portion in the p-n junctions around the circumference, meaning the electrode for the p-doped region does not have to cross over a straight waveguide. When metal electrodes cross a waveguide additional optical loss is introduced.

The ring resonator modulator 153 also includes a fine tuning region in the form of a heater (not shown) for thermal tuning By actively adjusting the voltage across the phase tuning heater pads 58a and 58b, the alignment of the resonant peak of the F-P cavity to the wavelength of the laser can be maintained in the presence of ambient thermal drift.

Figure 14:
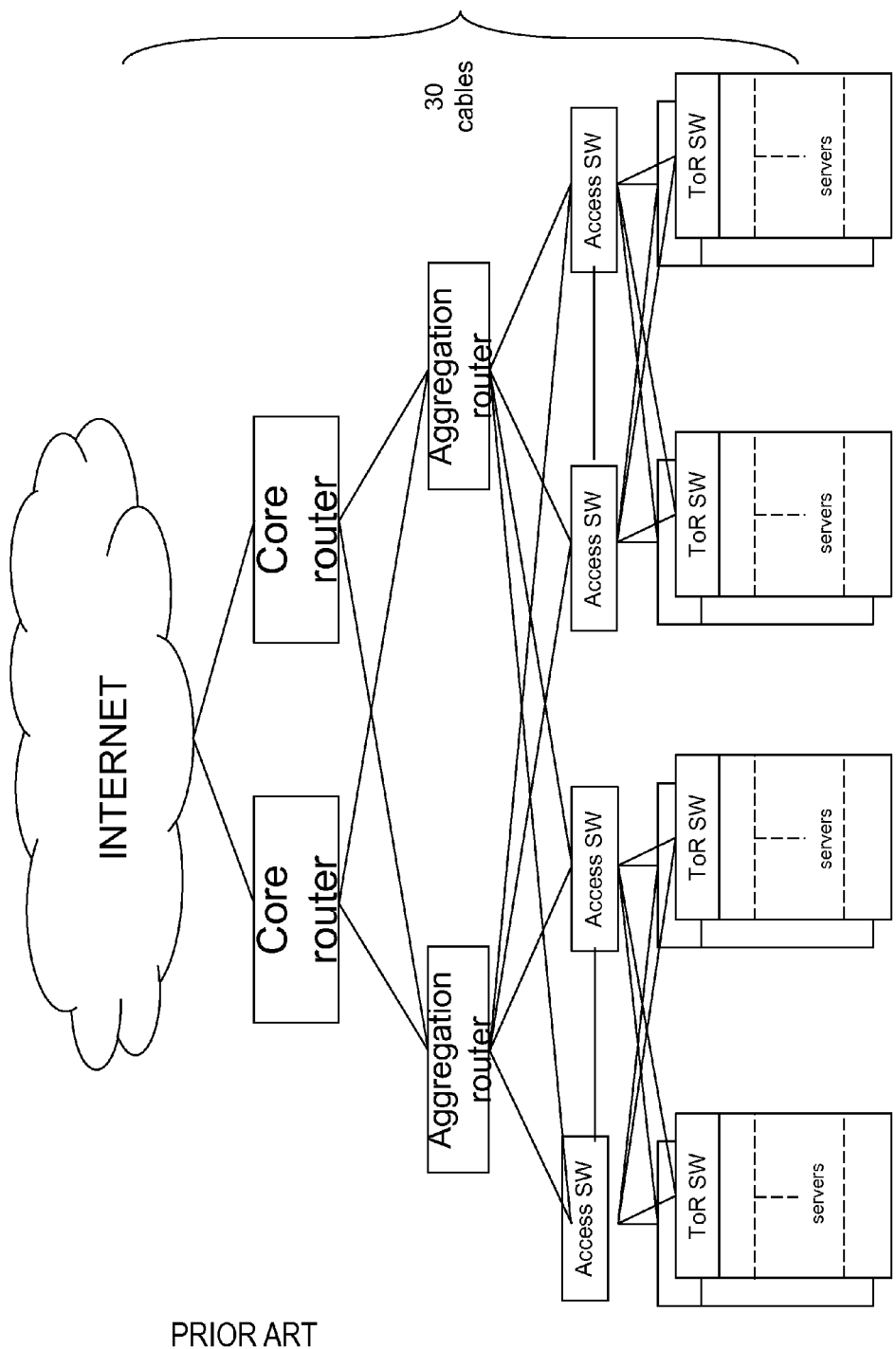
FIG. 14 shows an example of a traditional data network which uses electrical switches.

An example of a traditional data center interconnection network is shown in FIG. 14. Switching between top of rack (ToR) switch units is achieved using: access switches, aggregation routers and core routers. In the (simplified) example shown in FIG. 14, many cables are needed to switch between 4 ToR switch units. The top of rack (ToR) switch is an example of a device in a network, typically in or connected to a server, which may supply electrical signals to and receive electrical signals from the optoelectronic switches of this invention (such that the ToR forms an element at the endpoint of an electrical signal coming from a server). However, in fact, any of the optoelectronic switches described herein could be applied to a system with no ToR switches, for example by switching directly between servers in a datacenter (or any other electronics based devices).

Figure 15:
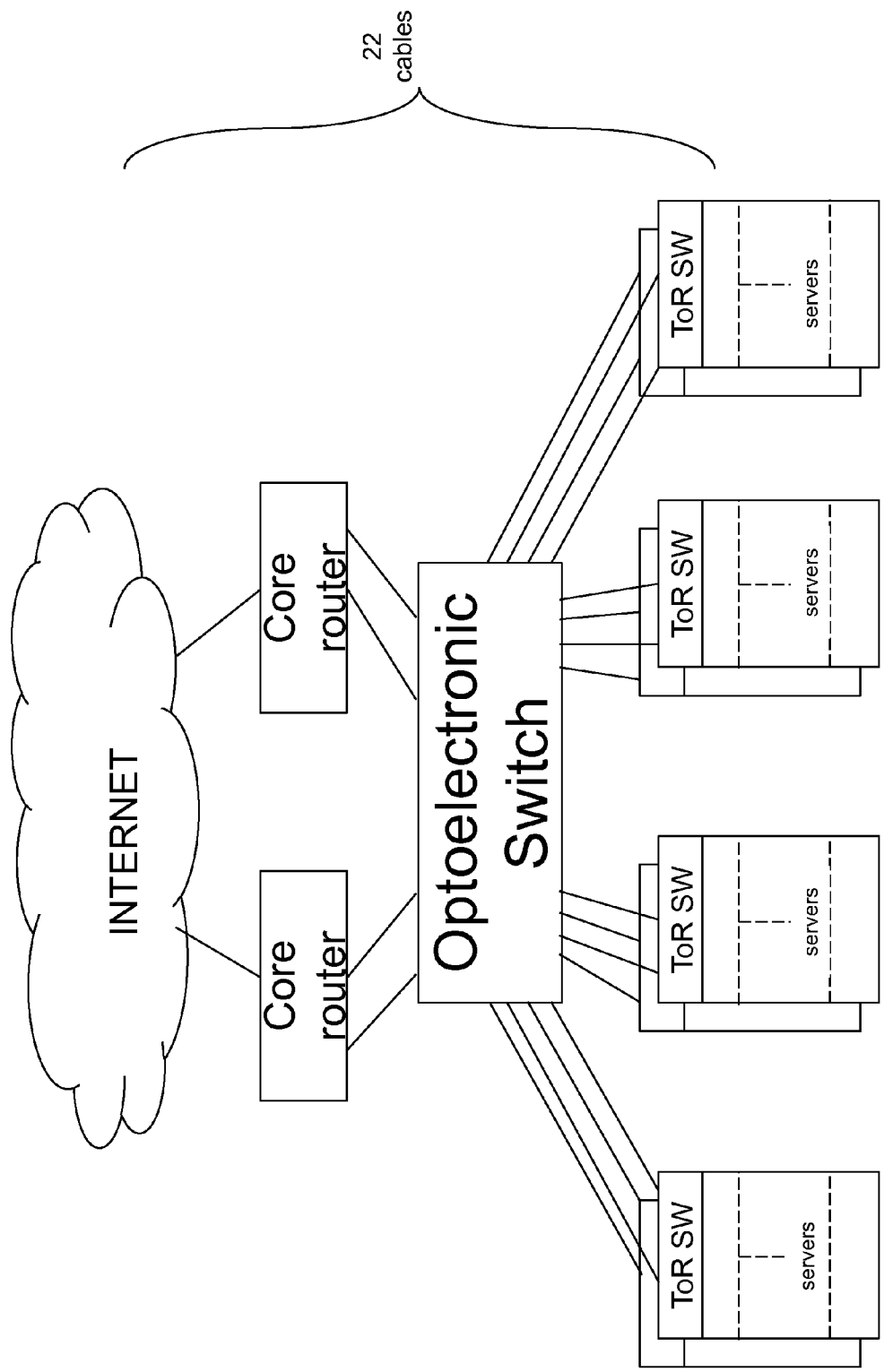
FIG. 15 shows an example of a data network including an optoelectronic switch.

An example of a network including an optoelectronic switch is shown in FIG. 15. The access and aggregation packet switches of traditional architecture are replaced by a single optoelectronic switch. In the (simplified) example shown in FIG. 15, many fewer cables are needed to switch between 4 ToR switch units. The number of transceivers required is therefore also substantially reduced. It would be clear to the skilled person that whilst the optoelectronic switches described herein are capable of use as part of an network as shown in FIG. 15, they could also be used to switch optical signals in other network configurations and other uses, particularly uses in networks where switches are connected with optical interconnects, or for which high speed, low power-consumption, and high radix switching is important.

Examples of optoelectronic switches and DRMs are described below with reference to FIGS. 16 to 29.

Figure 16A:
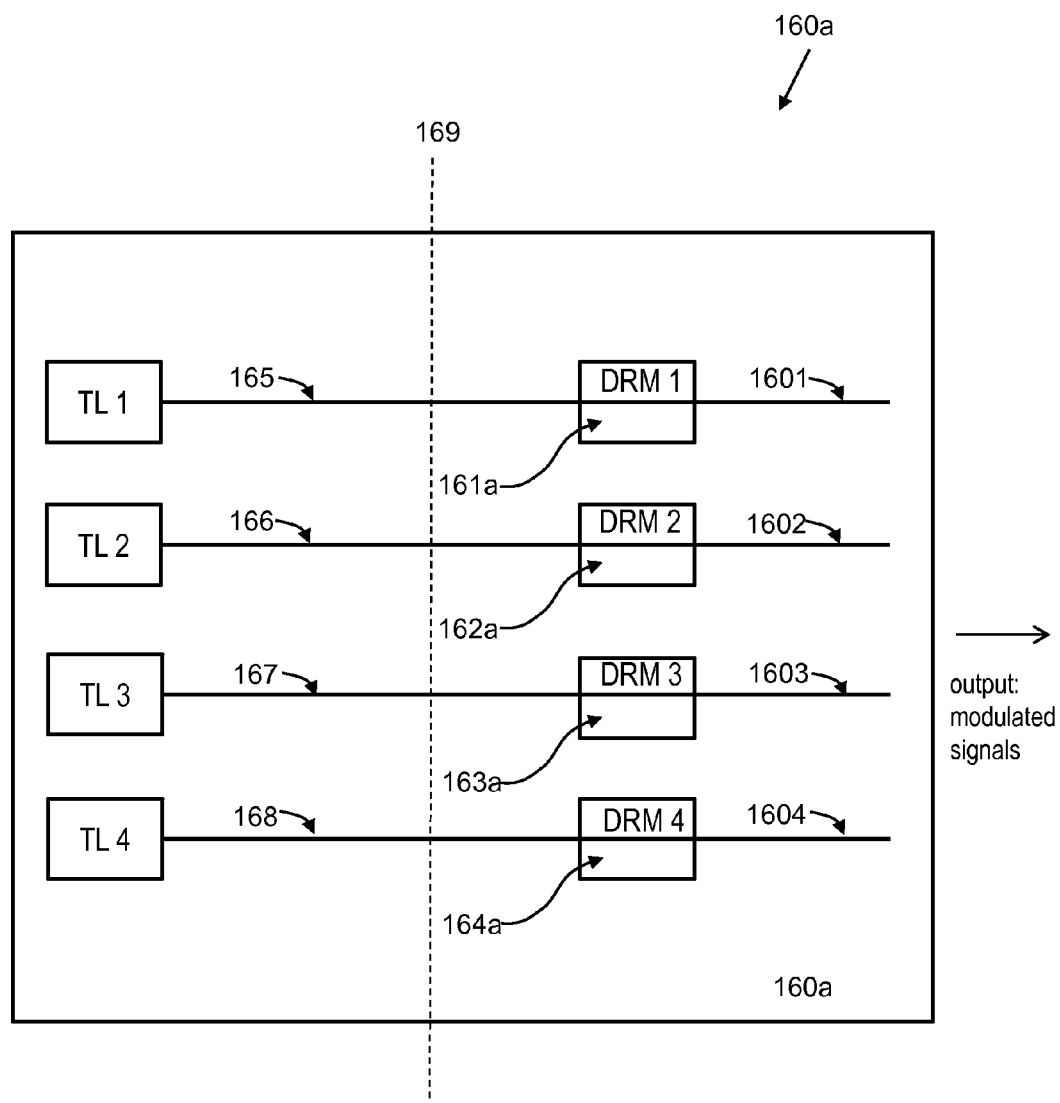
FIG. 16a is a schematic diagram showing: a first arrangement of DRMs 16a where DRMs are integrated with tunable lasers on a silicon-on-insulator chip and where the optical input signal impinges the modulator at an angle to the plane of the AWG.

An optical chip 160a which forms a portion of an optoelectronic switch is shown in FIG. 16a. The chip includes a plurality of DRMs (DRM1, DRM2, DRM3, DRM4), each configured to receive an optical input signal 161a, 162a, 163a, 164a from one or more switch inputs. Where the optoelectronic switch is an optoelectronic packet switch, these inputs will be optical packet signals. Where the optoelectronic switch is an optoelectronic circuit switch, the optical input signals will not need to include packet header information.

Each DRM includes one or more detectors (not shown) and one or more modulators (not shown) in detector/modulator pairs (i.e. the number of modulators is equal to the number of detectors). Any of the detectors and/or modulators may take the form of any one of the detectors and/or modulators described above in relation to FIGS. 1 to 14. Each detector receives an optical input signal and generates an electrical signal containing the information of that optical input signal. Where the optical input signal is a packet signal, the electrical signal generated will be an electrical packet signal.

Each of the one or more modulators of a DRM is configured to receive a wavelength tuned laser light input 165, 166, 167, 168 from a respective tunable laser (TL1, TL2, TL3, TL4) and to receive the respective electrical signals from the one or more respective detectors. The wavelength tuned light from the tunable laser is modulated by the modulator according to the information contained in the electrical signal to generate a modulated output signal 1601, 1602, 1603, 1604 containing that information but at the desired wavelength for switching.

In FIG. 16a, the DRMs and tunable lasers are arranged such that optical input signals 161a, 162a, 163a, 164a impinge the modulator at an angle to the plane of the chip (and therefore at an angle to the plane of the passive optical router such as an AWG (not shown in this figure).

The chip 160a may be a silicon-on-insulator chip and may be a single integrated chip or made up of two or more components abutted next to one another. For example, separate chips may join at an abutment surface 169, the array of tunable lasers (TL1-TL4) being located on a separate chip to the DRMs (DRM1-DRM4) to prevent undesirable heating of the DRMs by the tunable lasers.

Figure 16B:
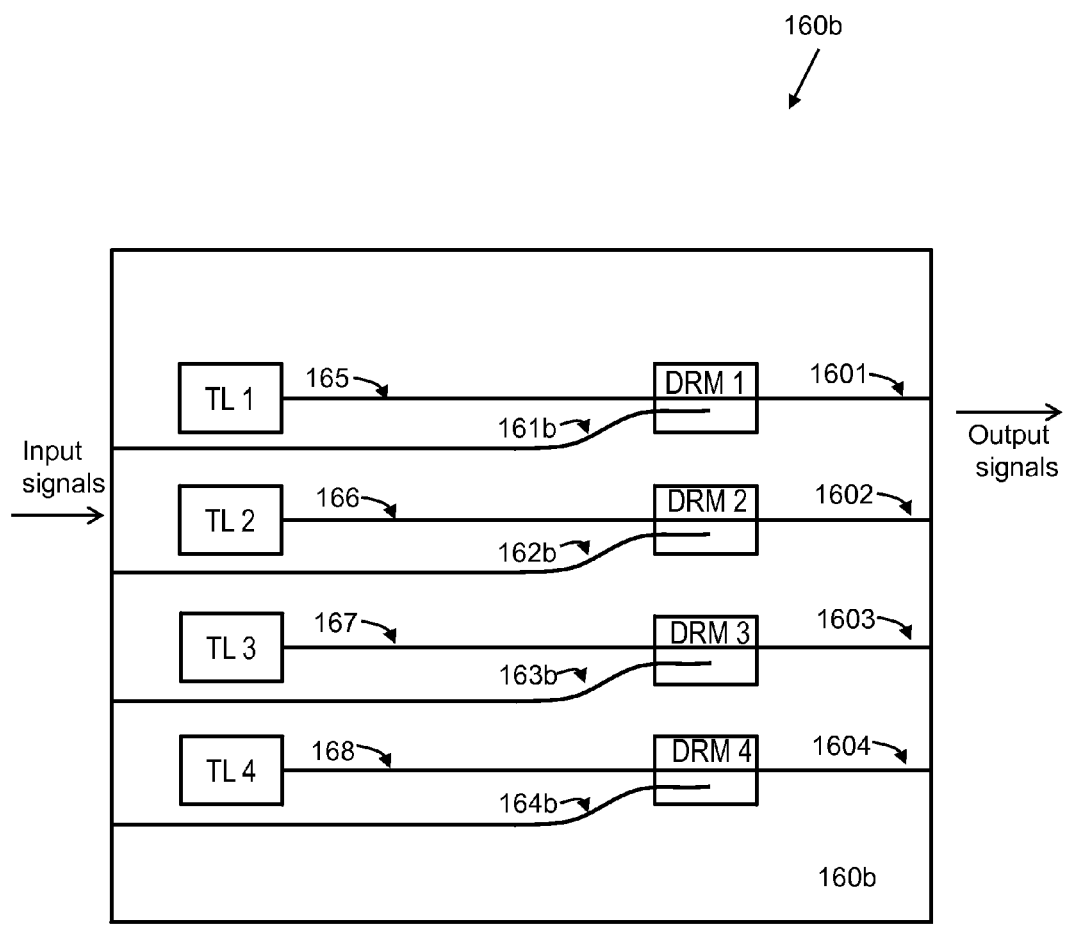
FIG. 16b is a schematic diagram showing: a second arrangement 16b where the signal input waveguide for each DRM lies within the plane of the AWG.

The optical chip of FIG. 16b differs from that of FIG. 16a in that the optical signal inputs are provided by way of signal input waveguide via which lie within the plane of the DRMs and the passive optical router (such as an AWG, not shown).

In the arrangements depicted in FIGS. 16a and 16b the plurality of tunable lasers (TL1-TL4) are arranged in a first linear array, and the plurality of DRMs are arranged in a second linear array parallel to the first array, although other geometric arrangements are envisaged. In addition, although 4 DRMs are shown, more or fewer DRMs could be present.

Figure 17:
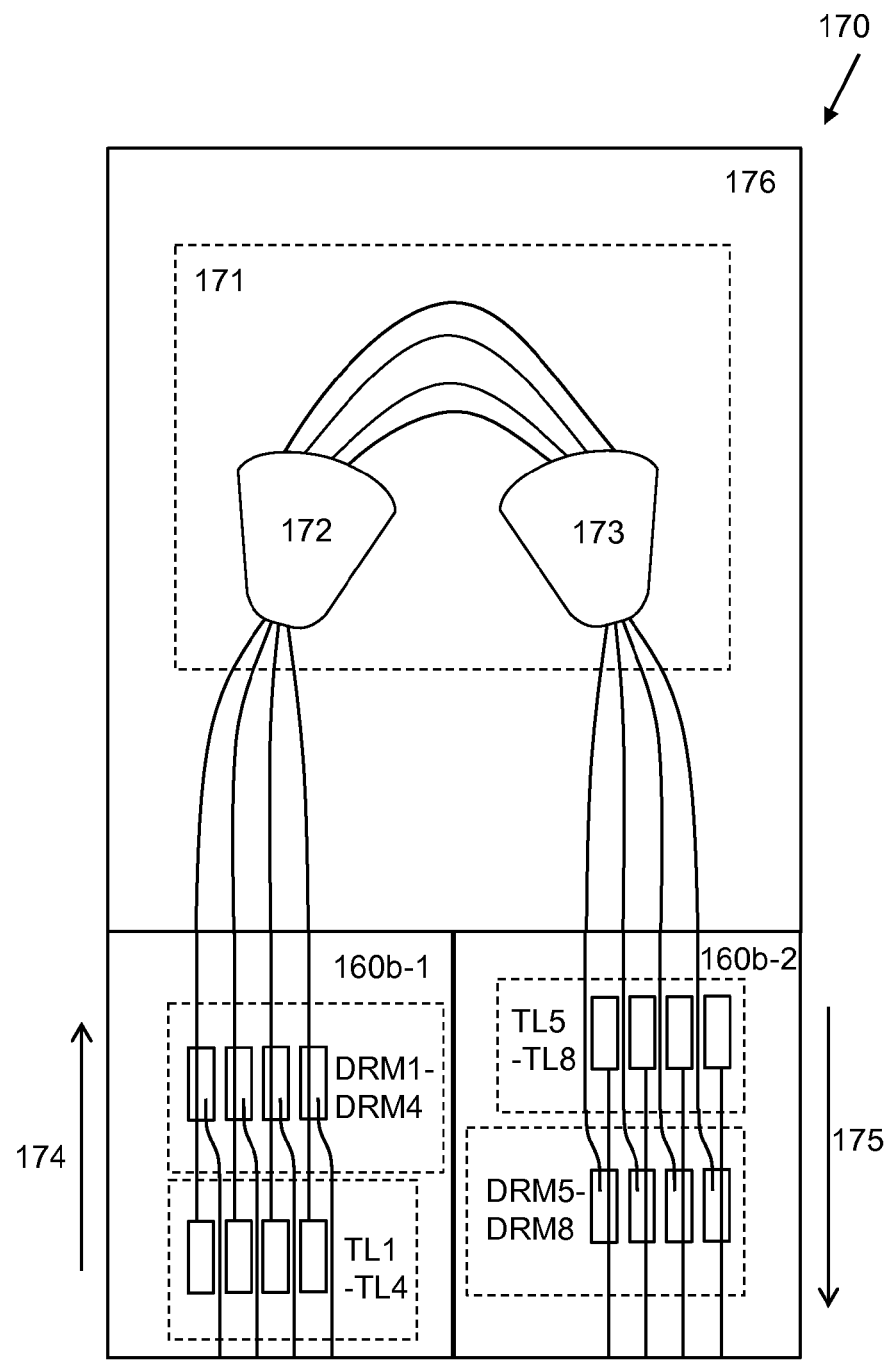
FIG. 17 is a schematic diagram showing an optoelectronic switch including arrays of DRMs and an AWG.

In FIG. 17, two optoelectronic chips 160b-1, 160b-2 such as that shown in FIG. 16a are shown aligned with a third chip which comprises a passive optical router in the form of an AWG. The AWG is arranged along the same plane as the tunable lasers, the DRMs and the waveguides interconnecting the various components. The AWG itself comprises an input coupler 172 and an output coupler 173 connected via a plurality of paths defined by a plurality of waveguides. A first plurality of DRMs (DRM1-DRM4) are located at the input of the passive optical router, and a second plurality of DRMs (DRM5-DRM8) are located at the exit of the passive optical router.

The AWGs described throughout this application may be made in silicon and if so may be fabricated on the same chip as the DRMs and tunable lasers. If the AWG is made of another suitable material such as silica on silicon or polymer it may be butt coupled to the silicon-on-insulator chip such that it lies in the same plane as the DRMs and tunable lasers.

Modulated optical signals which exit the first plurality of DRMs are coupled to the input coupler 172 of the AWG. The path taken by a modulated optical signal through the AWG to the output coupler 173 (and therefore the port from which the modulated optical signal leaves the AWG) will depend on its wavelength.

The second plurality of DRMs (DRM5-DRM8) form an array located after the output coupler of the AWG, each DRM positioned to receive a modulated optical signal from a specific output port of the AWG. Each of the DRMs in the second DRM array operates via the mechanism described about in relation to the first DRM array, the modulator of each being configured to receive wavelength tuned light from a respective tunable laser (TL5-TL8) and an optical signal from each respective AWG output port to produce a modulated optical signal of the desired tuned wavelength.

Figure 18A:
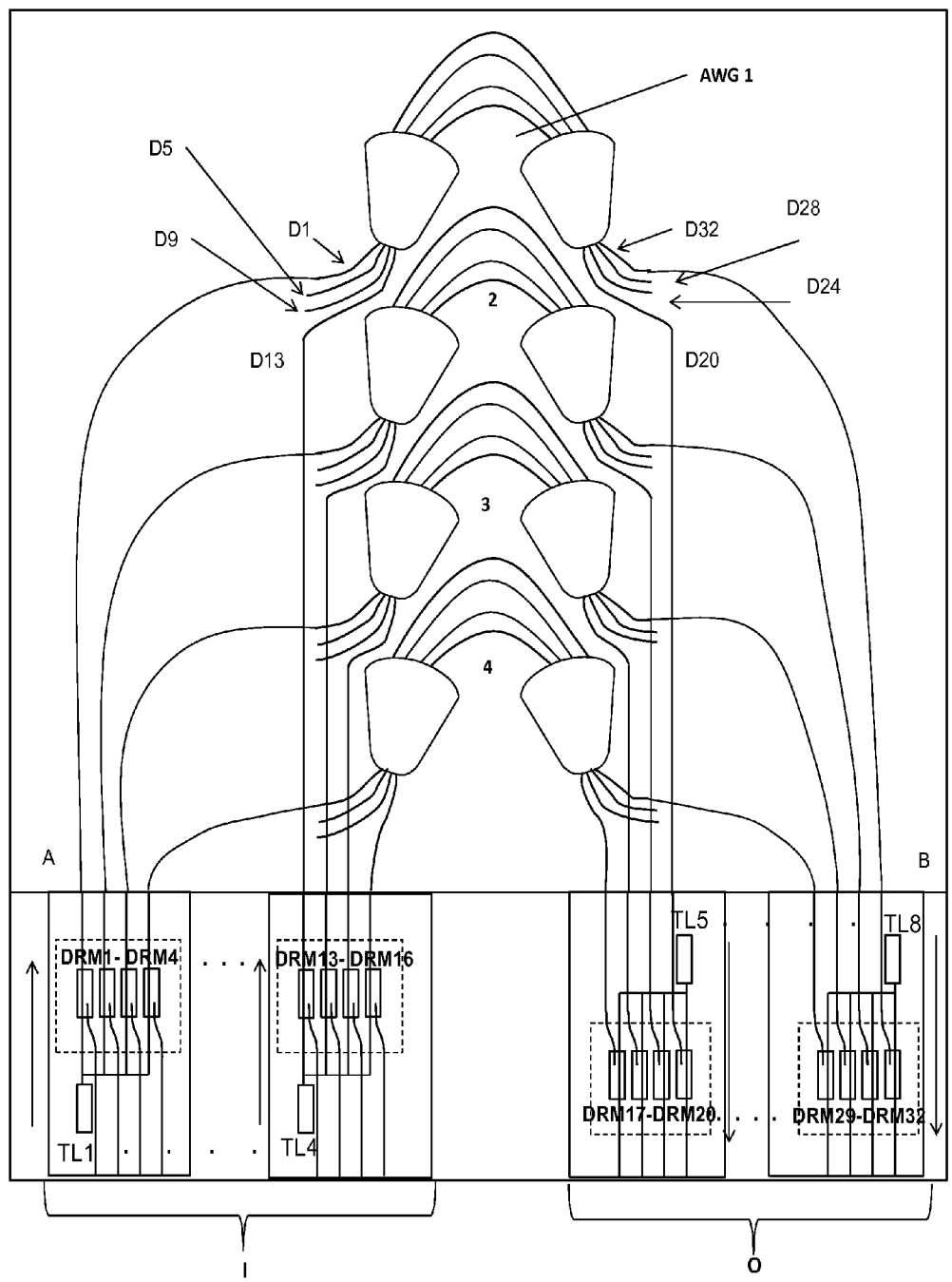
FIGS. 18a to 18c show schematic diagrams of an optoelectronic switch including a plurality of passive optical routers configured to switch a plurality of lines of a signal in parallel.
Figure 18B:
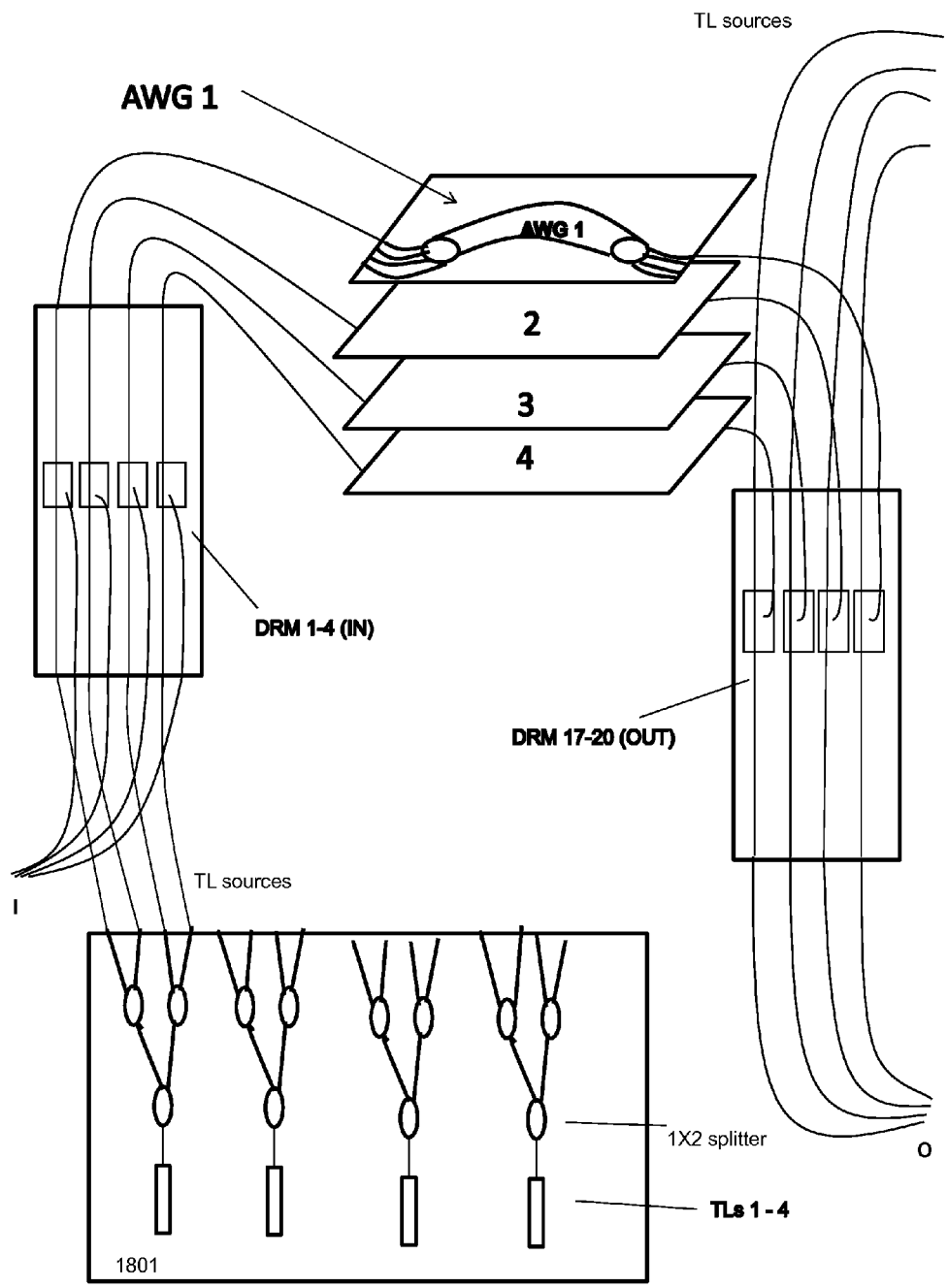
Figure 18C:
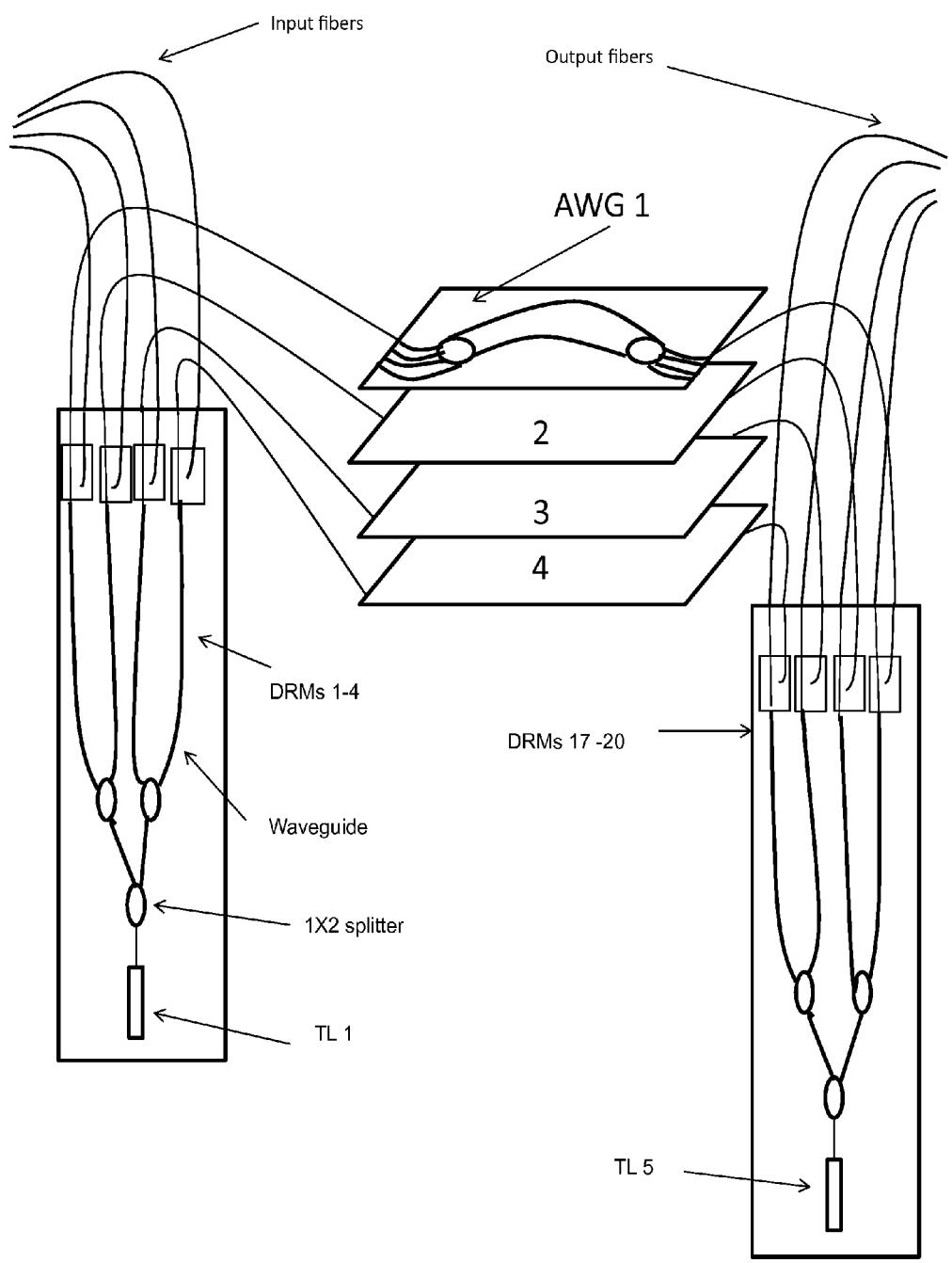

The passive optical router of any one of the embodiments described herein may take the form of a plurality of passive optical routers connected in a parallel arrangement as shown in FIGS. 18a, 18b and 18c.

In FIG. 18a is shown an arrangement in which four AWGs (AWGs 1-4) are connected in a planar arrangement with sixteen input DRMs (DRMs 1-16) and 16 output DRMs (DRMs 17-32). Here the input and output DRMs are arranged in groups of 4 DRMs, each group being lit with a single laser coupled with a series of 1×2 couplers in waveguides. The couplers may be star couplers. Thus each group of four DRMs is operated at the same tunable wavelength. Each of the outputs of each in the series of 4 DRMs is coupled to a different one of the 4 AWGs. This arrangement is useful in, for example, switching a channelized packet signal. For example, four 25G lanes of data may be processed from a source of 100G data in the PSM4 MSA standard. In this example the four lanes of data follow parallel routes through the switch. The AWGs and the DRMs and the lasers may be fabricated on the same chip, for example an SOI chip, or the co-planar arrangement may be achieved by butt coupling of separate chips or devices to achieve the illustrated coplanar arrangement. The line AB shown in FIG. 18a shows a possible location for the butt coupling of two chips. In FIG. 18a the DRMs 5-8, 9-12, 21-24 and 25-29 have been omitted for reason of the clarity of presentation. The connectivity of DRMs to AWG input output waveguides is denoted as D1-D32 with the connectivity of one AWG only indicated on FIG. 18a. It will be noted that FIG. 18a is schematic and, for the sake of clarity, shows waveguide bends and crossings of impractical shapes and relative dimensions. One skilled in the art would be able to design a working device from the FIG. 18a and the description here provided.

Alternative embodiments with the same overall topology are shown in FIGS. 18b and 18c. In FIG. 18b, the AWGs are stacked one above the other in an appropriate optical package. The DRMs are fabricated on separate chips and the tunable lasers are fabricated on separate chips in arrays. In this example there are 4 tunable lasers (TLs 1-4) on a single chip 1801, each tunable laser is arranged to produce 4 output lights. This is achieved by a series of 1×2 couplers in waveguides. Four input fibers (I) are shown connected to the input waveguides of the DRMs (DRMs 1-IN). There are fiber connections (e.g. a fiber ribbon) from the tunable laser chip to the DRM chips such that a chip with four DRMs receives 4 laser inputs of the same wavelength and each of the outputs of the 4 DRMs are connected by fiber to a different AWG (AWGs 1-4). The outputs of the AWGs are arranged so that the 4 outputs of a given wavelength are directed by fiber to a set of 4 DRMs and are output from the device in a group of 4 fibers (0). Shown in FIG. 18*b* are DRMs 17-20 OUT. The source of laser light (TL source) for the DRMs 17-32 is not shown. Laser sources could be arranged in arrays on chips in like manner to the tunable lasers 1-4. In FIG. 18*c*, the tunable lasers and DRMs are arranged on the same chip. For clarity, the DRMs 5-16 and 21-32 and the tunable lasers 2-4 and 6-8 are not shown. In order to avoid waveguide crossings, the DRM chips of this embodiment are laid out so that the inputs enter on the same side of the chip as the output waveguides. Again each of the 4 DRMs on the chip is lit with laser light of the same wavelength from a single laser coupled to the DRMs via waveguides and a series of 1×2 couplers.

The embodiments of FIGS. 18*a*, 18*b* and 18*c* are exemplary and other arrangements including other chip layouts will be apparent.

For simplicity each of the passive optical routers shown below are single passive optical routers or a first passive optical router arranged in series with a second passive optical router. It is envisaged that any one of the passive optical routers below could take the form of a plurality of parallel passive optical routers as described above.

Figure 19:
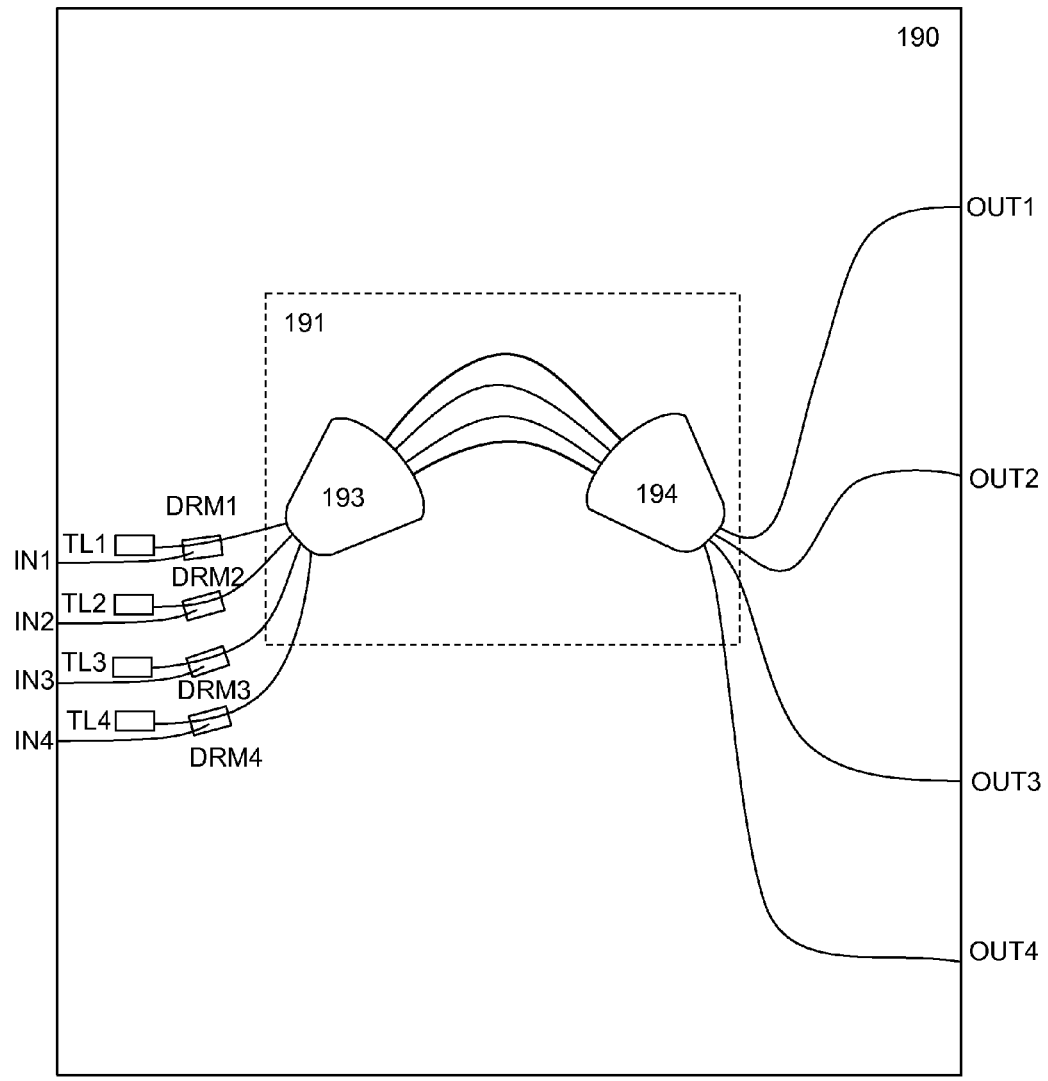
FIG. 19 is a schematic diagram showing another optoelectronic switch including an array of DRMs and an AWG.

As already described in relation to FIG. 18*a*, the DRMs and the passive optical router may be integrated on a single chip. Such an arrangement is shown in FIG. 19, in which a single integrated chip 190 (e.g. silicon-on-insulator) includes in a planar arrangement: a passive optical router 191 in the form of an AWG, a plurality of DRMs (DRM1, DRM2, DRM3, DRM4) and a plurality of tunable lasers (TL1, TL2, TL3, TL4). As with the previous embodiments described above, each of the DRMs is configured such that the modulator (not shown) receives wavelength tuned light from a respective tunable laser and such that the detector (not shown) receives an optical input signal from a respective one of a plurality of inputs (IN1, IN2, IN3, IN4), each of which are optically connected to a respective input via a waveguide. In the embodiment shown in FIG. 19, each DRM output is connected to an input port of the input coupler 193 of the AWG and each output port of the output coupler 194 of the AWG is connected to a respective output of the chip (OUT1, OUT2, OUT3, OUT4).

In the embodiment shown, the inputs and outputs are located at opposite sides of the chip.

Figure 20:
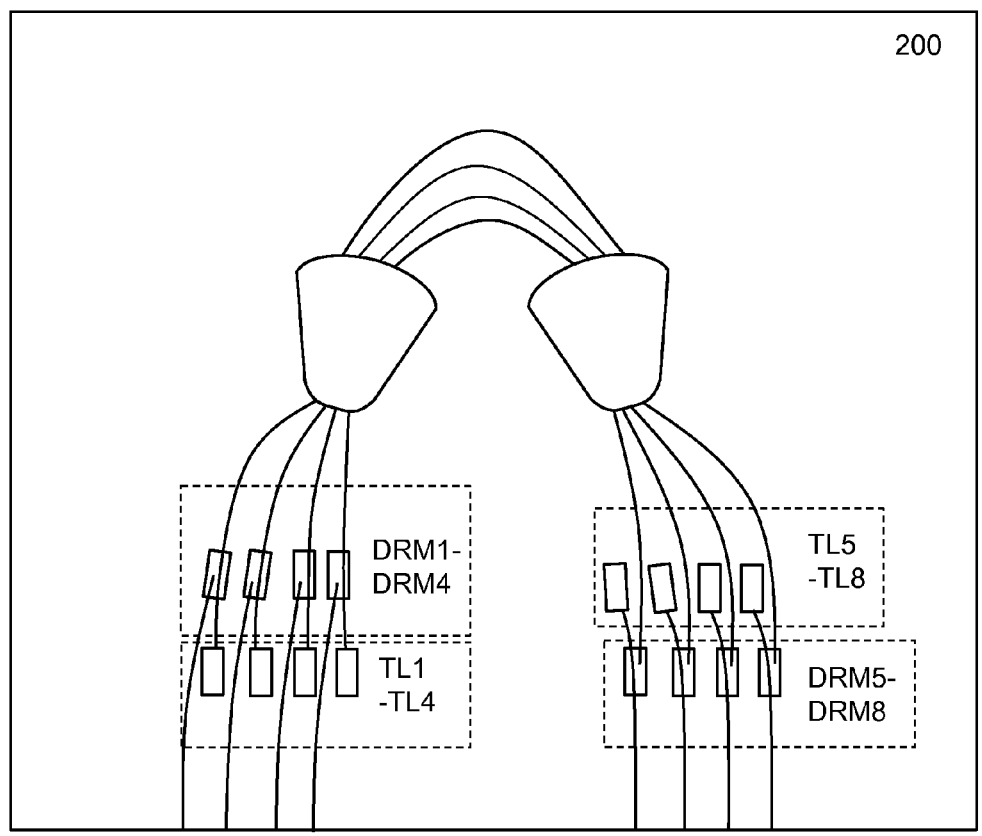
FIG. 20 is another schematic diagram showing a silicon-on-insulator chip including an array of DRMs and an AWG.

FIG. 20 shows another optoelectronic switch. This switch contains the optical components described above in relation to FIG. 17 but differs from the embodiment of FIG. 17 in that the optoelectronic switch is a single integrated chip 200 (e.g. a silicon-on-insulator chip).

In the embodiment shown, the inputs and outputs are located on the same side of the chip as one another.

Figure 21:
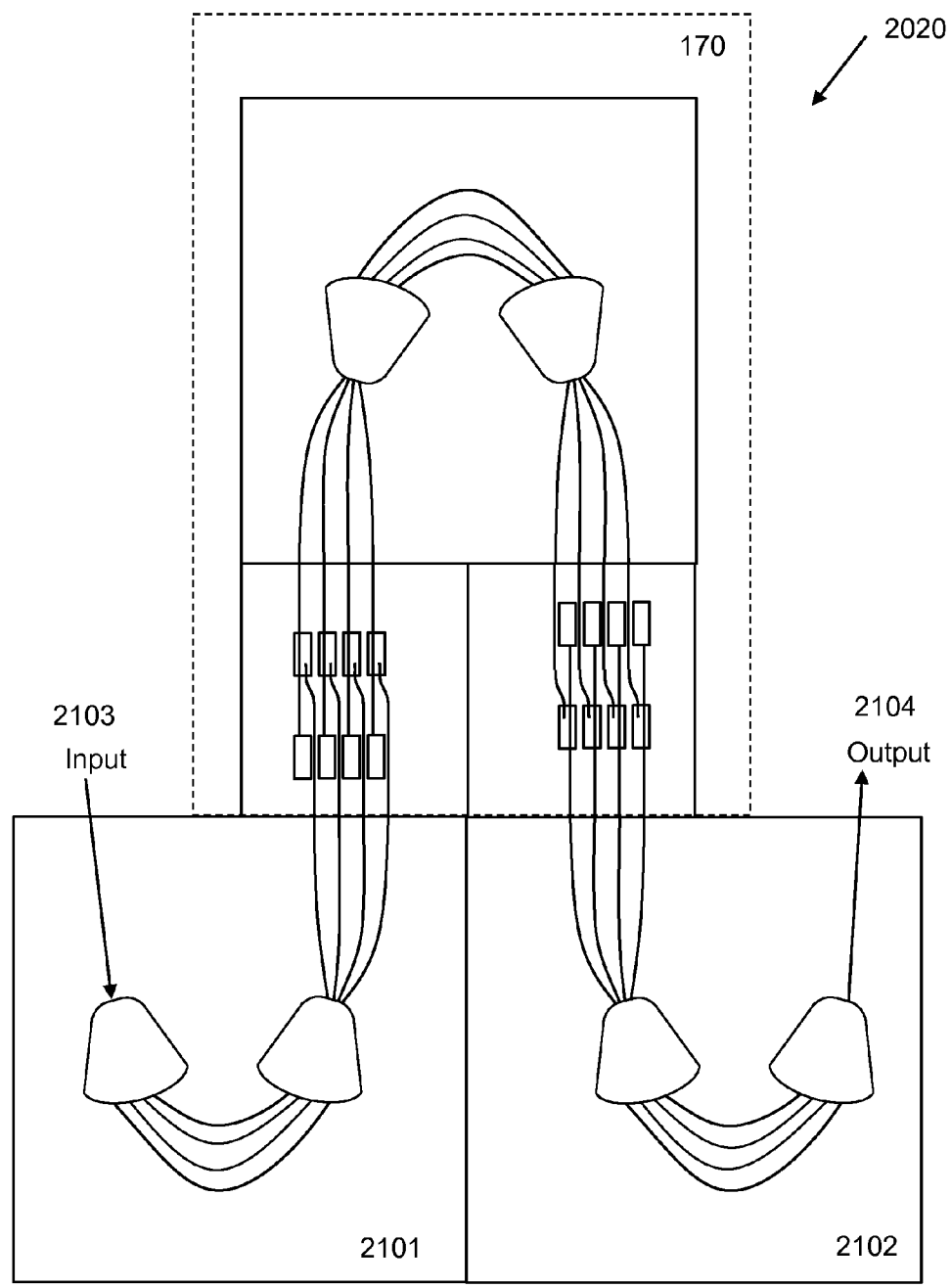
FIG. 21 is a schematic diagram showing a silicon-on-insulator chip including an array of DRMs and an AWG as well as further AWGs which function as demultiplexers and multiplexers.

An optoelectronic switch 2120 with a single input 2103 and single output 2104 is shown in FIG. 21. The optoelectronic switch is made up of a switch corresponding to the optoelectronic switch 170 shown in FIG. 17 with an additional demultiplexer chip 2101 and multiplexer chip 2102. Each of the multiplexer and demultiplexer may take the form of an additional AWG (or alternative passive optical router such as an Echelle grating), and each are positioned in a planar arrangement with the AWG.

One or both of the multiplexer and demultiplexer could equally be applied to any of the other optoelectronic switches described herein which have multiple inputs and/or multiple outputs. The multiplexer and demultiplexer could be Echelle gratings.

In FIG. 21, the optoelectronic switch takes the form of multiple chips abutted against one another. In an alternative embodiment it is envisaged that the components shown could be integrated onto a single optical chip. Either way, the chip/chips may be silicon-on-insulator chip(s). The AWG (or other passive optical router such as an Echelle grating) may be made from a suitable material other than silicon.

Switch functionality and/or capacity may be increased by adding one or more extra passive optical routers in series with the first optical router.

Figure 22:
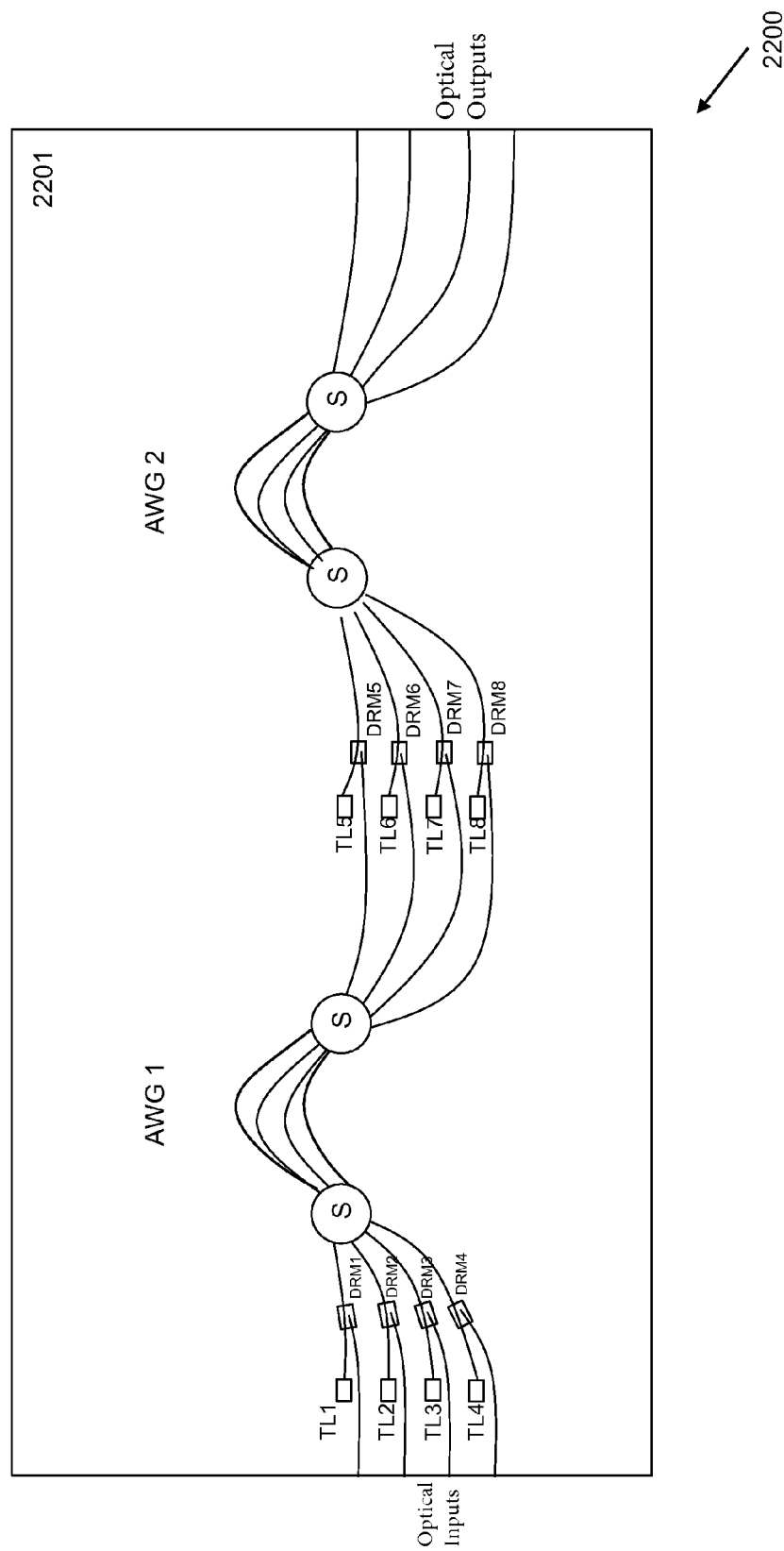
FIG. 22 is a schematic diagram of a silicon-on-insulator chip including a first AWG and a second AWG in an end-to-end configuration.
Figure 23:
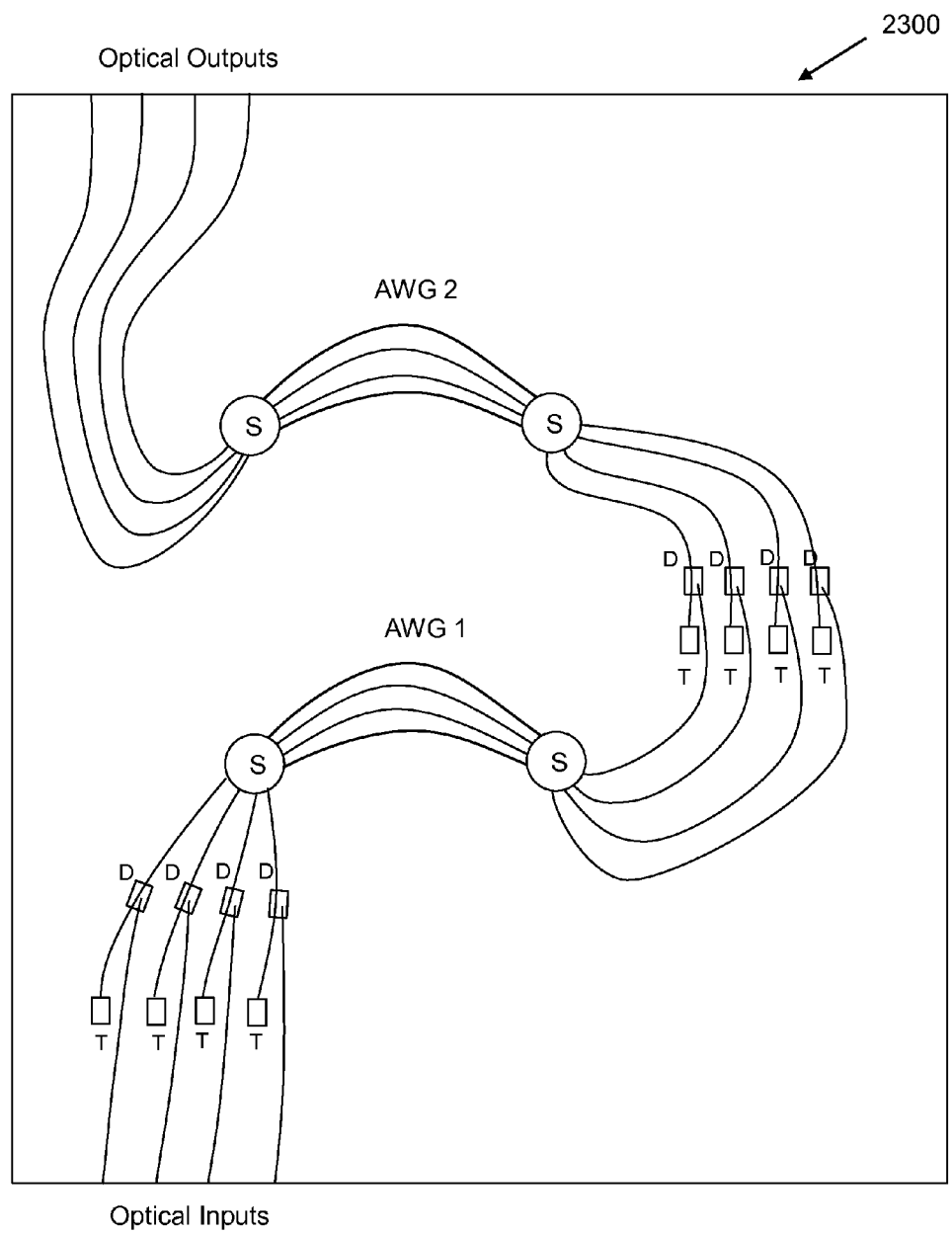
FIG. 23 is a schematic diagram of a silicon-on-insulator chip including a first AWG and a second AWG in a nested configuration.
Figure 24:
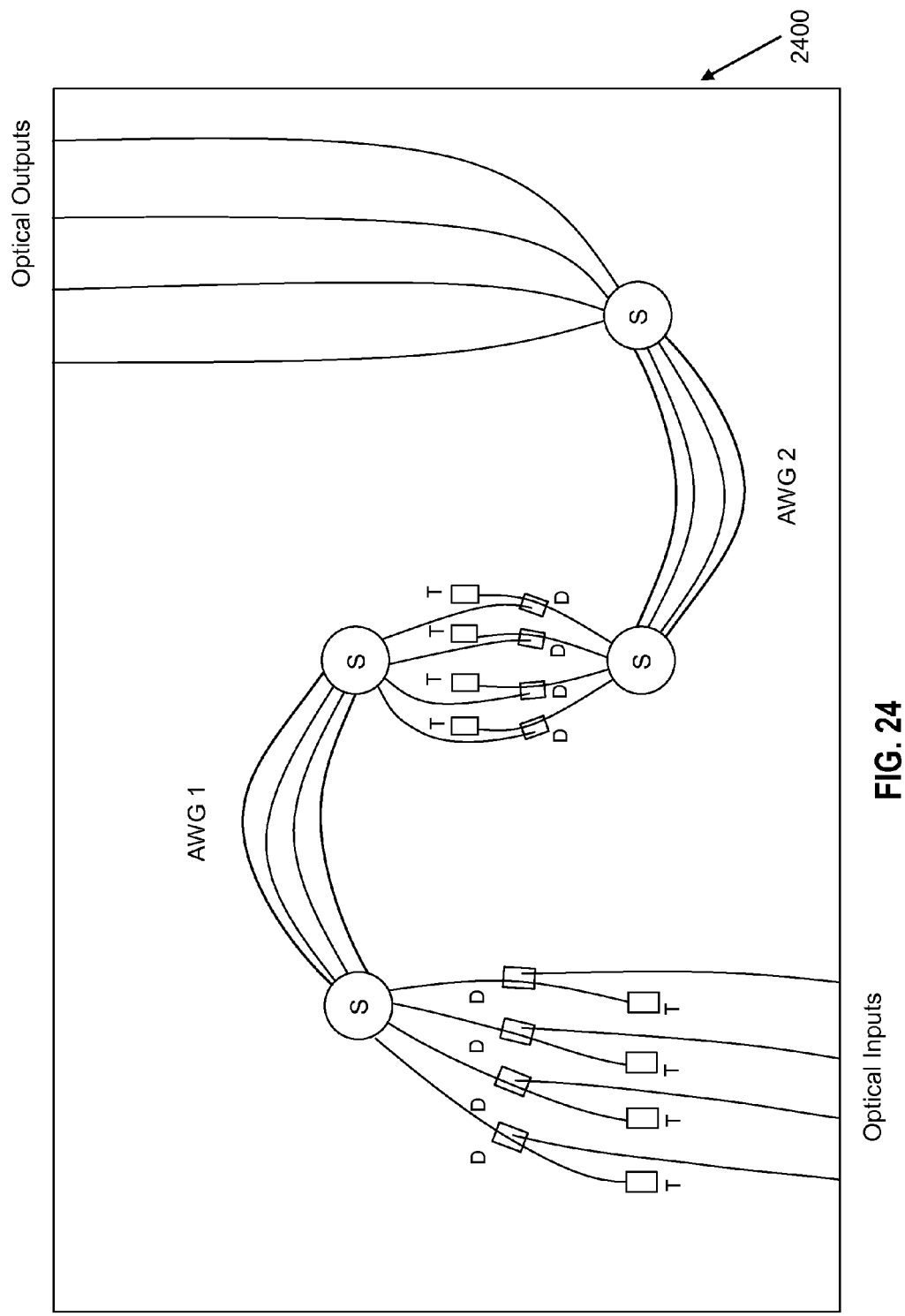
FIG. 24 is a schematic diagram of a silicon-on-insulator chip including a first AWG and a second AWG.

FIGS. 22 to 24 depict embodiments of optoelectronic switches containing two passive optical routers. DRMs are located at the inputs of the first AWG to generate a modulated optical signal with the desired wavelength (corresponding to the output port required). Upon exiting the first AWG it may again be necessary to change the wavelength of the output signal in order to further propagate the signal through the second AWG to the desired exit port.

In the embodiment of the optoelectronic switch 2200 of FIG. 22 a first AWG (AWG1) and a second AWG (AWG2) are successive elongated arcs positioned on an integrated chip in an end-to-end configuration along an elongated optical chip 2201.

In the embodiment of the optoelectronic switch 2300 shown in FIG. 23 the first AWG (AWG 1) and a second AWG (AWG 2) are positioned in a nested configuration such that the arched waveguides of the first AWG arch in the same direction as those of the second AWG (AWG2). In the embodiment shown in FIG. 22, the first AWG and second AWG are the same size as one another. However, it is envisaged that in a different embodiment the first AWG may be smaller than the second AWG or vice versa.

In the embodiment of the optoelectronic switch 2400 shown in FIG. 24 the first AWG (AWG 1) and a second AWG (AWG 2) are positioned in an S-shaped configuration such that the arched waveguides of the first AWG arch in the opposite direction to those of the second AWG (AWG2).

In all of the embodiments shown in FIGS. 22 to 24 the optoelectronic switch is formed on a single integrated chip (e.g. a silicon-on-insulator chip). However, it is envisaged that separate chips could be used for specific components (such as the tunable laser arrays).

Figure 25:
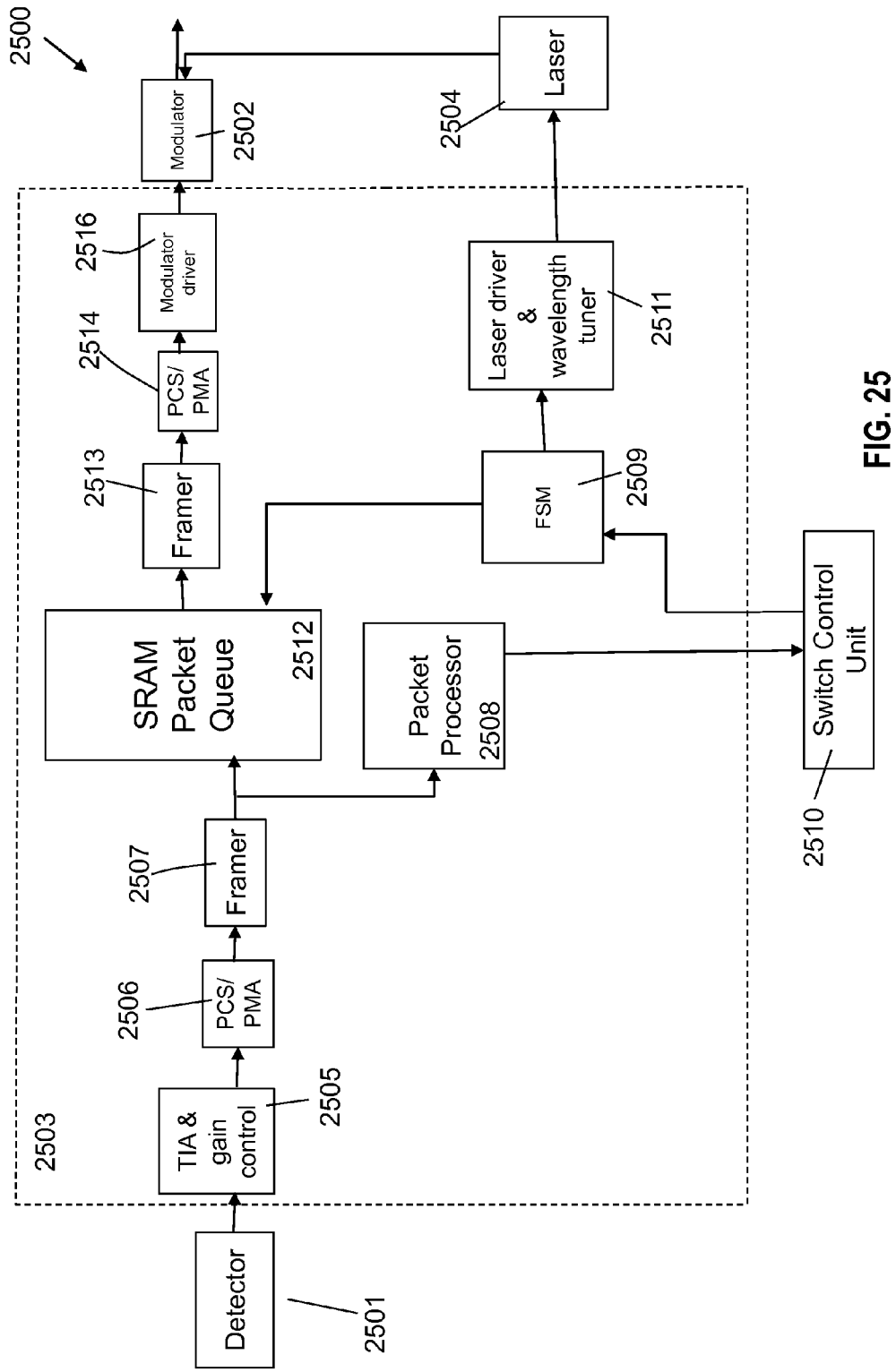
FIG. 25 is a schematic diagram of an example of a detector remodulator (DRM) for an optoelectronic packet switch.

A schematic diagram of a DRM for an optoelectronic packet switch is shown in FIG. 25. The DRM 2500 comprises: a detector 2501; a modulator 2502; and an electronic circuit 2503 which forms an electrical connection between the detector and the modulator via a number of additional components. A tunable laser 2504 is located outside of the electrical circuit as a separate component from the modulator 2502 and provides the modulator with a wavelength tuned but unmodulated laser signal.

The electronic circuit includes laser wavelength tuner module 2511 configured to send tuning signals to the tunable laser. The tunable laser is configured to generate a wavelength tuned (but unmodulated) laser light signal which acts as an optical input for the modulator 2502, the wavelength of which is selected by the laser wavelength tuner module 2511 of the electronic circuit. The module 2511 which includes the wavelength tuner may include a laser driver as shown in FIG. 25 although it is also envisaged that the laser driver could be located outside of the electronic circuit (not shown).

The electronic circuit 2503 receives an electrical input from the detector 2501 which is first amplified by an amplification unit 2505 which may take the form of a transimpedance amplifier (TIA) and acts to provide gain to the electrical packet signal generated by the detector, and conversion from current to voltage.

Once gain has been provided, the electrical signal is decoded by a Physical Coding Sublayer (PCS) and a Physical Medium Attachment (PMA) which is responsible for the serialisation of the incoming data. 2506. The PMA effectively regenerates the signal.

The output of the PCS/PMA 2506 is connected to the input of a framer 2507 which identifies the frames in the signal. The first copy of the frame is sent to a packet processor 2508 which determines the desired output port for the packet and sends this information to the external switch control unit 2510.

The switch control unit includes a scheduler (not shown) which constructs a schedule of how packets are to traverse the passive optical router. The scheduler sends this schedule to a finite state machine (FSM) 2509. Based on the schedule, the FSM generates control signals which instruct the laser wavelength tuner 2511 to set the appropriate wavelength of the tunable laser 2504. The appropriate wavelength is the wavelength required for the path of the modulated optical signal through the passive optical router to exit the passive optical router at a desired output port. The schedule sent to the FSM from the scheduler will take into account the paths of other packets through the passive optical router at the same time.

The second copy of the frame which has been generated by the framer 2506 is sent to an SRAM packet queue 2512, where the frame is buffered until a control signal from the FSM 2509 indicates that the frame is to be transmitted. The addition of buffers allows higher throughput (bits or bytes per second) through the switch by solving the problem of allowing packets destined to the same output port to be delayed until the output port is no longer in use.

Once transmitted from the SRAM packet queue 2512, the frame is sent to a second framer 2513, recoded into the desired format and serialized at a second PCS/PMA 2514 and then sent to the modulator 2502 via modulator driver 2516.

Figure 26:
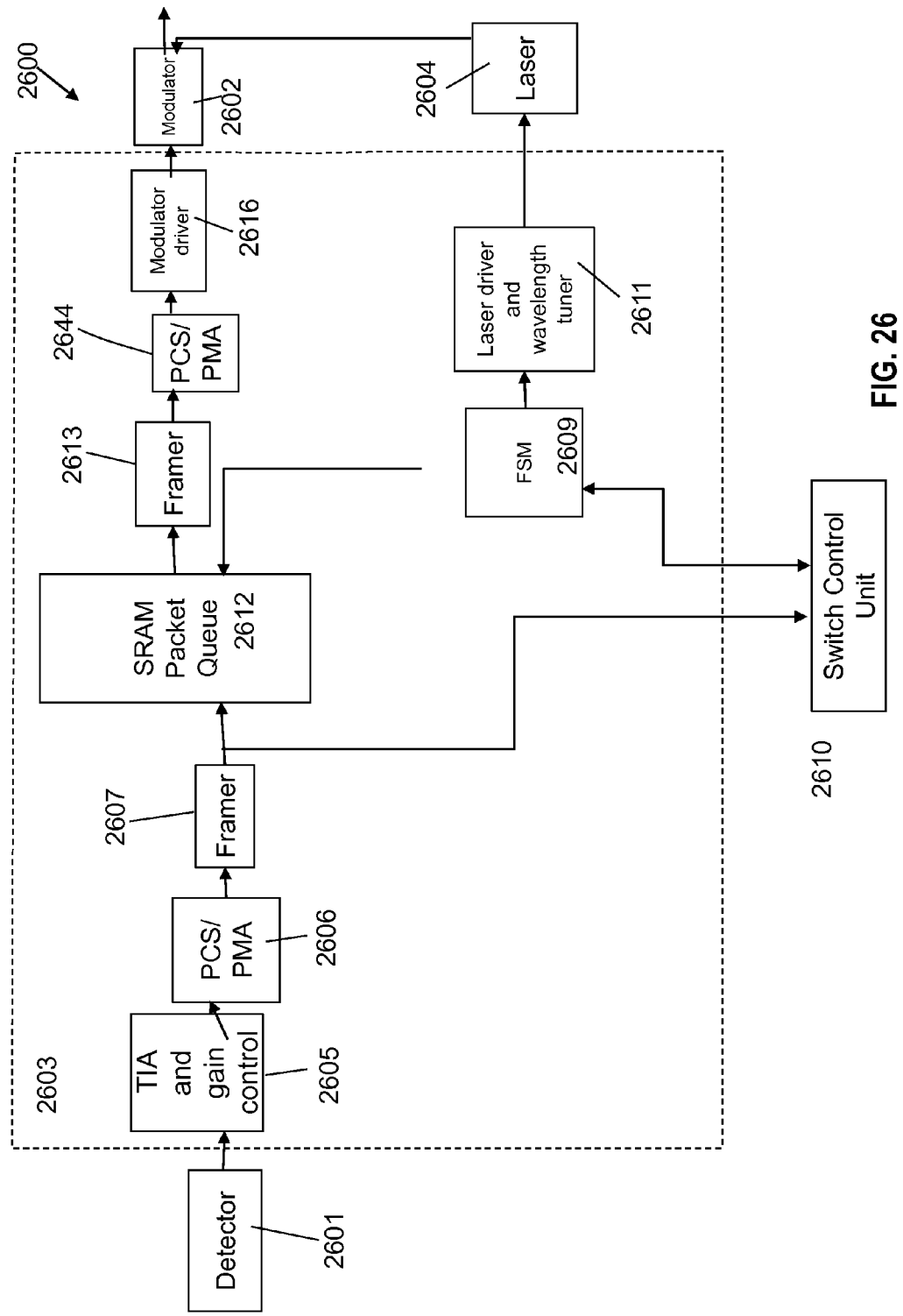
FIG. 26 is a schematic diagram of an alternative example of a detector remodulator (DRM) for an optoelectronic packet switch.

An alternative DRM 2600 is shown in FIG. 26 where like reference numbers correspond to those features described above in relation to FIG. 25. The embodiment in FIG. 26 differs from that of FIG. 25 in that the packet processor is located within the switch control unit and therefore outside of the electronic circuit 2603. In this embodiment, a copy of the frame is sent directly to the switch control unit 2610 from the first framer 2607 so that header processing of the packet and scheduling both take place within the switch control unit, i.e. outside of the DRM.

Figure 27:
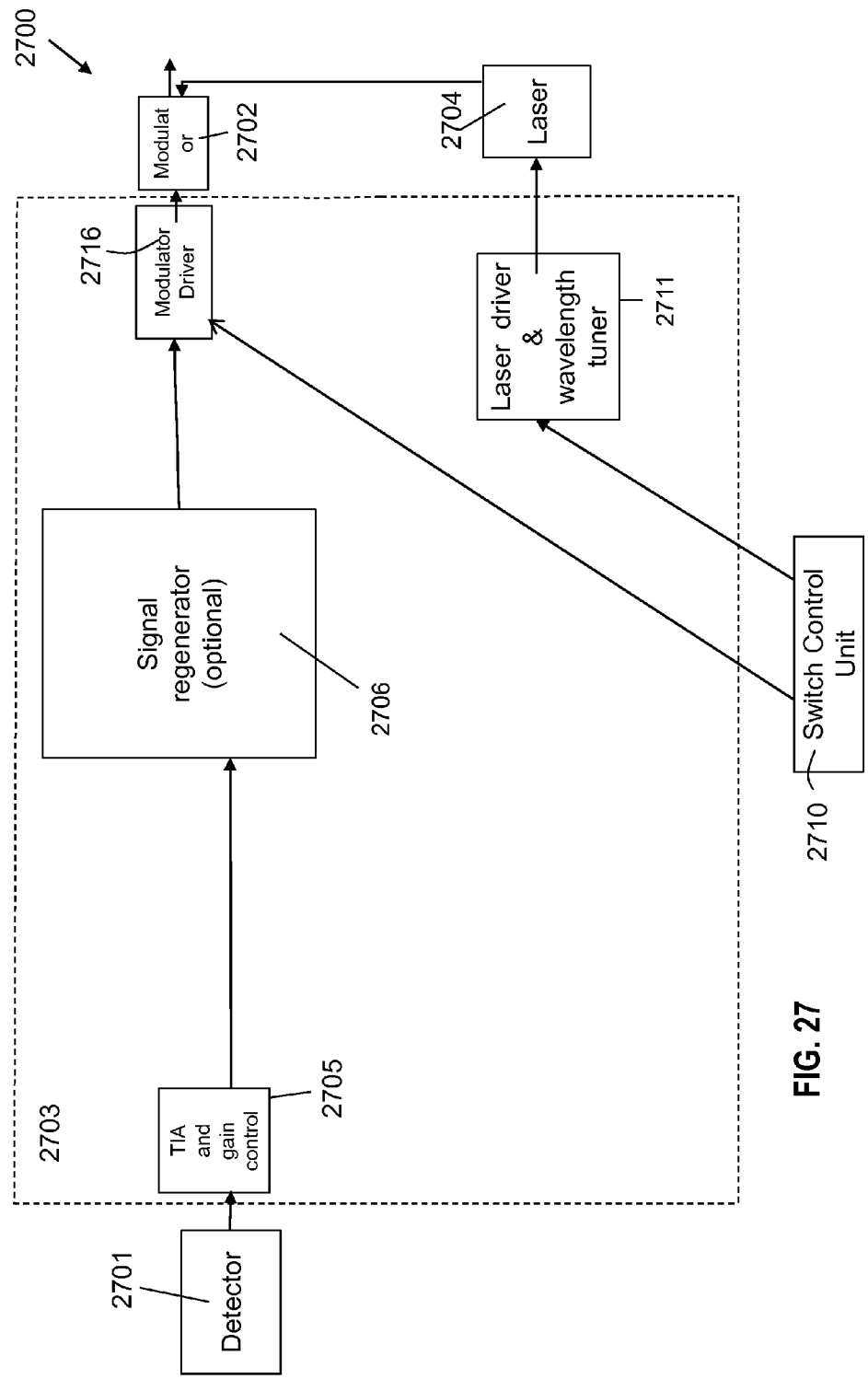
FIG. 27 is a schematic diagram of an example of a detector remodulator (DRM) for an optoelectronic circuit switch.

A further example of a DRM, in this case suitable for use in an optoelectronic circuit switch, is shown in FIG. 27. Like reference numbers correspond to those features described above in relation to FIGS. 25 and 26.

The DRM 2700 comprises: a detector 2701, a modulator 2702, and an electronic circuit 2703 which forms an electrical connection between the detector and the modulator via only mainly analogue/mixed signal circuitry without going into the digital domain. A tunable laser 2704 is located outside of the electronic circuit as a separate component from the modulator 2702 and provides the modulator with a wavelength tuned but unmodulated laser signal.

The electronic circuit includes laser wavelength tuner module 2711 configured to send tuning signals to the tunable laser. The tunable laser is configured to generate a wavelength tuned (but unmodulated) laser light signal which acts as an optical input for the modulator 2702, the wavelength of which is selected by the laser wavelength tuner module 2711 of the electronic circuit. The module 2711 which includes the wavelength tuner may include a laser driver as shown in FIG. 25 although it is also envisaged that the laser driver could be located outside of the electrical circuit (not shown).

The electronic circuit 2703 receives an electrical input from the detector 2701, and the electrical input is first amplified by an amplification unit 2705 which may take the form of a transimpedance amplifier (TIA) and acts to provide gain to the electrical packet signal generated by the detector, and conversion from current to voltage.

Once gain and voltage conversion has been provided, the electrical signal is then optionally sent to a regenerator 2706 which provides additional reshaping and retiming to the signal, and prepares the signal to have sufficient magnitude and quality to input to the modulator driver and generate an optical signal of desired quality.

The switch control unit 2710 directly controls the modulator driver and the wavelength tuner module using external inputs.

The signal is then sent to the modulator 2702 via modulator driver 2716.

The electronic circuits described above in relation to FIGS. 25 to 27 could form the electrical circuit of any one of the embodiments described in relation to FIGS. 1 to 13. Thus the modulator and/or the detector of FIGS. 25 to 27 may take the form of any one of the detectors and/or modulators described in more detail in FIGS. 1 to 13B of this application. Furthermore, although the electronic circuit in FIGS. 25 to 27 connect a single detector to a single modulator, it is envisaged that the circuit could be scaled up to connect one or more detectors with one or more modulators.

Figure 28:
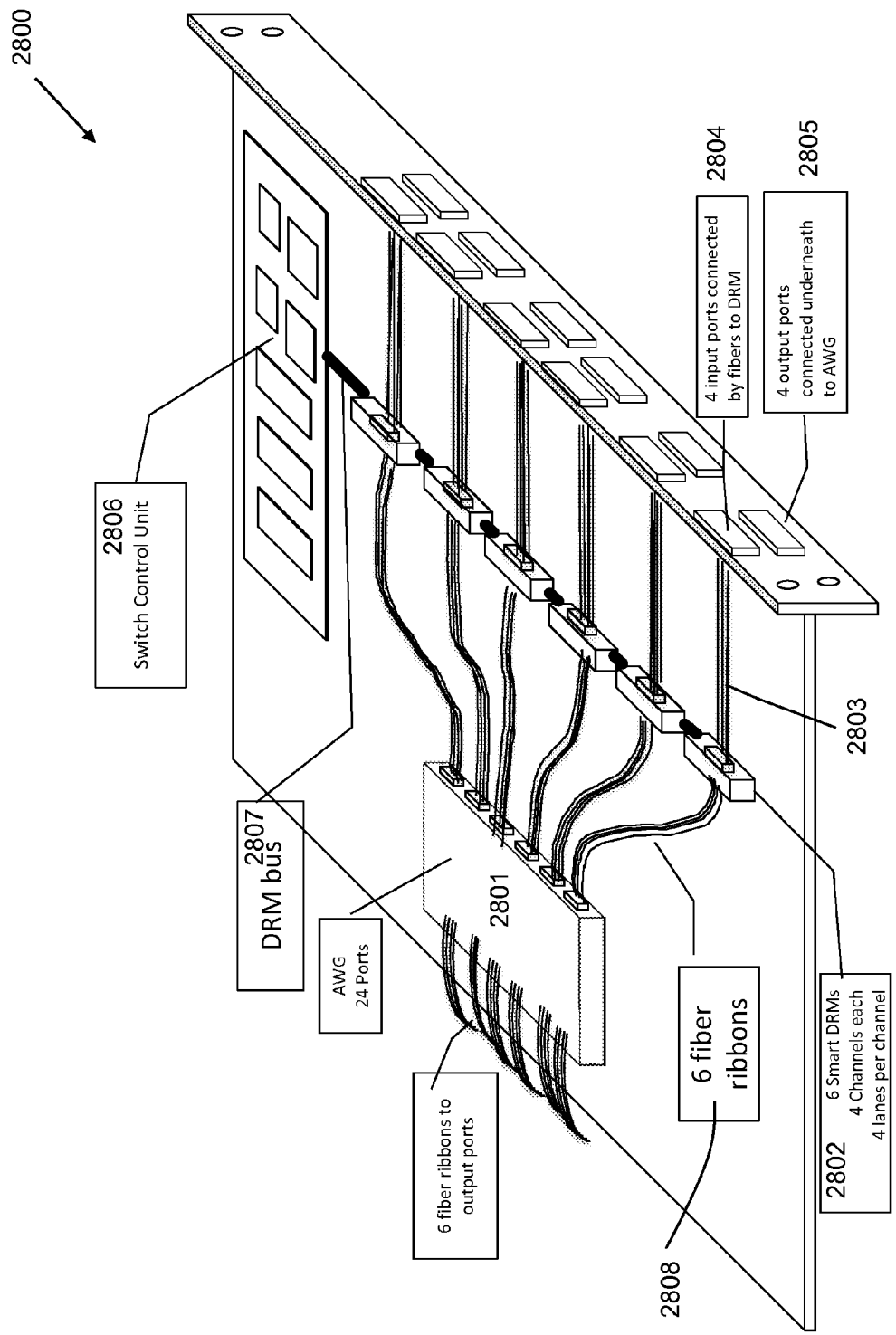
FIG. 28 is a schematic diagram of an optoelectronic switch.

An embodiment of an optoelectronic switch 2800 is shown in FIG. 28. The optoelectronic switch could be an optoelectronic packet switch or an optoelectronic circuit switch.

An interface of the optoelectronic switch 2800 includes a plurality of switch input ports for receiving optical signals to be switched using a passive optical router 2801 and a plurality of switch output ports for transmitting optical signals received from the passive optical router. In the embodiment shown, the passive optical router takes the form of an AWG although it is envisaged that other passive optical routers could be used.

Each switch input port 2804 is connected to a specific DRM 2802 via an optical fiber 2803. In fact a plurality of input ports are connected to each DRM by a plurality of respective optical fibers. Each fiber connects a specific switch input to a specific one of a plurality of detectors within the DRM. The optoelectronic switch is configured to split an inputted packet into a plurality of paths/lines and to process the plurality of lines of data in parallel, each channel having its own detector, its own modulator and its own output fiber.

For each input port 2804, the detector will receive an optical signal from its respective input and will convert this into an electrical signal (if the optoelectronic switch is an optoelectronic packet switch, the electrical signal generated by the detector will be an electrical packet signal).

The electrical signal will be processed by the DRM as described in relation to FIG. 25, 26 or 27 based on scheduling information (in the case of an optoelectronic packet switch) or other control information (in the case of an optoelectronic circuit switch). Based on this information, the electrical signal will be sent to one or more modulators.

Each modulator is configured to receive a modulated electrical signal from one or more channels within the electrical circuit and also to receive a wavelength tuned laser input. In the embodiment shown in FIG. 28, the tunable lasers are located on the switch control unit 2806.

A DRM bus 2807 forms a bidirectional connection between the switch control unit and each of the DRMs for communication of information to and from the switch control unit.

A further optical fiber 2808 in the form of a 4 line ribbon fiber connects the outputs port of each DRM to an input port of the passive optical router.

In order to further decrease the time taken for a single packet to be switches, data packets which enter each input port 2804 of the optoelectronic switch (and therefore each packet which passes through a DRM) is separated into a plurality of lanes which are processed in parallel.

In the embodiment shown, there are a total of 6 DRMs arranged in a linear array, each of which is configured to receive inputs from 4 input ports. Each channel between an input port and a DRM is then itself split into 4 lanes which are processed in parallel.

Figure 29:
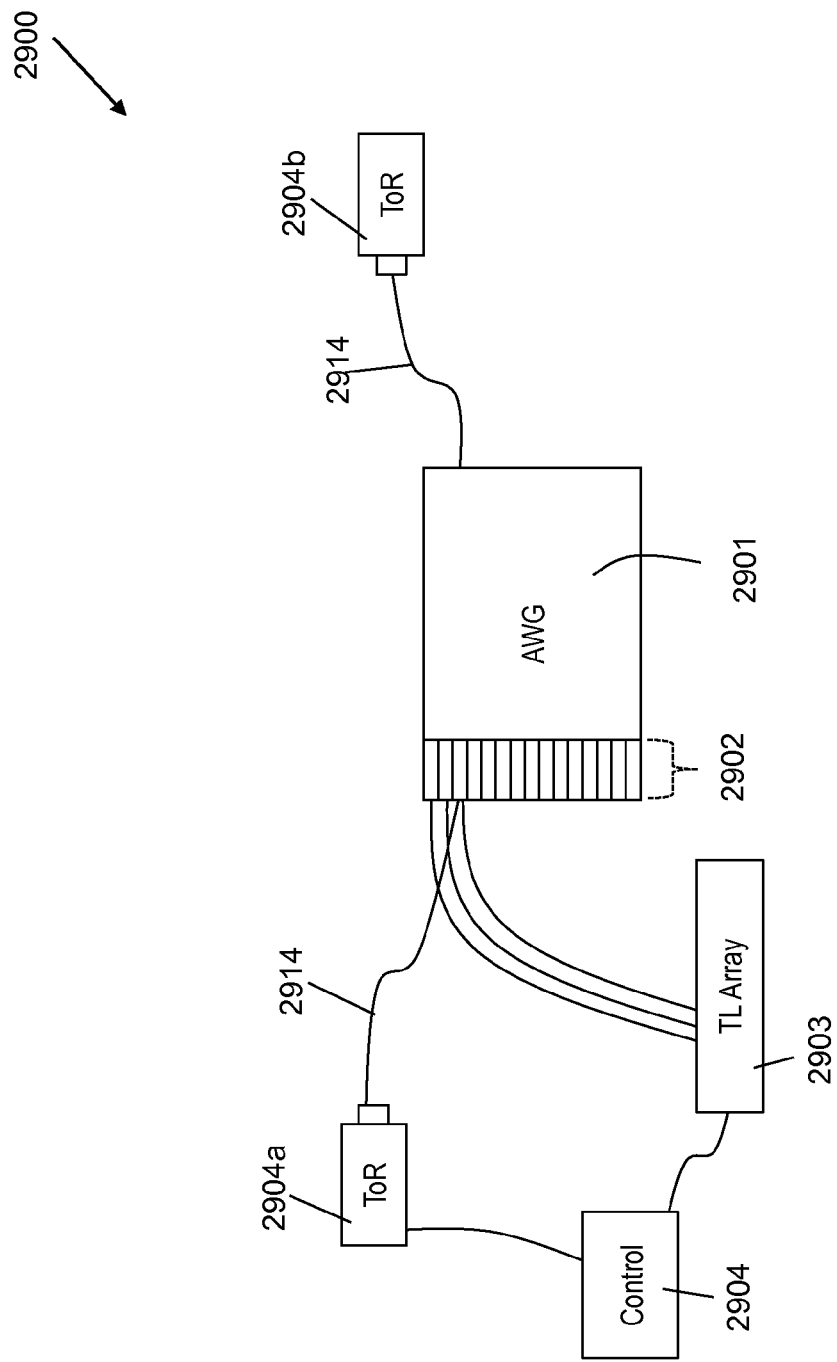
FIG. 29 is a schematic diagram of an alternative optoelectronic switch.

An alternative arrangement of an optoelectronic switch 2900 is shown in FIG. 29 connected to two top of rack switches 2904a, 2904b between which data is to be switched. A plurality of DRMs 2902 are located as an array, each DRM at an input of a passive optical router (in the form of an AWG 2901) to provide optical modulated signals to the input ports of the AWG. As with previous embodiments, the DRMs are either located on the same chip as the AWG of on adjacent abutting chips which are optically connected to the chip of the AWG.

An array of tunable lasers 2903 is located separately from the AWG and DRMs, and each tunable laser is optically connected to the input of one of the DRMs via a wavelength agnostic optical fibre.

The first ToR from which data is to be switched is connected to the modulator of one of the plurality of DRMs 2902. The DRM receives optical input signals of undefined wavelengths and routes them through the passive optical router (in this case an AWG) by modulating the tuned laser signal from one of the tunable lasers, the wavelength of the tunable laser chosen to select a specific path through the passive optical router to a particular output port of the passive optical router.

This arrangement has the advantage that the more expensive optical equipment is kept separate from the parts of the switch required to carry the signal from and to the ToR. One or more of the tunable lasers may take the form of a Vertical Cavity Surface-Emitting Laser (VCSEL) or another suitable laser which is driven by direct modulation.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the detectors such as photodetectors of any one of the embodiments above could be replaced with other types of receivers suitable for receiving optical or electrical signals.

All references referred to above are hereby incorporated by reference.

The invention claimed is:

1. An optoelectronic packet switch comprising:
   one or more switch input(s) for receiving optical packet signals;
   a passive optical router having input ports and output ports, the optical paths between which are wavelength dependent;
   a switch control unit; and
   a plurality of detector remodulators (DRMs) configured to receive optical signals from the one or more switch input(s) and to generate modulated optical signals for transmission to the input ports of the passive optical router, each detector remodulator (DRM) comprising:
      one or more detectors for converting an optical packet signal received at the one or more switch input(s) into an electrical packet signal;
      one or more modulators for generating the modulated optical signals, each modulator configured to: receive a wavelength tuned laser input from a tunable laser; receive the electrical packet signal from one of the detectors; and to generate a modulated optical signal at the tuned wavelength, the modulated optical signal containing the information of the electric packet signal and the tuned wavelength chosen to select a desired output port of the passive optical router for the modulated optical signal; and
      an electronic circuit connecting each of the one or more detectors to a corresponding modulator;
   wherein each of the one or more modulators is a separate component from the tunable laser that provides its wavelength tuned laser input; and
   wherein the switch control unit includes a scheduler which is communicably connected to the electronic circuit of each DRM; the electronic circuit configured to control the generation of the modulated optical signal by the modulator based on scheduling information received from the switch control unit.

2. The optoelectronic packet switch of claim 1, wherein the electronic circuit of the DRM includes an Application Specific Integrated Circuit (ASIC).

3. The optoelectronic packet switch of claim 1, wherein the electronic circuit of one or more of the DRMs includes a packet processor.

4. The optoelectronic packet switch of claim 1, wherein the switch control unit includes a packet processor.

5. The optoelectronic packet switch of claim 1 wherein the electronic circuit includes a wavelength tuner which controls the wavelength of the wavelength tuned laser input based on scheduling information received from the switch control unit.

6. The optoelectronic packet switch of claim 1, wherein the modulator includes a modulation region at which a semiconductor junction is set horizontally across the waveguide, the modulator region including:
   an electro-absorption material;
   a Mach-Zehnder modulator;
   a Fabry-Perot resonator cavity; or
   a ring-resonator.

7. The optoelectronic packet switch of claim 1, wherein at least a portion of the electronic circuit of the DRM is an electrical chip in direct contact with a photonic chip which comprises the detector and the modulator.

8. The optoelectronic packet switch of any one of claim 1, wherein each detector remodulator is configured to split an input optical packet signal into a plurality of separate lanes which are processed by the electronic circuit of the DRM in parallel.

9. A detector remodulator (DRM) comprising:
one or more detectors for converting an optical packet signal into an electrical packet signal;
one or more modulators, each modulator configured to: receive a wavelength tuned laser input from a tunable laser; receive an electrical packet signal from one of the detectors; and to generate a modulated optical signal at the tuned wavelength, the modulated optical signal containing the information of the electrical signal; and
an electronic circuit connecting the detector and modulator, the electronic circuit containing means for controlling the generation of the modulated optical signal based on scheduling information from an external control unit;
wherein the modulator is separate component from the tunable laser.

10. A method of optical packet switching using a passive optical router having a plurality of input ports and a plurality of output ports, the method comprising the steps of:
providing an optoelectronic packet switch comprising:
one or more switch input(s) for receiving optical packet signals;
a passive optical router having input ports and output ports, the optical paths between which are wavelength dependent;
a switch control unit; and
a plurality of detector remodulators configured to receive the optical input signals and to generate modulated optical signals for transmission to the input ports of the passive optical router;
receiving at one or more of the detector remodulators an optical packet signal from the one or more switch input(s);
converting each optical packet signal received into an electrical packet signal using one or more detectors of the one or more detector remodulators;
receiving at the one or more detector remodulators a wavelength tuned laser input from a separate wavelength tunable laser; and
generating at a modulator of the one or more detector remodulators a modulated optical signal at the tuned wavelength, the modulated optical signal containing the information of the electrical packet signal and having a wavelength chosen to result in a desired output port of the passive optical router;
wherein the modulator is controlled via an electronic circuit which connects it to one of the one or more detectors and which controls the generation of the modulated optical signal based on scheduling information received from the switch control unit.

11. An optoelectronic circuit switch comprising:
one or more switch input(s) for receiving optical input signals;
a passive optical router having input ports and output ports;
a switch control unit; and
a plurality of detector remodulators (DRMs) configured to receive optical signals from the switch input(s) and to generate modulated optical signals for transmission to the input ports of the passive optical router, each detector remodulator (DRM) comprising:
one or more detectors for converting each optical signal received at the switch input(s) into an electrical signal;
one or more modulators for generating the modulated optical signals, each modulator configured to: receive a wavelength tuned laser input from a tunable laser; receive the electrical signal from one of the detectors; and to generate a modulated optical signal at the tuned wavelength, the tuned wavelength chosen to select a desired output port of the passive optical router and the modulated optical signal containing the information of the electrical signal; and
an electronic circuit connecting the detector and the modulator;
wherein each of the one or more modulators is a separate component from the tunable laser that provides its wavelength tuned laser input; and
wherein the switch control unit is communicably connected to the electronic circuit of each DRM, the electronic circuit configured to control the generation of the modulated optical signal by the modulator based on control information received from the switch control unit.

12. A silicon-on-insulator chip including the switch of claim 1.

13. The silicon-on-insulator chip of claim 12, wherein the passive optical router of the switch is an arrayed waveguide grating (AWG) and wherein the AWG is located in the same optical plane as the DRMs.

14. The silicon-on-insulator chip of claim 12, wherein the passive optical router and the DRMs are located on a single integrated photonic chip.

15. The silicon-on-insulator chip of claim 12, wherein the electronic circuit of the DRM is flip chip mounted onto the silicon-on-insulator chip.

16. The silicon-on-insulator chip of claim 12 comprising, in a planar arrangement:
a first AWG having a plurality of inputs and a plurality of outputs;
a first array of DRMs located at the input of the first AWG, each DRM in the first array having a tunable laser wavelength input; the first array of DRMs arranged such that the output of each DRM in the first array forms an input signal for the first AWG;
a second AWG having a plurality of inputs and a plurality of outputs;
a second array of DRMs located at the input to the second AWG; each DRM in the second array having a tunable laser wavelength input; the second array of DRMs arranged such that the output of each DRM in the second array forms an input signal for the second AWG;
wherein each output of the first AWG forms an input signal for a respective DRM of the second array of DRMs.

17. The silicon-on-insulator chip of claim 16 wherein the first and second AWGs may be located in an end-to-end arrangement on the planar chip.

18. The silicon-on-insulator chip of claim 16 wherein the first and second AWGs may be positioned in a nested arrangement within the plane of the waveguides.

19. The silicon-on-insulator chip of claim 18, wherein each AWG has an arc-like shape, the first AWG having a smaller arc than the second AWG; wherein the first AWG is nested underneath the arc of the second AWG.

20. The silicon-on-insulator chip of claim 12 comprising, in a planar arrangement:
- a first array of DRMs; each DRM located at an input waveguide of the AWG, and each DRM coupled to a tunable laser which provides the input wavelength for its modulator;
- a second array of DRMs; each DRM located at an output waveguide of the AWG and each DRM coupled to a tunable laser which provides the wavelength tuned light input for its modulator;
- an optical demultiplexer, the output of which forms the input signals for the first array of DRMs; and
- an optical multiplexer, the inputs for which are the outputs of the second array of DRMs.

* * * * *